United States Patent
Yokoe

(10) Patent No.: US 11,209,097 B2
(45) Date of Patent: Dec. 28, 2021

(54) VALVE DRIVE DEVICE

(71) Applicant: NIDEC SANKYO CORPORATION, Nagano (JP)

(72) Inventor: Satoru Yokoe, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 253 days.

(21) Appl. No.: 16/699,755

(22) Filed: Dec. 2, 2019

(65) Prior Publication Data
US 2020/0173575 A1   Jun. 4, 2020

(30) Foreign Application Priority Data
Dec. 3, 2018  (JP) .............................. JP2018-226691

(51) Int. Cl.
*F16K 31/53* (2006.01)
*F16K 31/06* (2006.01)
*F16K 31/524* (2006.01)

(52) U.S. Cl.
CPC ............ *F16K 31/535* (2013.01); *F16K 31/06* (2013.01); *F16K 31/524* (2013.01)

(58) Field of Classification Search
CPC .......... F16K 31/535; F16K 3/08; F16K 3/085; F16K 3/262; F16K 31/041
See application file for complete search history.

(56) References Cited

U.S. PATENT DOCUMENTS 2,465,033 A  *  3/1949  Ocheltree  ............. F16H 19/001
                                                    74/25
6,962,320 B2 * 11/2005  Ozawa  ...................... F16K 7/18
                                                    251/129.11
7,793,915 B2 *  9/2010  Ozawa  .................. F16K 11/074
                                                    251/248
(Continued)

FOREIGN PATENT DOCUMENTS

CN    107940080    4/2018
CN    108194680    6/2018
(Continued)

OTHER PUBLICATIONS

"Office Action of Korea Counterpart Application", dated Dec. 1, 2020, with English translation thereof, pp. 1-13.
(Continued)

*Primary Examiner* — Reinaldo Sanchez-Medina
*Assistant Examiner* — Nicole Gardner
(74) *Attorney, Agent, or Firm* — JCIPRNET

(57) ABSTRACT

A valve drive device comprising a valve body drive mechanism including a drive gear, a driven gear for turning the valve body, and a power transmission switching part provided with a protruded part of the drive gear and a turning restriction part turnably attached to the driven gear. The turning restriction part includes a lever part which is provided with a first contact part structured to contact with the protruded part when the drive gear is turned to a first direction and a second contact part structured to contact with the protruded part when the drive gear is turned to an
(Continued)

opposite direction to perform a separating operation from a contact position with a lever turning restriction part. The second contact part is formed in a shape having an interference avoiding part on a side of the first contact part.

12 Claims, 35 Drawing Sheets

(56) References Cited

U.S. PATENT DOCUMENTS

| | | | | |
|---|---|---|---|---|
| 9,746,087 | B2* | 8/2017 | Yokoe | F16K 31/041 |
| 9,903,479 | B2* | 2/2018 | Yokoe | F16K 3/085 |
| 10,677,333 | B2* | 6/2020 | Yokoe | F16H 25/16 |
| 10,781,932 | B2* | 9/2020 | Yokoe | F16K 31/043 |
| 10,823,294 | B2* | 11/2020 | Yokoe | F16K 31/04 |
| 10,900,578 | B2* | 1/2021 | Yokoe | F16K 31/535 |
| 10,935,071 | B2* | 3/2021 | Yokoe | F16C 27/02 |
| 11,098,815 | B2* | 8/2021 | Yokoe | F16K 31/047 |

FOREIGN PATENT DOCUMENTS

| | | |
|---|---|---|
| JP | 2001208096 | 8/2001 |
| JP | 5615993 | 10/2014 |
| JP | 2018062999 | 4/2018 |
| KR | 20180096791 | 8/2018 |

OTHER PUBLICATIONS

"Final Office Action of Korea Counterpart Application", dated Mar. 1, 2021, with English translation thereof, pp. 1-8.

* cited by examiner

VALVE DRIVE DEVICE

CROSS REFERENCE TO RELATED APPLICATION

The present invention claims priority under 35 U.S.C. § 119 to Japanese Application No. 2018-226691 filed Dec. 3, 2018, and the entire content of which is incorporated herein by reference.

TECHNICAL FIELD

The present invention relates to a valve drive device structured to drive a valve for adjusting a flow rate of a fluid.

BACKGROUND

Conventionally, in order to cool an inside of a chamber of a refrigerator or the like, a refrigerant valve device structured to supply refrigerant has been known. One of the refrigerant valve devices includes a valve drive device structured to drive a valve and adjust a supply amount of refrigerant which is supplied to an inside of a chamber (Japanese Patent No. 5615993 (Patent Literature 1)).

The refrigerant valve device described in Patent Literature 1 includes a valve body which is turnable with a position shifted to an opening of either of a refrigerant inlet and a refrigerant outlet as a center in a base provided with the refrigerant inlet, the refrigerant outlet and a valve seat face, and a valve body drive mechanism structured to turn the valve body. The valve body drive mechanism includes a stepping motor (hereinafter, referred to as a motor), a pinion which is integrally rotated with a drive shaft of the motor, and an output gear which is engaged with the pinion and is integrally turned with the valve body.

When the motor is rotated, the output gear, i.e., the valve body is also turned through the pinion which is integrally rotated with the motor. As a result, the valve body is capable of adjusting an opening degree of an opening of either of the refrigerant inlet and the refrigerant outlet to adjust a supply amount of the refrigerant.

In the valve body drive mechanism, when the pinion is rotated in a forward rotation direction, the output gear and the valve body can be turned from a first turning restricted position to a second turning restricted position which is a position obtained by rotating the motor in the forward rotation direction.

In order to adjust a supply amount of the refrigerant, when the motor is rotated in a reverse rotation direction from the second turning restricted position to the first turning restricted position, an arm part of the output gear and an abutted part of the pinion are abutted with each other and a state that a further turning of the pinion in the reverse rotation direction is restricted is obtained. Therefore, since the motor tries to continue to rotate to the reverse rotation direction in a state that rotation of the pinion to the reverse rotation direction is restricted, the motor occurs step-out. As a result, when the step-out of the motor is occurred, the arm part and the abutted part are collided with each other and a noise (collision noise) may be generated.

SUMMARY

In view of the problem described above, the present invention provides a valve drive device including a valve body drive mechanism structured to drive a valve body, the valve drive device being capable of reducing noise when the valve body is driven and of smoothly performing power switching and, in addition, when a fluid is flowed through an inside of the valve drive device, a possibility that a foreign matter enters into a portion performing power transmission switching of the valve body drive mechanism to cause an operation failure is reduced.

To solve the above problem, the present invention provides a valve drive device including a valve body drive mechanism structured to drive a valve body. The valve body drive mechanism includes a drive gear structured to be rotatably driven by a motor, a driven gear structured to turn the valve body through rotation of the drive gear in a state that the driven gear is engaged with the drive gear, and a power transmission switching part which is capable of switching between a power transmission state that the drive gear is engaged with the driven gear to transmit power of the motor to the driven gear and a power non-transmission state that an engaging state of the drive gear with the driven gear is released. The power transmission switching part includes at least one protruded part which is formed in the drive gear and is protruded in a radial direction of the drive gear, and a turning restriction part which is turnably attached to the driven gear and is engageable with the protruded part. The turning restriction part is provided with a turning shaft which is inserted into the driven gear, and a lever part which is extended from the turning shaft in a circumferential direction of the driven gear and is urged with an urging force toward an outer side in a radial direction of the driven gear. The driven gear is provided with a lever turning restriction part structured to contact with the lever part to restrict turning of the turning restriction part to the outer side in the radial direction of the driven gear. The lever part is structured to perform a contact operation with the protruded part being turned and a separating operation from a contact position with the lever turning restriction part against the urging force, and the lever part is provided with a first contact part structured to contact with the protruded part when the drive gear is turned to a first direction, and a second contact part structured to contact with the protruded part when the drive gear is turned to a second direction which is an opposite direction to the first direction. When the protruded part is turned to the first direction and is contacted with the first contact part, the lever part is pressed by the protruded part to turn the driven gear, and a tooth of the drive gear and a tooth of the driven gear are engaged with each other and thereby the power transmission state is obtained and, when the protruded part is turned to the second direction and is contacted with the second contact part, the lever part is turned to an inner side in the radial direction against the urging force and a tooth of the drive gear is not engaged with a tooth of the driven gear to idle the drive gear and thereby the power non-transmission state is obtained. In addition, in a case that a locus of a circle formed by a tip end in the radial direction of the protruded part when the drive gear is turned is defined as a first circle locus, and that a locus of a circle formed by a tip end of the first contact part in the radial direction of the driven gear when the protruded part is turned to the first direction and is contacted with the first contact part is defined as a second circle locus, the second contact part is formed in a shape having an interference avoiding part on a side of the first contact part in an interference region surrounded by a first circle formed by the first circle locus and a second circle formed by the second circle locus.

In this case, the above-mentioned "interference avoiding part" described as that "the second contact part is formed in a shape having an interference avoiding part on a side of the first contact part in the interference region . . . " means that a retreating shape is formed for the protruded part in the second contact part of the lever part which is to be contacted with the protruded part and, in the portion of the retreating shape, the protruded part does not contact with the lever part. In other words, in the interference region, a portion on the first contact part side of the second contact part is formed in a shape so as to have a gap space in which the second contact part does not contact with the protruded part.

According to this embodiment, a state of power transmission can be switched by switching an engaging state of the drive gear with the driven gear in the power transmission switching part and, since the motor is not required to step out, noise can be reduced.

While advancing improvement of the power transmission switching part capable of reducing noise, the present inventor has recognized that there is a case which is required to consider that the valve drive device is installed in a fluid path through which a fluid including foreign matters such as copper powder is flowed through an inside of the valve drive device. In this case, the present inventor has found that, as operations of the power transmission part, when an operation that the lever part contacts with the protruded part and an operation that the lever part is turned against the urging force and is separated from the contact position with the lever turning restriction part are repeated, the foreign matter may enter into a region formed between the lever part and the lever turning restriction part. Further, the present inventor has recognized that, when the foreign matters enter into the region and are accumulated, the lever part becomes unable to be returned to the original contact position and the power transmission part may occur an operation failure.

In order to solve this new problem, in the present invention, the second contact part is structured in a shape having an interference avoiding part on a side of the first contact part in an interference region surrounded by a first circle formed by the first circle locus and a second circle formed by the second circle locus.

According to this embodiment, the second contact part is formed in a shape having the interference avoiding part and thus, a timing when the protruded part is abutted with the second contact part of the lever part by turning of the drive gear becomes later than that in a shape having no interference avoiding part. As a result, a time period in a "separated" state in the contacting and separating operation of the lever part becomes smaller than that in the shape having no interference avoiding part. In the "contacting" state in the contacting and separating operation, a foreign matter is structurally unable to enter into the region and thus, when a time period of the "separated" state is shortened, a foreign matter is hard to enter into the region by the shortened time period.

Therefore, even in a case that the valve drive device is installed in a fluid path including foreign matters such as copper powder, the foreign matter can be restrained from entering into the region and thus, a possibility can be reduced that the lever part becomes unable to return to the original contact position. As a result, a possibility that the power transmission switching part occurs an operation failure due to a foreign matter can be reduced.

Further, in the present invention, it is preferable that, in the valve drive device, a continuous portion continuing from a portion corresponding to the interference avoiding part of the second contact part to the first contact part is formed to be a curved surface on which the protruded part is capable of sliding.

When the protruded part is turned by turning of the drive gear to face a portion corresponding to the interference avoiding part of the second contact part, the protruded part is initially in a non-contact state with the second contact part. After that, when the protruded part is moved toward the first contact part side, the non-contact state is switched to a contact state with the second contact part. When switched to the contact state, the protruded part begins to push the second contact part. Then, the lever part is pushed by the turning protruded part and is turned against the urging force with the turning shaft as a support point and the lever part is separated from the contact position with the lever turning restriction part.

In this case, in this embodiment, the continuous portion continuing from a portion corresponding to the interference avoiding part to the first contact part is formed to be a curved surface on which the protruded part is capable of sliding and thus, the lever part is smoothly turned and its turning operation is stable.

Further, in the present invention, it is preferable that, in the valve drive device, the interference avoiding part is structured of a recessed part between the contact position of the lever part with the lever turning restriction part and the first contact part.

A portion of the second contact part of the lever part which is contacted with the lever turning restriction part does not originally contact with the protruded part. The recessed part is provided between the contact position of the lever part with the lever turning restriction part and the first contact part, and the interference avoiding part is structured of the recessed part and thus, in a state that the contact state and the contact position of the lever part with the lever turning restriction part are stabilized, a delay of the timing can be easily realized by the recessed part.

Further, in the present invention, it is preferable that, in the valve drive device, when the protruded part pushes the second contact part of the lever part while the drive gear is turned in the second direction, the lever part is turned with the turning shaft as a turning support point, and a turning angle of the lever part when the protruded part is separated from the second contact part is a maximum value.

According to this embodiment, it is structured that a turning angle of the lever part becomes a maximum value when the protruded part is separated from the second contact part and thus, the lever part is not required to be turned unnecessarily. As a result, the structure can be simplified.

Further, in the present invention, it is preferable that, in the valve drive device, the motor is a stepping motor, and the protruded part is separated from the second contact part in a step next to a step corresponding the maximum value of the turning angle of the lever part.

In this embodiment, the protruded part is separated from the second contact part in a step next to the step corresponding to the maximum value of the turning angle of the lever part. As a result, design and operation control can be simplified.

Further, in the present invention, it is preferable that, in the valve drive device, in a state that the lever turning restriction part restricts turning of the turning restriction part, the lever turning restriction part is formed with a gap space between the lever turning restriction part and the turning shaft.

In this embodiment, in a state that the lever turning restriction part restricts turning of the turning restriction part, the lever turning restriction part is formed with a gap space between the lever turning restriction part and the turning shaft and thus, the lever turning restriction part and the turning shaft are capable of avoiding directly contacting with each other. As a result, positioning of the turning restriction part is not required to perform by a portion of the turning shaft, and the lever turning restriction part performs positioning by contacting with a portion other than the turning shaft of the turning restriction part and thus, influence of variation of dimension or the like of the turning shaft can be reduced and positional accuracy of the tip end of the lever part in a state that the turning restriction part does not contact with the protruded part can be stabilized.

Further, in the present invention, it is preferable that, in the valve drive device, the second contact part of the lever part is located on an outer peripheral side in the radial direction of the driven gear and is formed to be a curved surface which is extended along a circumferential direction of the driven gear.

In this embodiment, the second contact part of the lever part is located on an outer peripheral side in the radial direction of the driven gear and is formed to be a curved surface which is extended along a circumferential direction of the driven gear. Therefore, the second contact part is contacted with the protruded part and is turned to an inner side in the radial direction of the driven gear and, when the protruded part is separated from the second contact part, in comparison with a case that the second contact part is formed in a straight shape, the curved surface of the second contact part can be located at a closer position to the protruded part to be contacted next. In other words, the second contact part contacted with the protruded part is separated from the protruded part at a position which is close to the position restricted by the lever turning restriction part. Therefore, in comparison with a case that the second contact part is formed in a straight shape, when the protruded part is separated from the second contact part, a force generated when the second contact part and the lever turning restriction part are contacted with each other can be made weak. As a result, generation of noise at a time when the second contact part and the lever turning restriction part are contacted with each other in turning operation of the turning restriction part can be restrained.

Further, in the present invention, it is preferable that, in the valve drive device, the driven gear is formed with a protruded shape part which is protruded to an outer side in the radial direction and is protruded from a face on one side of the driven gear in an axial direction of the driven gear, and an inner side in the protruded shape part in the radial direction of the driven gear is formed with the lever turning restriction part.

In this embodiment, the above-mentioned operations and effects can be obtained in the region based on the structure in which the lever turning restriction part is formed on an inner side in the radial direction of the protruded shape part provided in the driven gear.

Further, in the present invention, it is preferable that, in the valve drive device, when the protruded part contacts with the second contact part and the lever part is turned to an inner side in the radial direction against the urging force, the driven gear is provided with a co-turning prevention part which restricts that, when the second contact part is pushed by the protruded part in a turning direction of the protruded part, the driven gear is turned in a direction corresponding to a turning direction of the drive gear.

In this embodiment, an accompanying turning of the driven gear by the drive gear can be restricted by the co-turning prevention part and thus, an idling state of the drive gear is maintained and the power non-transmission state can be maintained surely.

Further, in the present invention, it is preferable that, in the valve drive device, the turning restriction part is provided with a foot part provided on an opposite side to the lever part of the turning shaft in an axial direction of the turning shaft, and the foot part restricts an inclination of the turning shaft by the urging force which urges the lever part.

In this embodiment, the turning restriction part is provided with a foot part provided on an opposite side to the lever part of the turning shaft in an axial direction of the turning shaft, and the foot part restricts an inclination of the turning shaft by the urging force which urges the lever part and thus, an inclination of the turning shaft can be restrained. Therefore, power transmission switching in the power transmission switching part can be performed smoothly.

Further, in the present invention, it is preferable that, in the valve drive device, the foot part is extended to an opposite direction to a direction that the lever part is urged.

In this embodiment, the phrase that "the foot part is extended to an opposite direction to a direction that the lever part is urged" includes, in addition to the direction reversed by 180 degrees with respect to the urging direction, a direction extended in a direction whose vector component of force is applied to an opposite direction to the urging direction.

In this embodiment, the lever part is urged by an urging force. Therefore, a turning moment which inclines the turning shaft with respect to an axial direction is generated in the turning shaft by the urging force. The foot part in this embodiment is extended to an opposite direction to a direction where the lever part is urged and thus, when the turning shaft is going to be inclined by the turning moment, the foot part is pressed against the driven gear and an inclination of the turning shaft can be restricted surely.

Further, in the present invention, it is preferable that, in the valve drive device, the foot part is extended from the turning shaft toward an inner side in the radial direction of the driven gear.

In this embodiment, in order to structure that the lever part is capable of engaging with the protruded part of the drive gear, the turning restriction part is required to be provided in the driven gear at a position close to an outer peripheral side in the radial direction of the driven gear. Therefore, when the foot part is structured so as to extend from the turning shaft toward an outer side in the radial direction of the driven gear, a length of the foot part becomes short.

According to this embodiment, the foot part is extended from the turning shaft toward an inner side in the radial direction of the driven gear and thus, in comparison with a case that the foot part is extended to an outer side in the radial direction, a length of the foot part can be made long. As a result, the turning shaft can be hard to be inclined.

Effects of the Invention

According to the present invention, in a valve drive device including a valve body drive mechanism structured to drive a valve body, the valve drive device is capable of reducing noise when the valve body is driven and of smoothly performing power switching and, in addition, when a fluid is flowed through an inside of the valve drive device, a possibility that a foreign matter enters into a portion of the valve body drive mechanism performing power transmission switching to cause an operation failure can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 31A shows a state before turning of a lever part is started and FIG. 31B shows a state that the lever part has been turned.

FIG. 33A shows a state before turning of a lever part is started and FIG. 33B shows a state that the lever part has been turned.

DETAILED DESCRIPTION

Figure 1:
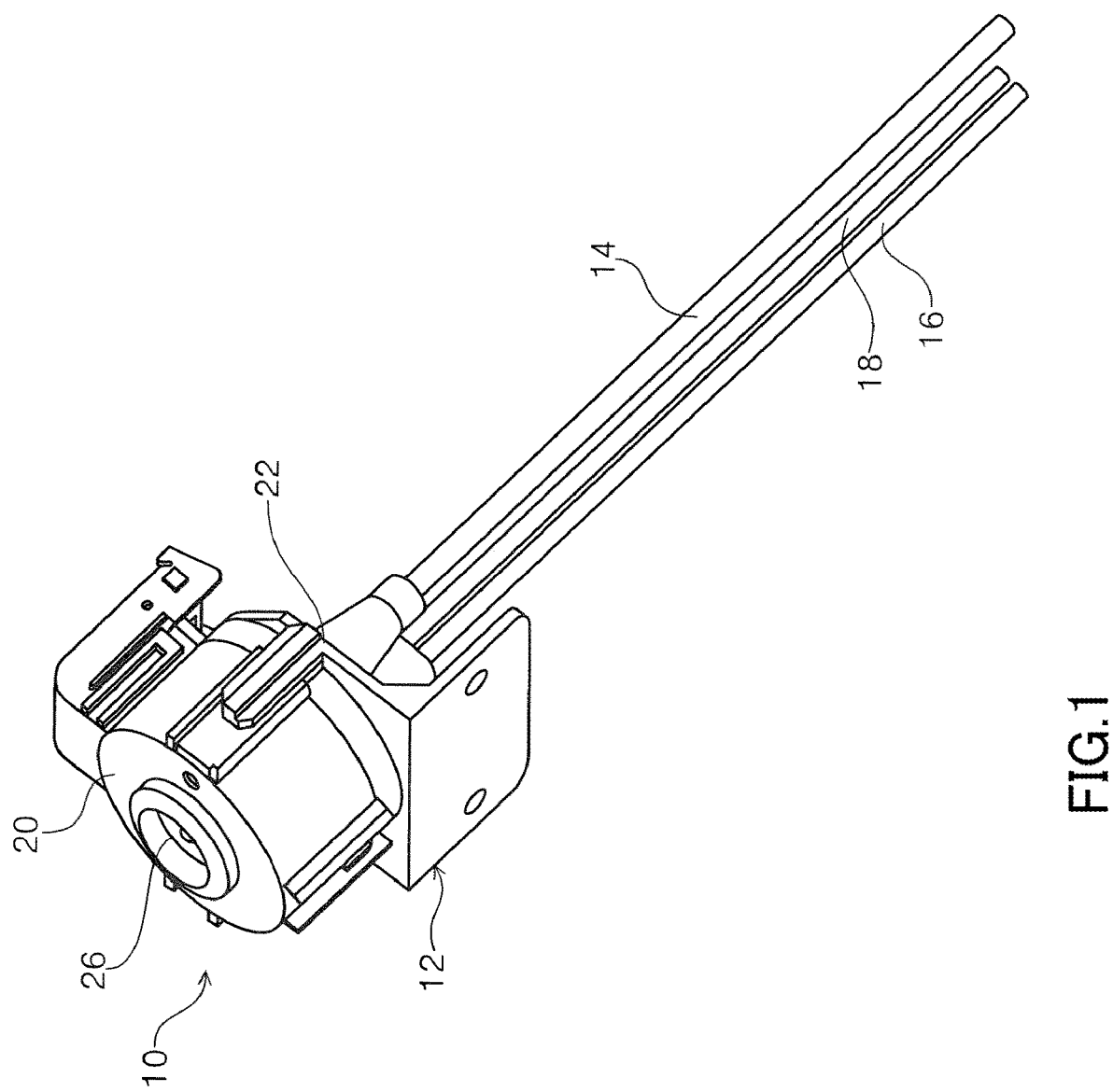
FIG. 1 is a perspective view showing a valve drive device in accordance with an embodiment of the present invention.

Embodiments of the present invention will be described below with reference to the accompanying drawings. In respective embodiments, the same reference signs are used in the same structures and the structures are described only in a first embodiment and their descriptions in the following embodiments are omitted.

In the following descriptions, in order to easily understand the structure, a specific structure of a foreign matter entry restraining part and an interference avoiding part will be described later and, first, a general structure of a valve drive device is described which is capable of reducing noise when a valve body is driven and of performing smooth power transmission switching.

Then, after the description of the general structure of a valve drive device, a specific structure of a foreign matter entry restraining part will be described in detail below which is provided for reducing a possibility that, when a fluid is flowed in an inside of the valve drive device, a foreign matter enters to a portion where power transmission switching of the valve body drive mechanism is performed to cause an operation failure.

Next, a specific structure and the like of an interference avoiding part will be described in detail below.

Embodiments

[Summary of Valve Drive Device]

A valve drive device 10 in accordance with an embodiment of the present invention will be described below with reference to FIGS. 1 through 4. The valve drive device 10 is, as an example, mounted on a refrigerator to adjust a supply amount of refrigerant (fluid) for cooling an inside of a chamber. The valve drive device 10 includes a valve main body 12, an inflow pipe 14 extended from the valve main body 12, a first outflow pipe 16 and a second outflow pipe 18 extended in parallel to the inflow pipe 14, and a cover member 20 which covers an upper part of the valve main body 12. In the following descriptions, for convenience, an extended direction of the inflow pipe 14, the first outflow pipe 16 and the second outflow pipe 18 is defined as an upper and lower direction, and it is defined that the valve main body 12 is located on an upper side, and the inflow pipe 14, the first outflow pipe 16 and the second outflow pipe 18 are located on a lower side.

Figure 2:
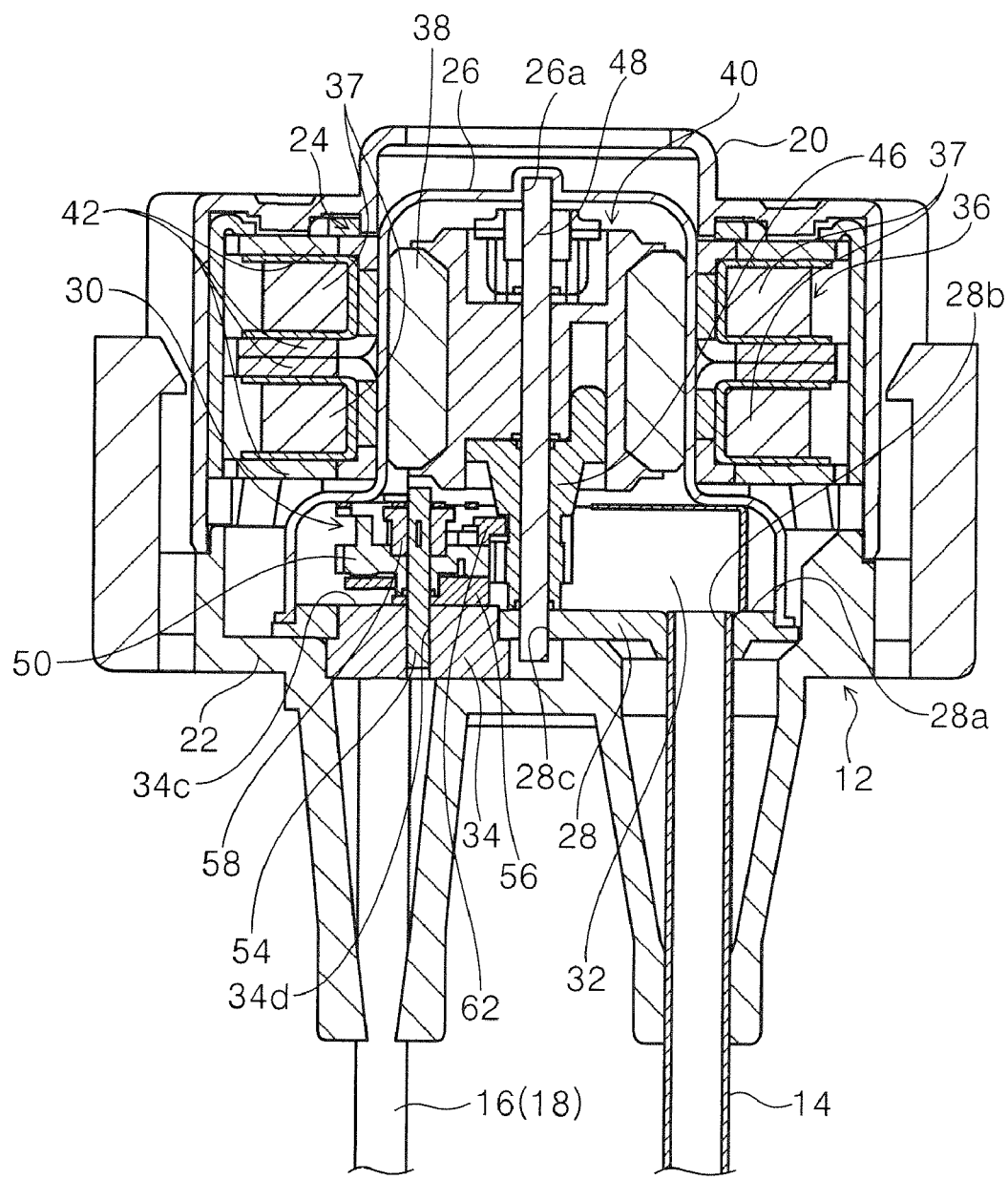
FIG. 2 is a side cross-sectional view showing a valve drive device in accordance with an embodiment of the present invention.

In FIG. 2, the valve main body 12 includes a base member 22, a motor 24, a seal cover 26, a base main body 28, and a valve body drive mechanism 30. The base main body 28 has an upper face 28a. The base main body 28 is attached with the inflow pipe 14, the first outflow pipe 16 and the second outflow pipe 18 respectively. The seal cover 26 is attached to an upper part of the base main body 28. The base main body 28 and the seal cover 26 structure a valve chamber 32.

Figure 3:
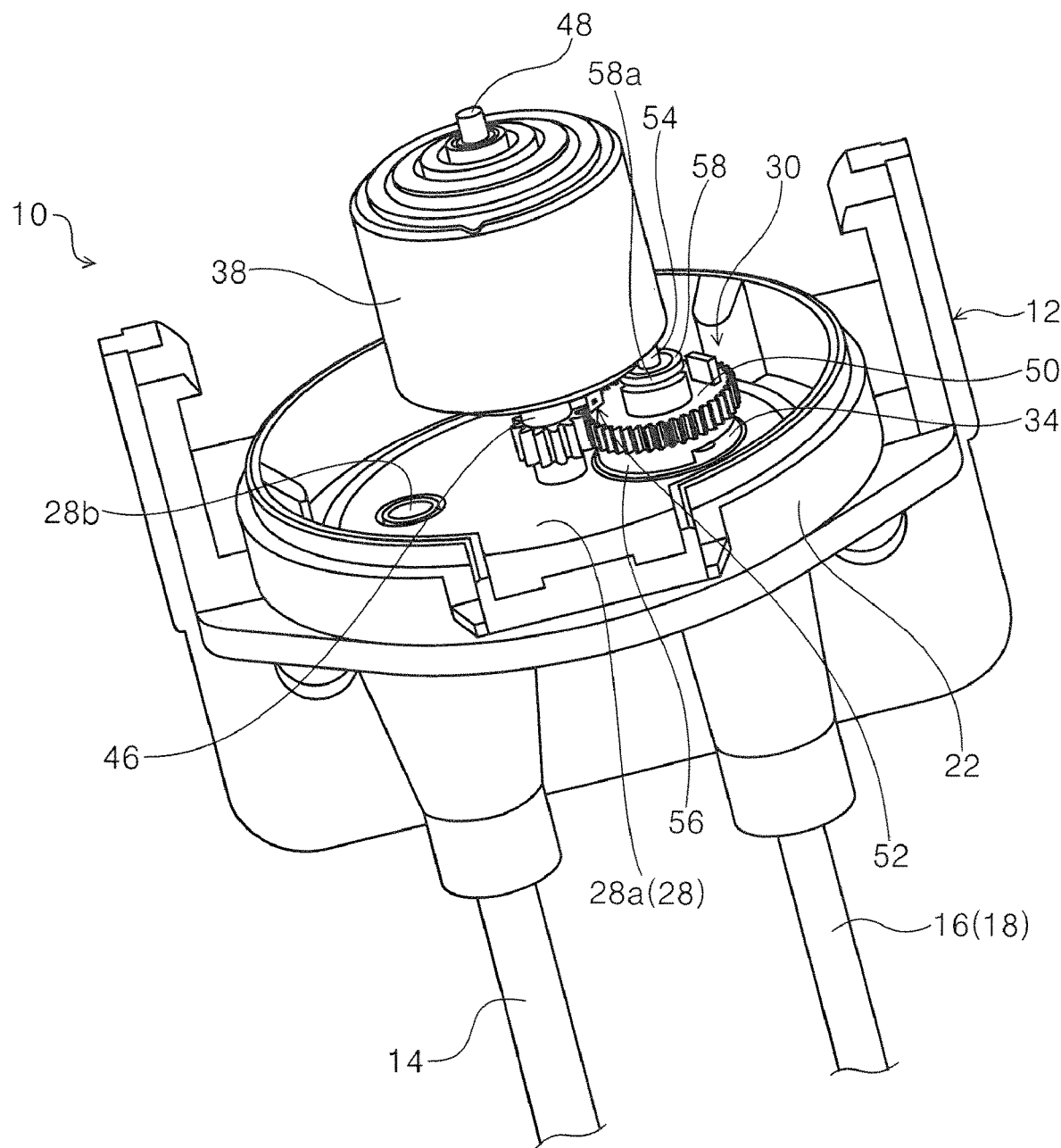
FIG. 3 is a perspective view showing a valve body drive mechanism in the valve drive device.

As shown in FIG. 3, the upper face 28a is formed with a fluid inlet 28b. The fluid inlet 28b is communicated with the inflow pipe 14 which is attached to the base main body 28. Refrigerant (fluid) is supplied into the valve chamber 32 through the inflow pipe 14.

The base main body 28 is attached with a valve seat constituting member 34 (FIGS. 2, 3 and 7, and FIGS. 15 through 17). The first outflow pipe 16 and the second outflow pipe 18 are respectively attached to the valve seat constituting member 34, and the valve seat constituting member 34 is provided with a first fluid outlet 34a communicated with the first outflow pipe 16 and a second fluid outlet 34b communicated with the second outflow pipe 18. A fluid supplied into the valve chamber 32 through the inflow pipe 14 is flowed out to the first outflow pipe 16 through the first fluid outlet 34a, or flowed out to the second outflow pipe 18 through the second fluid outlet 34b.

As shown in FIG. 2, the motor 24 includes a stator 36 and a rotor 40 to which a drive magnet 38 is attached. The stator 36 is disposed so as to surround a periphery of the rotor 40 with the seal cover 26 interposed therebetween.

In this embodiment, the stator 36 includes core members 42 as shown in FIG. 2. A winding is wound around the core member 42 of the stator 36 as a drive coil 37. One end of the drive coil 37 (winding) wound in the stator 36 is bound and connected with one end of a motor terminal not shown. Motor terminals not shown are electrically connected with a connector, a circuit board or the like not shown to supply power to the stator 36.

As shown in FIGS. 2 and 3, the rotor 40 includes the drive magnet 38, a drive gear 46 and a support shaft 48. The drive gear 46 and the drive magnet 38 are rotatably attached to the support shaft 48. The drive magnet 38 is attached to the drive gear 46. An upper end of the support shaft 48 is supported by a bearing part 26a formed in the seal cover 26, and a lower end of the support shaft 48 is supported by a bearing part 28c formed in the base main body 28. In this embodiment, when the stator 36 (drive coil 37) is excited, the rotor 40 is rotated in an inside of the valve chamber 32 by the drive magnet 38 with the support shaft 48 as a rotating center.

[Summary of Valve Body Drive Mechanism]

Figure 4:
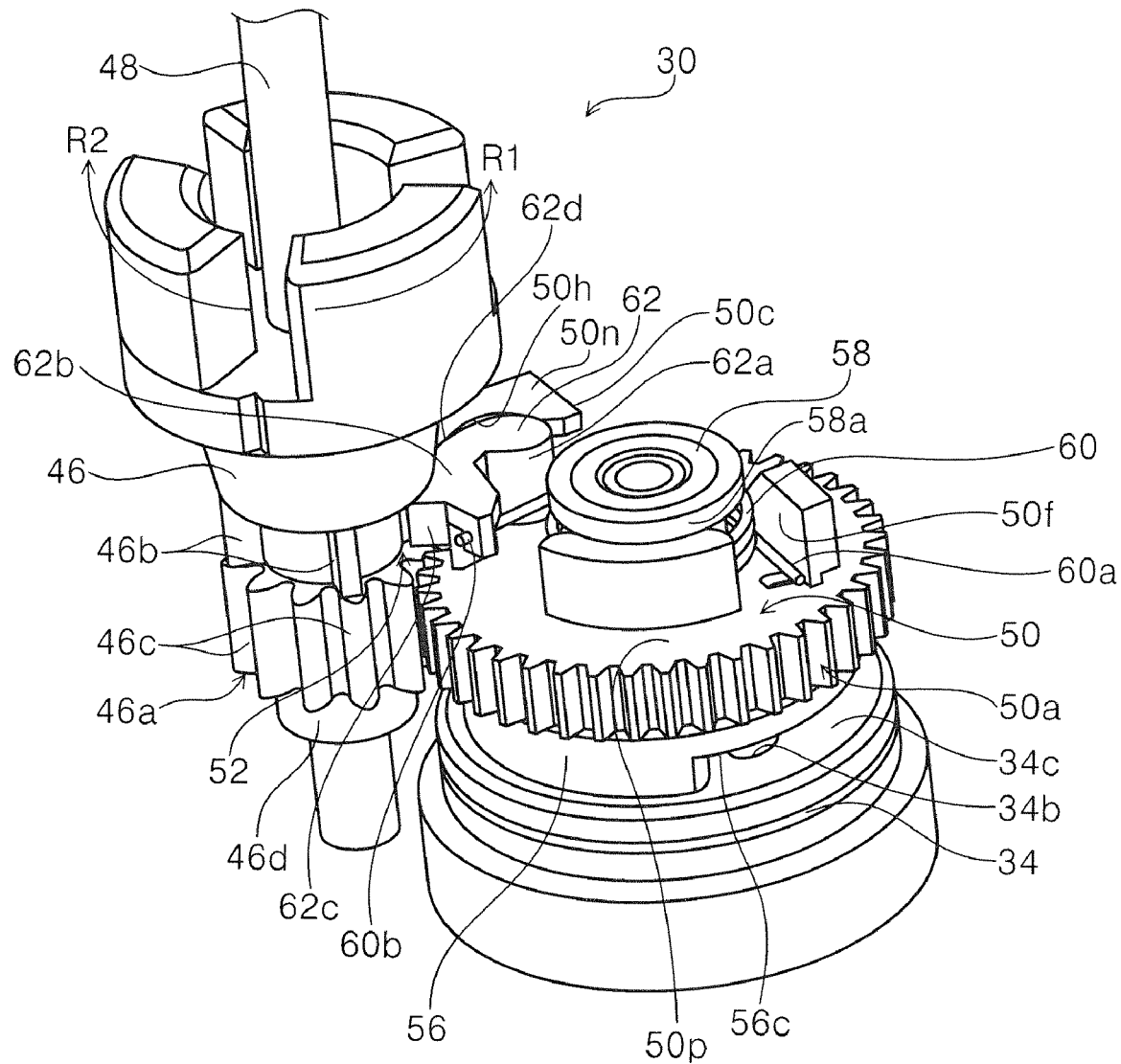
FIG. 4 is a perspective view showing a valve body drive mechanism in the valve drive device.

A structure of a valve body drive mechanism 30 will be described below with reference to FIGS. 3 through 12. As shown in FIGS. 3 and 4, the valve body drive mechanism 30 includes the motor 24, the drive gear 46, a driven gear 50 and a power transmission switching part 52. The power transmission switching part 52 is, as described below, structured so that power transmission between the drive gear 46 and the driven gear 50 can be switched to a power transmission state that power is transmitted and a power non-transmission state that the power is not transmitted. In this embodiment, the power transmission switching part 52 includes a protruded part 46b of the drive gear 46 and a turning restriction part 62 described below.

Figure 5:
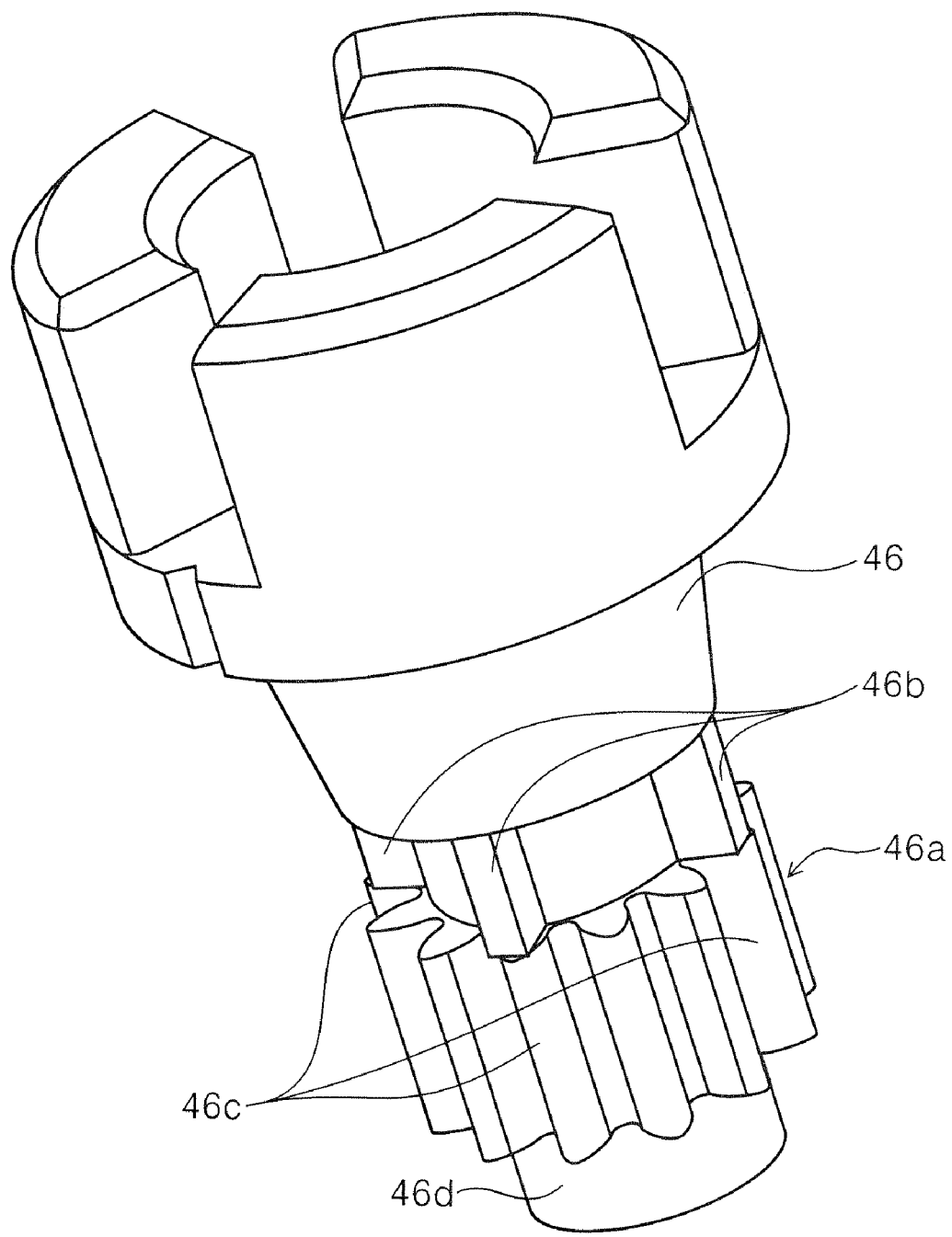
FIG. 5 is a perspective view showing an output side gear in the valve body drive mechanism.
Figure 6:
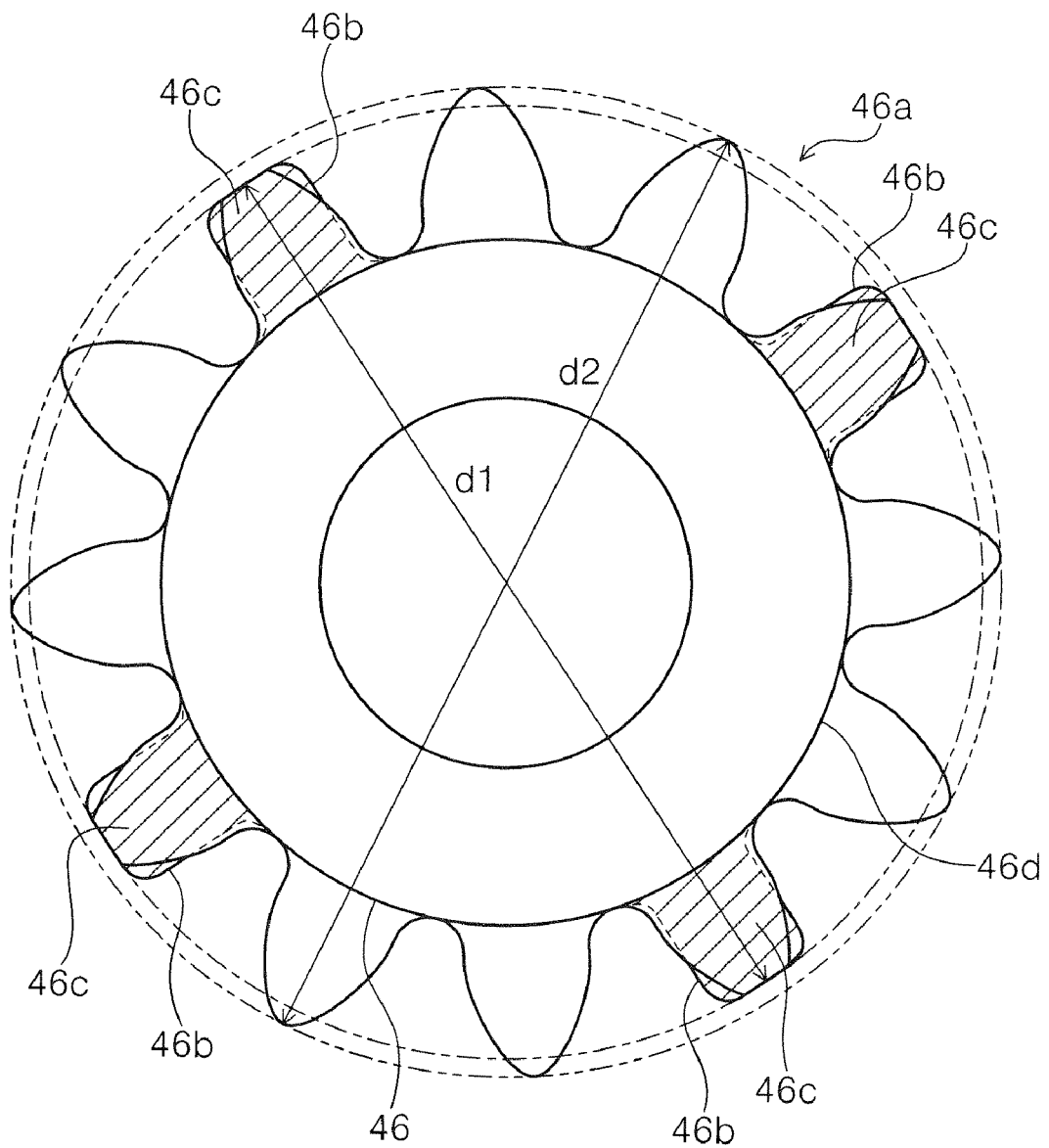
FIG. 6 is a plan view showing the output side gear.

As shown in FIGS. 5 and 6, the drive gear 46 is formed with a gear part 46a on a lower end part. A plurality of the protruded parts 46b is formed on an upper side with respect to the gear part 46a. A tooth of the gear part 46a corresponding to the protruded part 46b in a circumferential direction of the drive gear 46 is structured as a lock avoiding tooth 46c.

A plurality of the protruded parts 46b is protruded from a main body 46d of the drive gear 46 to an outer side in a radial direction of the drive gear 46. In this embodiment, the protruded part 46b is, as an example, formed in a flat plate shape. In this case, a shape of the protruded part 46b is not limited to a flat plate shape and may be formed in a shape which is engageable with a turning restriction part 62 described below. In this embodiment, a plurality of the protruded parts 46b is respectively formed at positions corresponding to an "N"-pole or an "S"-pole of the drive magnet 38 in the circumferential direction of the drive gear 46.

In this embodiment, the number of magnetic poles of the drive magnet 38 is, as an example, 8 (eight) poles. Therefore, in this embodiment, the protruded part 46b is provided at four positions in the drive gear 46. Specifically, the protruded part 46b is provided in the drive gear 46 at equal intervals in the circumferential direction of the drive gear 46 and, in this embodiment, the protruded parts 46b are formed at four positions and thus, the protruded parts 46b are provided at every 90 degrees (see FIGS. 18 through 21). In this embodiment, the protruded part 46b is formed in a thickness corresponding to a tooth thickness of a tooth of the gear part 46a of the drive gear 46.

As shown in FIG. 6, in this embodiment, a tooth-tip circle diameter of the lock avoiding teeth 46c is set to "d1". On the other hand, in the gear part 46a, a tooth-tip circle diameter of teeth other than the lock avoiding teeth 46c is set to "d2". In this embodiment, the tooth-tip circle diameter "d1" is set to be smaller than the tooth-tip circle diameter "d2". In FIG. 6, the circle shown by the alternate long and short dash line indicates the tooth-tip circle diameter of the lock avoiding teeth 46c, and the circle shown by the two-dot chain line indicates the tooth-tip circle diameter of the teeth other than the lock avoiding teeth 46c.

Next, a structure of a driven gear 50 which is driven by the drive gear 46 will be described below. As shown in FIG. 2, a support shaft 54 is inserted into a center in a radial direction of the driven gear 50. The driven gear 50 is structured so as to be turnable with respect to the support shaft 54. A valve body 56 is provided on a lower side of the driven gear 50. In this embodiment, the valve body 56 is integrally structured with the driven gear 50 so as to be turnable with respect to the support shaft 54. The valve seat constituting member 34 is provided on a lower side with respect to the valve body 56. An upper face of the valve seat constituting member 34 is structured as a valve seat face 34*c*.

A through-hole 34*d* is provided at a center of the valve seat constituting member 34, and the support shaft 54 is inserted into the through-hole 34*d*. The support shaft 54 is not shown in FIG. 4. In FIG. 4, the arrow with the reference sign "R1" indicates a first direction which is one rotational direction of the drive gear 46, and the arrow with the reference sign "R2" indicates a second direction which is the other rotational direction of the drive gear 46.

A holding member 58 is attached to an upper part of the driven gear 50. The support shaft 54 is inserted into the holding member 58. Further, the holding member 58 is structured to be a cylindrical tube-shaped member which is formed with a flange part 58*a* in its upper part, and a tube-shaped part 58*b* is inserted into a torsion spring 60 as an "urging member" and the torsion spring 60 is held by the holding member 58. Further, the turning restriction part 62 in a lever shape is attached to an upper part of the driven gear 50.

[Driven Gear]

As shown in FIGS. 4 and 7 through 10, the driven gear 50 is formed on its outer peripheral portion with a meshing part 50*a* where a plurality of teeth are successively formed along a circumferential direction and a non-meshing part 50*b* where a tooth is not formed. Further, in the outer peripheral portion of the driven gear 50, a first turning restriction part 50*c* structured to restrict turning to the first direction "R1" side of the driven gear 50 is provided at an end part on the second direction "R2" side of the meshing part 50*a*, and a non-meshing part 50*b* is provided at an end part on the first direction "R1" side of the meshing part 50*a*.

Figure 8:
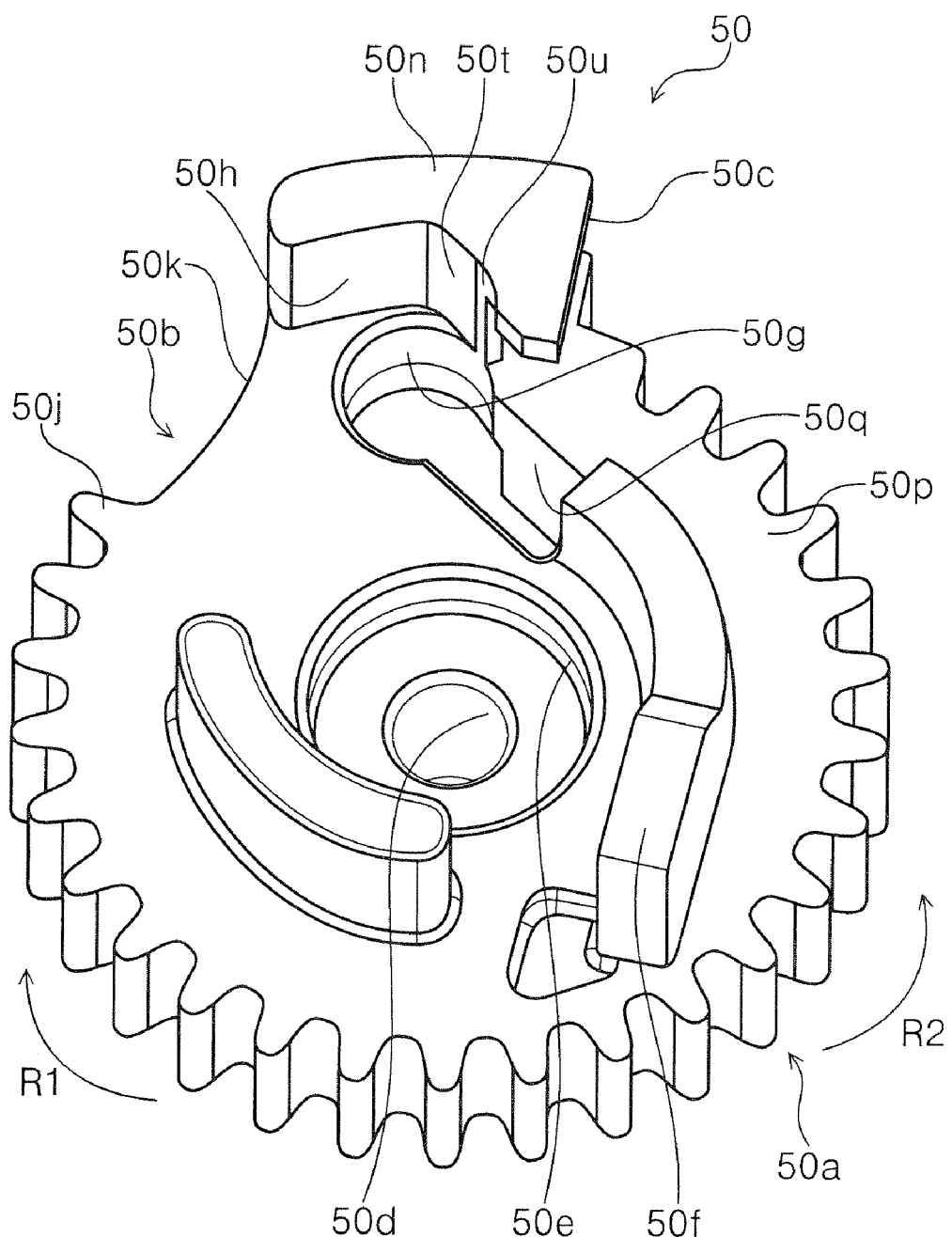
FIG. 8 is a perspective view showing a driven gear in the valve body drive mechanism which is viewed from an upper face side.
Figure 9:
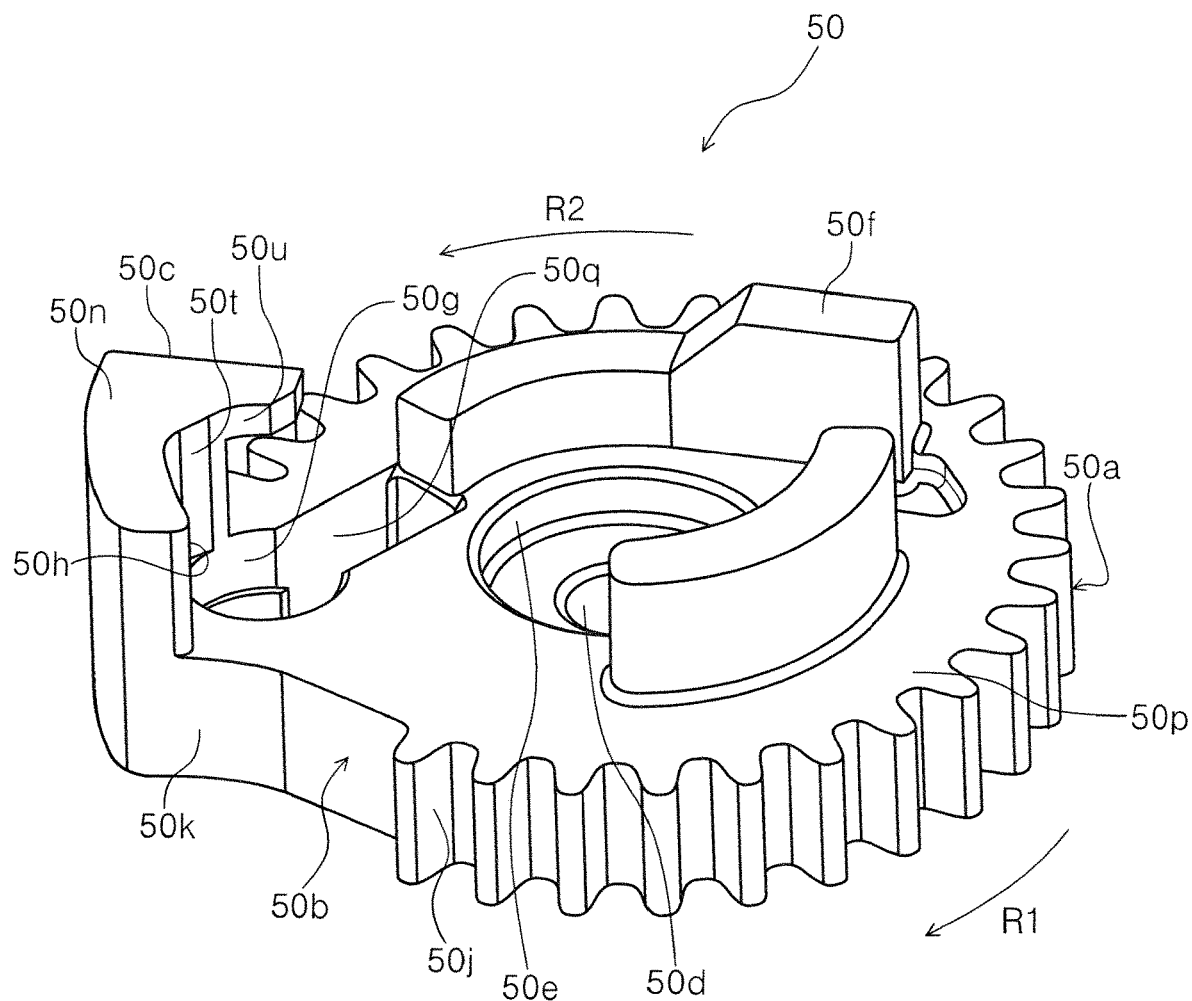
FIG. 9 is a perspective view showing the driven gear which is viewed from an upper face side and in a different direction from that in FIG. 8.

In addition, an end part on the first direction "R1" side of the non-meshing part 50*b* is provided with a second turning restriction part 50*k* as a "co-turning prevention part". In FIGS. 8 and 9, the arrow with the reference sign "R1" indicates a driven turning direction of the driven gear 50 when the drive gear 46 is rotated in the first direction, and the arrow with the reference sign "R2" indicates a driven turning direction of the driven gear 50 when the drive gear 46 is rotated in the second direction. In FIGS. 18 through 21, the reference sign of the second turning restriction part 50*k* is omitted.

Figure 15:
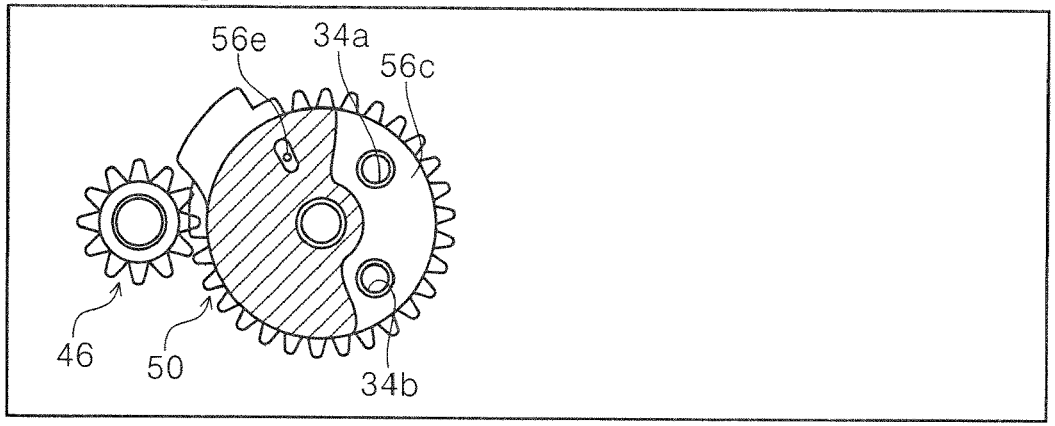
FIG. 15 is a view showing phase states between the output side gear and the driven gear and states of the valve body.
Figure 15:
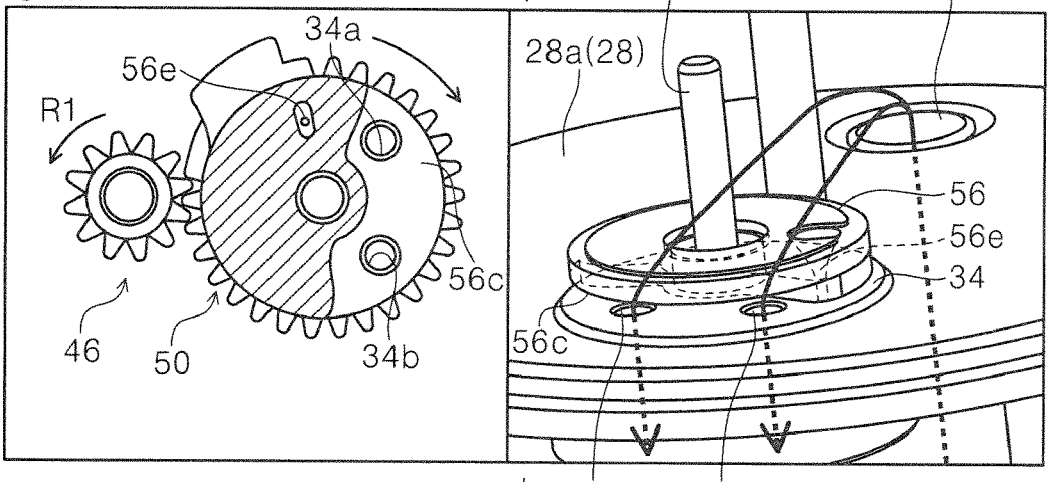
Figure 15:
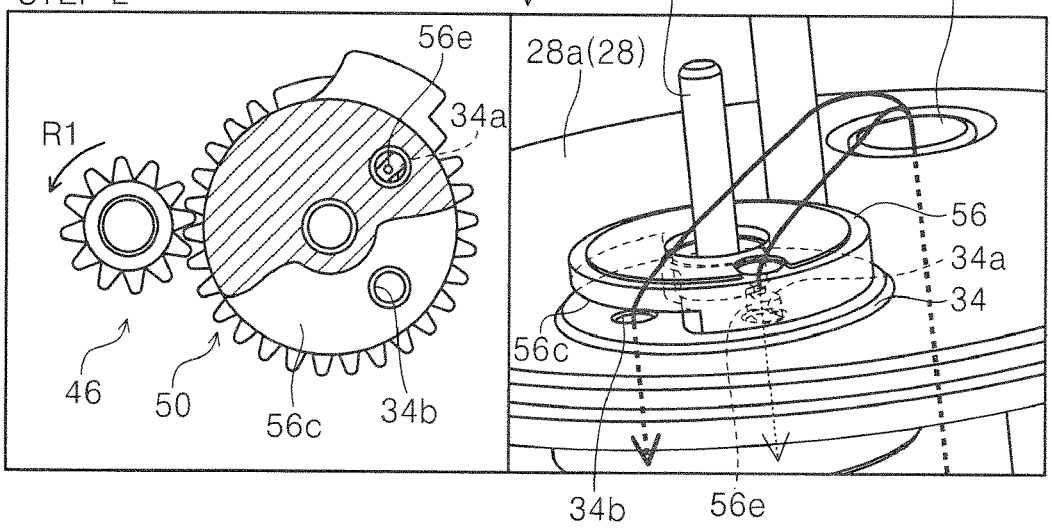

In this embodiment, as mainly shown in the step S0 in FIG. 15, when a reference circle diameter of the drive gear 46 is compared with a reference circle diameter of the driven gear 50, the reference circle diameter of the driven gear 50 is formed to be larger. In addition, the number of the teeth of the gear part 46*a* of the drive gear 46 is set to be smaller than the number of the teeth formed in the meshing part 50*a* of the driven gear 50. Therefore, in a power transmission state that the gear part 46*a* of the drive gear 46 and the meshing part 50*a* of the driven gear 50 are engaged with each other and turned together, rotation of the motor 24 can be transmitted to the driven gear 50 in a decelerated state and thus, a large torque can be obtained even when a small power source is used and a valve body 56 described below can be driven surely.

Further, as shown in FIGS. 7 through 10, a center part of the driven gear 50 is provided with a through-hole 50*d* into which the support shaft 54 is inserted. In addition, a recessed part 50*e* which receives a part of the holding member 58 and is engaged with the holding member 58 is formed around the through-hole 50*d* in an upper face 50*p* of the driven gear 50. The holding member 58 engaged with the recessed part 50*e* structures a shaft part of the driven gear 50 together with the support shaft 54 and holds the torsion spring 60.

In addition, a holding part 50*f* in a circular arc shape is provided on the upper face 50*p* of the driven gear 50 so as to surround the recessed part 50*e*. As shown in FIG. 4, the holding part 50*f* is structured so as to engage with one end 60*a* of the torsion spring 60 and hold the one end 60*a*. Further, the upper face 50*p* of the driven gear 50 is provided with a through-hole 50*g* as a "hole part", a lever turning restriction part 50*h* and a slit part 50*q*. The slit part 50*q* is communicated with the through-hole 50*g* and is, as an example, extended from the through-hole 50*g* toward an inner side in the radial direction of the driven gear 50. In this embodiment, the slit part 50*q* is set in a size so that a foot part 62*h* of the turning restriction part 62 described below can be inserted.

Figure 10:
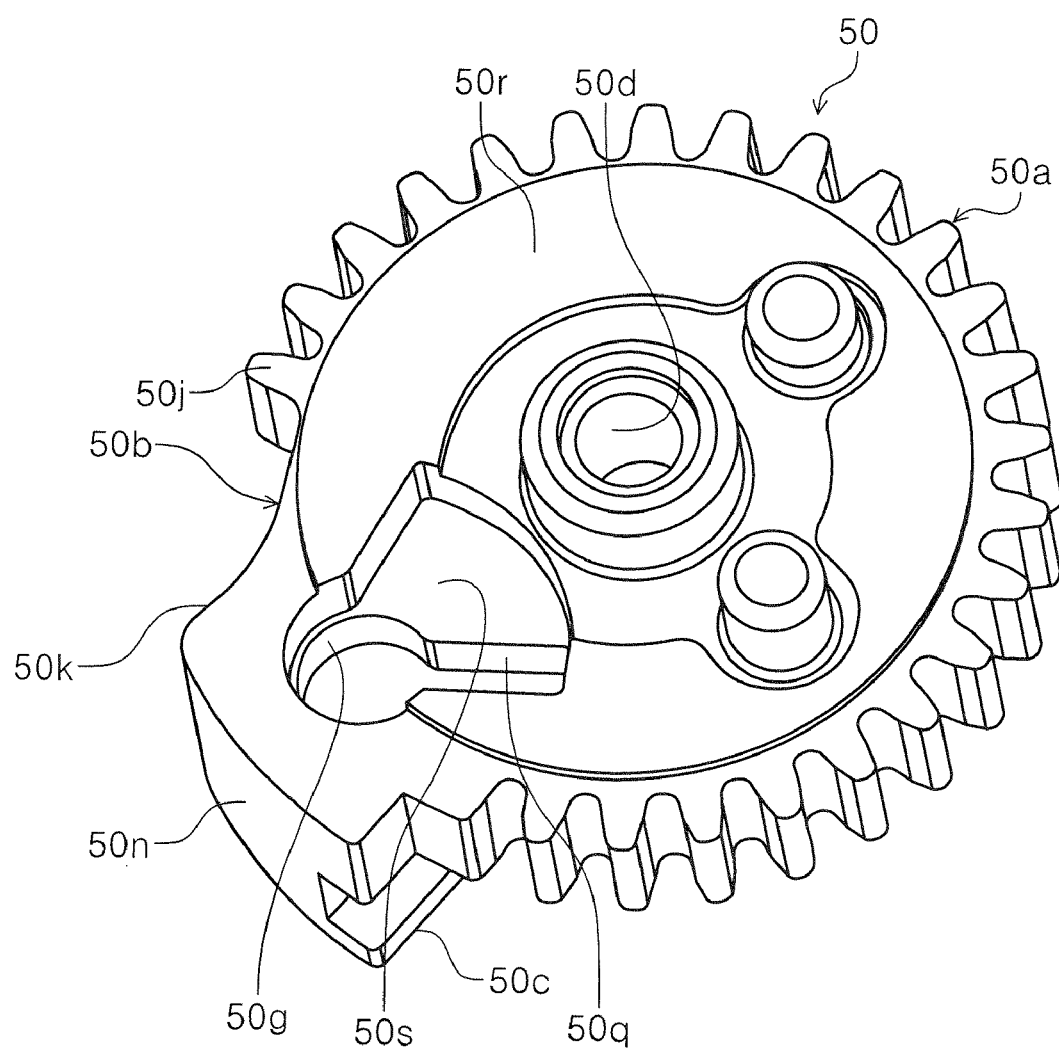
FIG. 10 is a perspective view showing the driven gear which is viewed from a bottom face side.

In FIG. 10, an under face 50*r* of the driven gear 50 is formed with a foot part accommodation part 50*s*. The foot part accommodation part 50*s* is communicated with the through-hole 50*g* and the slit part 50*q* in the under face 50*r*. The foot part accommodation part 50*s* is formed so as to permit turning of the foot part 62*h* when the foot part 62*h* of the turning restriction part 62 passed through the slit part 50*q* is turned with the turning shaft 62*a* as a support point. In this embodiment, the foot part accommodation part 50*s* is formed in the under face 50*r* as a fan-shaped recessed part extended to an inner side in the radial direction of the driven gear 50 with the through-hole 50*g* as a center. In this embodiment, the under face 50*r* is provided with the foot part accommodation part 50*s* in a recessed shape and thus, the foot part 62*h* can be prevented from protruding from the under face 50*r* and the size of the valve body drive mechanism 30 can be reduced.

Figure 24:
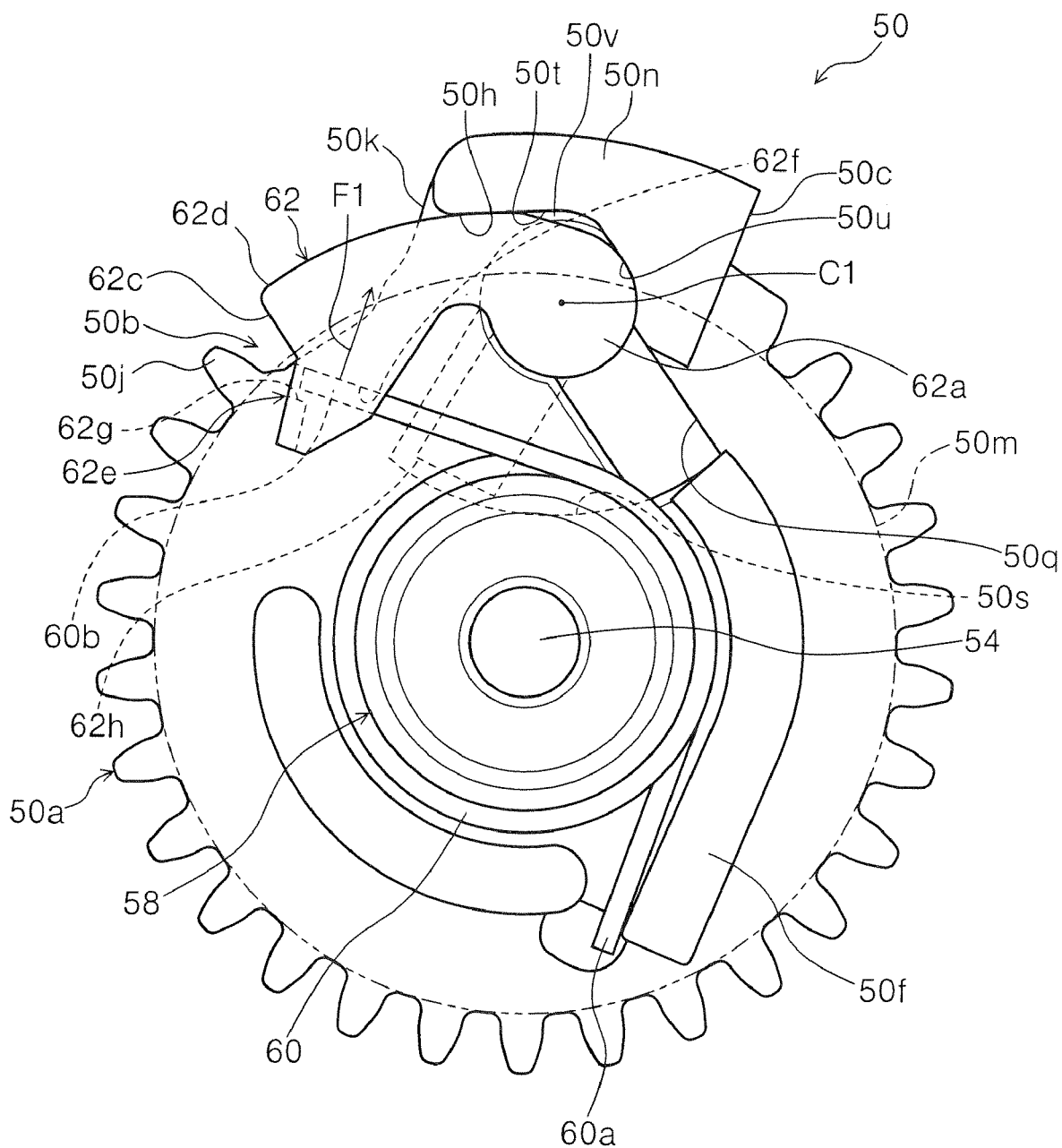
FIG. 24 is a view showing a relationship of a center position of a turning shaft of the turning restriction part with respect to the driven gear.

In FIGS. 8, 9 and 24, the driven gear 50 is formed with a protruded shape part 50*n* which is protruded to an upper side from the upper face 50*p* and is protruded toward an outer side in the radial direction. The first turning restriction part 50*c* is formed on one side of the protruded shape part 50*n* in the circumferential direction of the driven gear 50, and the second turning restriction part 50*k* is formed on the other side of the protruded shape part 50*n*. The lever turning restriction part 50*h* is formed in the protruded shape part 50*n* on an inner side in the radial direction of the driven gear 50. The lever turning restriction part 50*h* of the protruded shape part 50*n* is formed in a recessed shape toward an outer side in the radial direction so as to receive a part of the turning shaft 62*a* and a part of the lever part 62*b* of the lever-shaped turning restriction part 62.

At least a part of the through-hole 50*g* is provided in a recessed portion of the protruded shape part 50*n* which is recessed toward an outer side in the radial direction. In FIG. 24, the circle indicated by the two-dot chain line with the reference sign 50*m* is a tooth-bottom circle of the teeth of the meshing part 50*a* of the driven gear 50. In this embodiment, a part of the through-hole 50*g* is located on an outer side in the radial direction with respect to the tooth-bottom circle 50*m*. As a result, the through-hole 50*g* can be disposed in a portion which is close to an outer periphery in the radial direction of the driven gear 50 and thus, a length of the foot part 62*h* of the turning restriction part 62 described below can be set longer.

In addition, the protruded shape part 50*n* is formed with a relief part 50*t* on the first direction "R1" side of the lever turning restriction part 50h and a support face 50u on the first direction "R1" side of the relief part 50t. As shown in FIG. 24, the relief part 50t is structured to be recessed to an outer side in the radial direction of the driven gear 50 with respect to the lever turning restriction part 50h so as not to contact with the turning shaft 62a of the turning restriction part 62 in the protruded shape part 50n. As a result, as shown in FIG. 24, a gap space 50v is formed between the turning shaft 62a and the relief part 50t in a state that the turning restriction part 62 is contacted with the lever turning restriction part 50h. In FIGS. 18 through 21, the gap space 50v is not shown.

As shown in FIG. 24, in this embodiment, since the gap space 50v is provided, the lever turning restriction part 50h and the turning shaft 62a are set in a separated state from each other and a contact position of the lever turning restriction part 50h with the second contact part 62d of the turning restriction part 62 can be set in a separated position from the turning shaft 62a.

For example, in a case that the relief part 50t is not provided, the turning shaft 62a and the lever turning restriction part 50h are contacted with each other and thus, due to dimensional variation of the turning shaft 62a in manufacturing, a tip end position of the lever part 62b becomes unstable in its turning direction. As a result, a contact position with the protruded part 46b of the drive gear 46 becomes unstable and thus, the position in a power non-transmission state in the power transmission switching part 52 becomes unstable. In this embodiment, the relief part 50t forms the gap space 50v with respect to the turning shaft 62a and thus, influence of dimensional variation of the turning shaft 62a in manufacturing can be reduced and the tip end position of the lever part 62b can be stabilized.

The support face 50u is formed so as to be flush with a part of an inner circumferential face of the through-hole 50g and is extended from the through-hole 50g to an upper part of the protruded shape part 50n located on an upper part of the through-hole 50g. Therefore, the turning shaft 62a is supported by the support face 50u along an axial direction.

[Turning Restriction Part]

Figure 11:
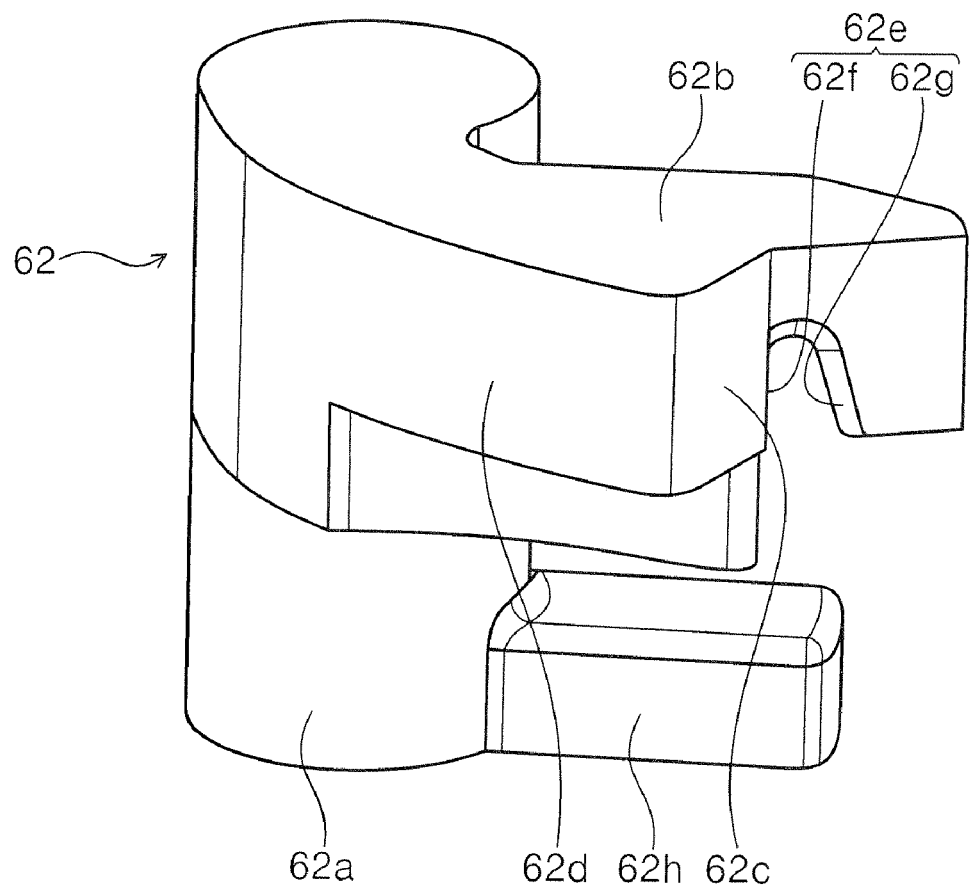
FIG. 11 is a perspective view showing a turning restriction part in the valve body drive mechanism.
Figure 12:
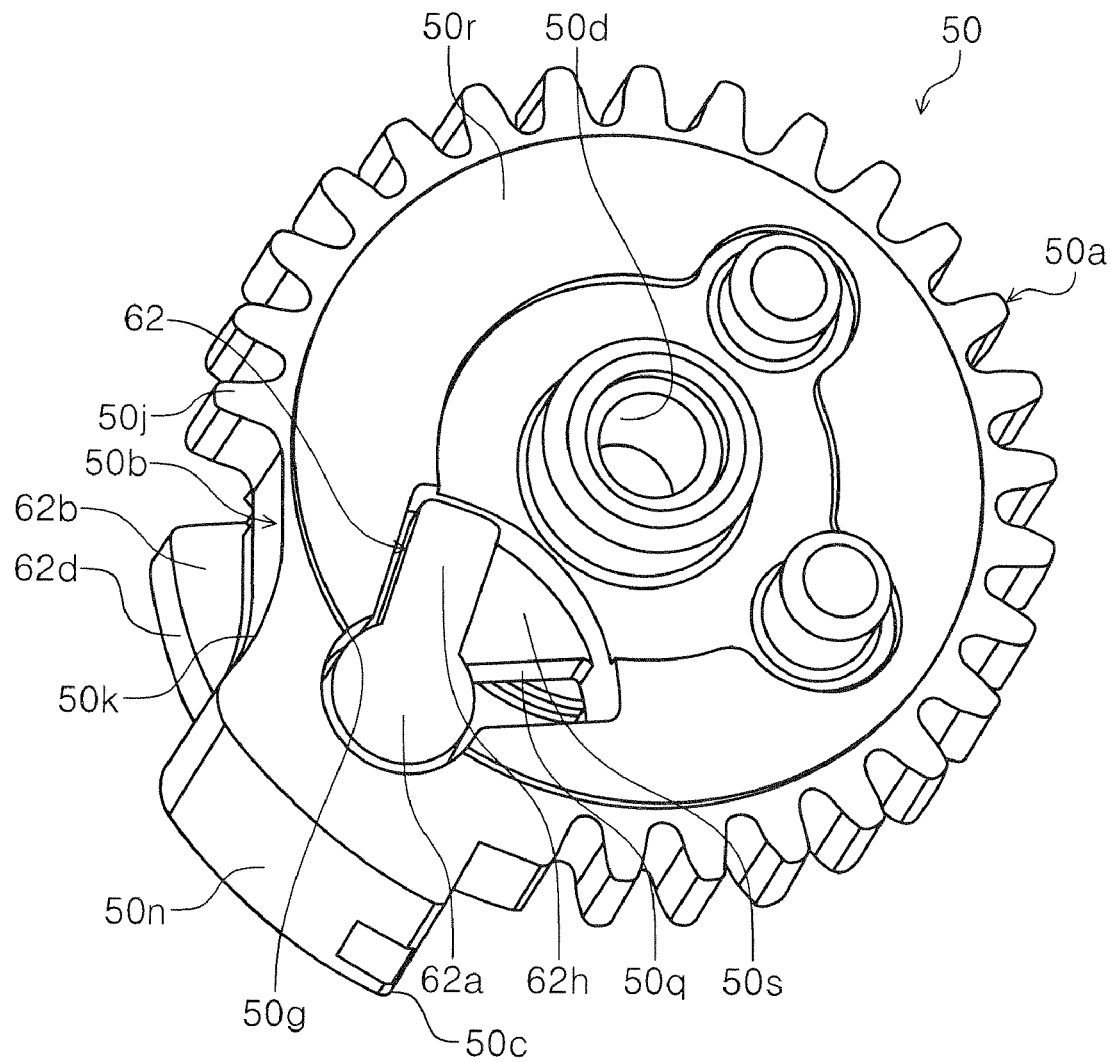
FIG. 12 is a perspective view showing a relationship between a foot part of the turning restriction part and a foot part accommodation part of the driven gear.

As shown in FIG. 11, the turning restriction part 62 is provided with the turning shaft 62a, the lever part 62b and the foot part 62h. The lever part 62b is provided with a first contact part 62c, a second contact part 62d and a spring holding part 62e. The spring holding part 62e is provided with a spring contact part 62f as an "urging member contact part" and a spring coming-off prevention part 62g.

As shown in FIG. 4, the turning restriction part 62 is turnably attached in the upper part of the driven gear 50. Specifically, the turning shaft 62a and the foot part 62h of the turning restriction part 62 are inserted into the through-hole 50g and the slit part 50q of the driven gear 50 (FIG. 8). The turning restriction part 62 is structured so that the turning shaft 62a is turnable with respect to the driven gear 50.

The point with the reference sign "C1" (FIG. 24) indicates a turning center of the turning shaft 62a of the turning restriction part 62. In this embodiment, the turning restriction part 62 is attached to the driven gear 50 so that the turning center "C1" of the turning shaft 62a is located on an inner side in the radial direction of the tooth-bottom circle 50m of the driven gear 50.

As shown in FIGS. 11 and 24, in this embodiment, the lever part 62b is provided on one end side in the axial direction of the turning shaft 62a, and the foot part 62h is provided on the other end side. In this embodiment, the lever part 62b is formed to be a circular arc-shaped lever which is extended from the turning shaft 62a. When the turning restriction part 62 is attached to the driven gear 50, the second contact part 62d of the lever part 62b is formed on the outer side in the radial direction with respect to the driven gear 50. In this embodiment, the second contact part 62d is structured to be a curved surface which is extended along a circumferential direction of the driven gear 50. A tip end of the lever part 62b is formed with the first contact part 62c and the spring holding part 62e.

As shown in FIG. 24, the other end 60b of the torsion spring 60 is contacted with a spring contact part 62f of the spring holding part 62e of the lever part 62b of the turning restriction part 62, and the lever part 62b is pressed by the other end 60b of the torsion spring 60. The spring coming-off prevention part 62g of the spring holding part 62e is provided on an opposite side to the spring contact part 62f with the other end 60b of the torsion spring 60 interposed therebetween. The spring coming-off prevention part 62g prevents the other end 60b of the torsion spring 60 from coming off from the spring holding part 62e when the other end 60b of the torsion spring 60 contacting with the spring contact part 62f is separated from the spring contact part 62f according to a turning state of the turning restriction part 62. Therefore, the torsion spring 60 can be held with a simple structure.

In this embodiment, the spring contact part 62f is provided at a tip end of the lever part 62b. An urging force of the torsion spring 60 which urges the spring contact part 62f applies a turning moment in a clockwise direction in FIG. 24 to the turning restriction part 62. A magnitude of the turning moment is determined by a distance from the center "C1" of the turning shaft 62a to the spring contact part 62f and the urging force of the torsion spring 60. In this embodiment, the spring contact part 62f is provided at a tip end of the lever part 62b and thus, even when an urging force of the torsion spring 60 is small, a large torque can be obtained. As a result, when the lever part 62b of the turning restriction part 62 is separated from the protruded part 46b, the tip end of the lever part 62b can be surely returned by the urging force of the torsion spring 60 to a position restricted by the lever turning restriction part 50h which is a position before contacting with the protruded part 46b.

In this embodiment, the turning restriction part 62 receives an urging force of the torsion spring 60 so that the second contact part 62d of the lever part 62b contacts with the lever turning restriction part 50h of the driven gear 50 to press the lever turning restriction part 50h. In other words, the lever part 62b of the turning restriction part 62 is urged toward an outer side in the radial direction of the driven gear 50 by the urging force of the torsion spring 60, and turning of the turning restriction part 62 to the outer side in the radial direction is restricted at a position where the second contact part 62d and the lever turning restriction part 50h are contacted with each other.

On the other hand, when the second contact part 62d is pressed toward an inner side in the radial direction of the driven gear 50 against the urging force of the torsion spring 60, the turning restriction part 62 is turned toward the inner side in the radial direction of the driven gear 50 with the turning shaft 62a as a center. When pressing against the second contact part 62d to the inner side in the radial direction is released, the lever part 62b is turned by the urging force of the torsion spring 60 and returned to the position where the second contact part 62d and the lever turning restriction part 50h are contacted with each other.

In FIG. 24, the arrow with the reference sign "F1" indicates a direction in which the torsion spring 60 urges the spring contact part 62f. In this embodiment, the foot part 62h of the turning restriction part 62 is extended from the turning shaft 62a toward an opposite direction with respect to the urging direction "F1" by the other end 60b of the torsion spring 60. Specifically, the foot part 62h is extended from the turning shaft 62a toward an inner side direction in the radial direction of the driven gear 50. In this embodiment, the opposite direction to the urging direction "F1" includes, in addition to the direction where the urging direction "F1" is reversed by 180 degrees, a direction including a vector component to the opposite direction to the urging direction "F1" as a vector component of force.

Figure 25:
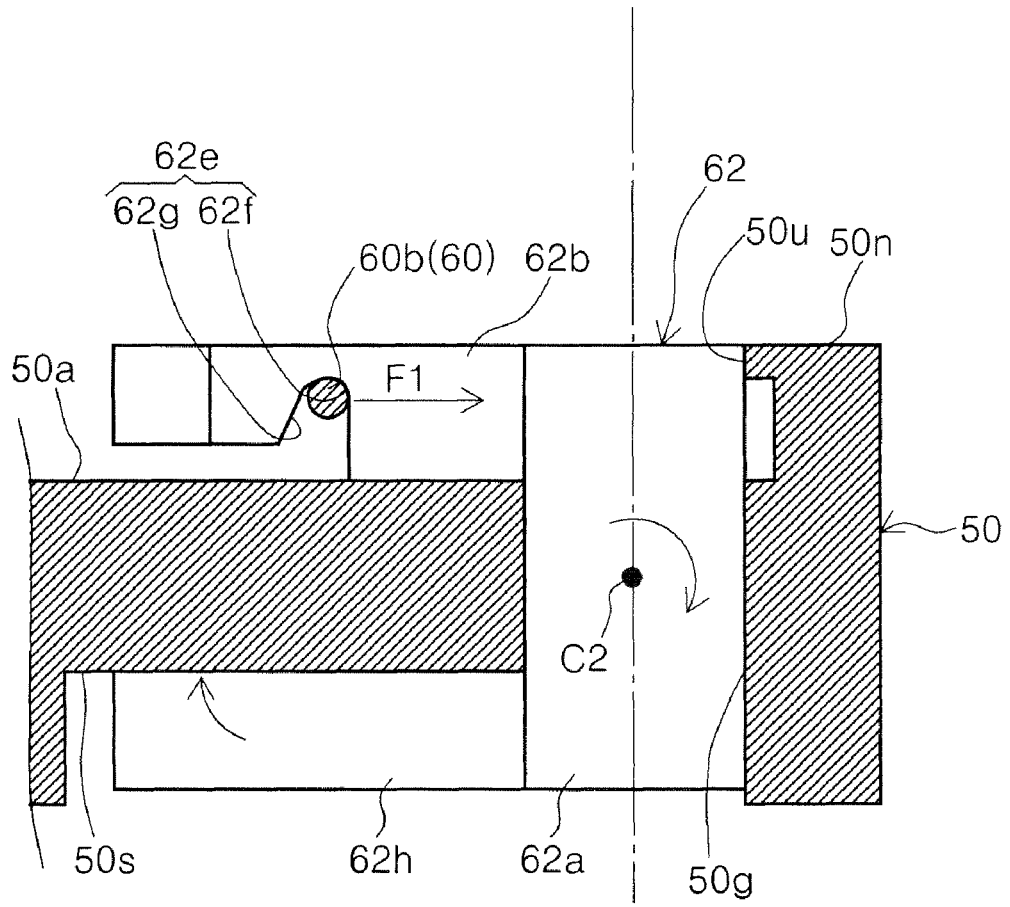
FIG. 25 is an explanatory schematic view showing a relationship between an urging force applied to the turning restriction part and a foot part.

In FIG. 25, when the torsion spring 60 urges the spring contact part 62f, the turning restriction part 62 is going to turn in a clockwise direction in FIG. 25 with the center "C2" in an axial direction of the turning shaft 62a as a center. However, in this embodiment, when the turning restriction part 62 is going to turn in the clockwise direction, the foot part 62h extended toward an opposite direction to the urging direction "F1" is pressed to the foot part accommodation part 50s to suppress an inclination of the turning shaft 62a and restrict turning of the turning restriction part 62. In addition, the support face 50u restricts the turning of the turning restriction part 62 similarly to the foot part 62h and restricts an inclination in the clockwise direction of the turning shaft 62a by supporting the turning shaft 62a.

Further, the foot part 62h is structured so as to extend from the turning shaft 62a toward an inner side direction in the radial direction of the driven gear 50 and thus, in comparison with a case that the foot part 62h is extended to an outer side direction in the radial direction of the driven gear 50, a length of the foot part 62h can be made longer. As a result, the turning shaft 62a can be hard to be inclined.

[Valve Body]

Figure 7:
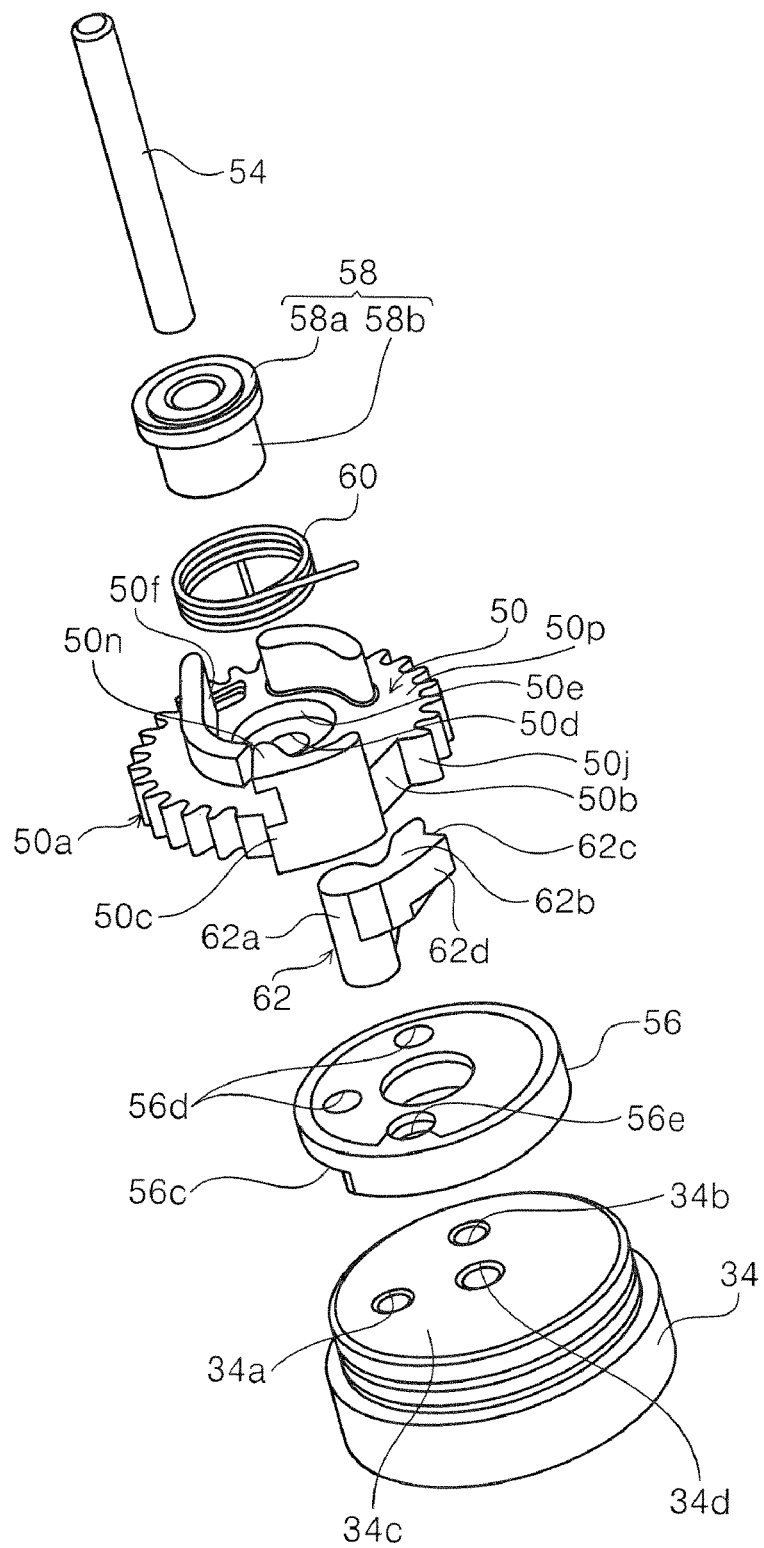
FIG. 7 is an exploded perspective view showing a driven portion in the valve body drive mechanism.
Figure 13A:
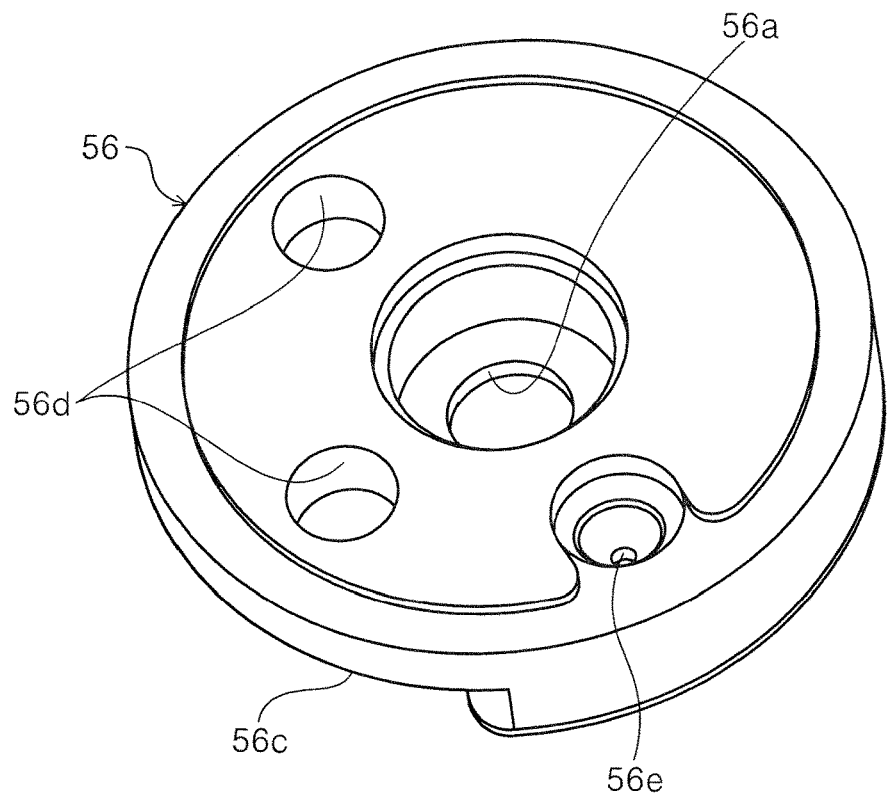
FIG. 13A is a perspective view showing a valve body viewed from an opposite side to a valve seat face.
Figure 13B:
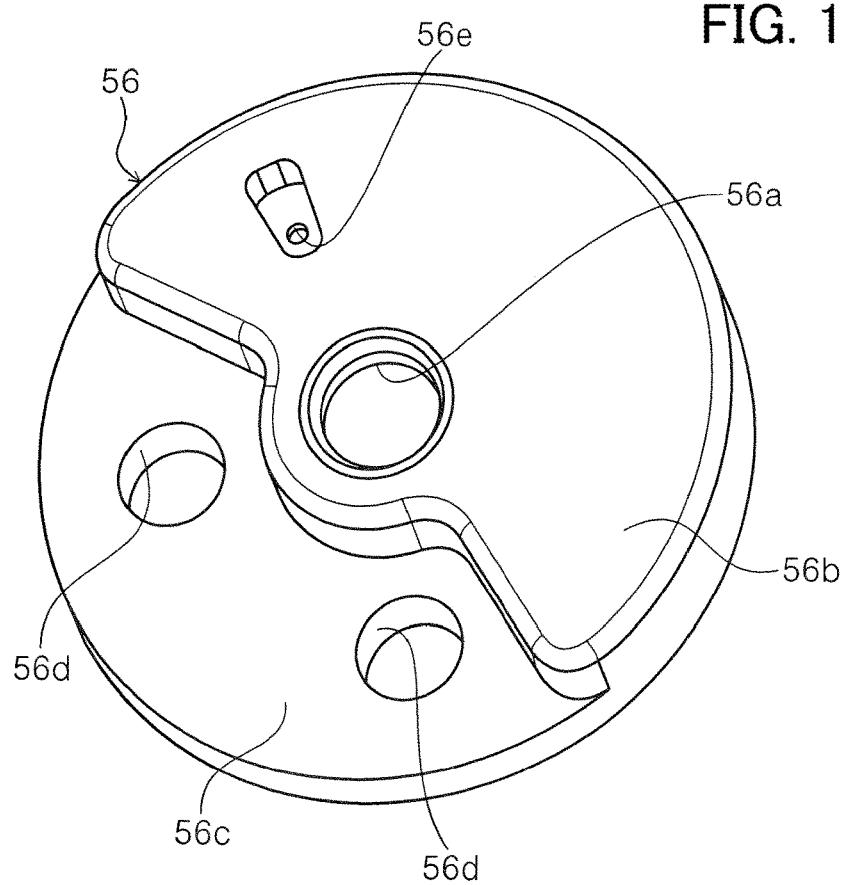
FIG. 13B is a perspective view showing the valve body viewed from the valve seat face side.

The valve body 56 will be described below with reference to FIGS. 7, 13A and 13B. As shown in FIGS. 13A and 13B, the valve body 56 is structured as a disk-shaped member. A through-hole 56a is provided in a center part of the valve body 56. The support shaft 54 is inserted into the through-hole 56a. An under face of the valve body 56 is structured to be a sliding surface 56b which slides on the valve seat face 34c of the valve seat constituting member 34. A part of the sliding surface 56b of the valve body 56 is cut out to be structured as a cut-out part 56c.

As shown in FIG. 13B, the cut-out part 56c is formed in a shape which is recessed to an upper side with respect to the sliding surface 56b of the valve body 56. Two through-holes 56d are provided in the cut-out part 56c. In this embodiment, as an example, a boss not shown which is protruded from an under face of the driven gear 50 is inserted into the through-hole 56d, and the driven gear 50 and the valve body 56 are structured to be turnable in an integral manner.

Further, the valve body 56 is provided with an orifice 56e which is penetrated in an upper and lower direction and is opened in the sliding surface 56b. In this embodiment, the orifice 56e has a portion whose width is narrower than the first fluid outlet 34a and the second fluid outlet 34b in the path of a fluid. More preferably, the orifice 56e has a portion whose width is the narrowest in the path of the fluid.

Main structures of the valve drive device 10 and the valve body drive mechanism 30 have been described. Next, fluid control of the valve body 56 by the valve body drive mechanism 30, a power transmission state of the drive gear 46 to the driven gear 50, and a power non-transmission state will be described below.

[Fluid Control by Valve Body]

Flow rate control of a fluid from the fluid inlet port 28b to at least one of the first fluid outlet 34a and the second fluid outlet 34b will be described below with reference to FIGS. 14 through 17. In the step S0 in FIG. 15, the drive gear 46 is located at an origin position with respect to the driven gear 50. A relationship between the teeth of the drive gear 46 and the teeth of the driven gear 50 at the origin position will be described below.

As shown in FIG. 15, in the step S0 (origin position), the cut-out part 56c of the valve body 56 is located above the first fluid outlet 34a and the second fluid outlet 34b. Therefore, the valve body 56 is set in a state that the valve body 56 does not close the first fluid outlet 34a and the second fluid outlet 34b and thus, the first fluid outlet 34a and the second fluid outlet 34b are set in an open state. As a result, the fluid supplied from the fluid inlet 28b to the valve chamber 32 is flowed out to the first outflow pipe 16 and the second outflow pipe 18 through the first fluid outlet 34a and the second fluid outlet 34b (see opening/closing mode in FIG. 14).

Next, the motor 24 is driven and rotated to rotate the rotor 40 and the drive gear 46 in the first direction "R1". In this case, the driven gear 50 engaged with the drive gear 46 is turned by the drive gear 46 (clockwise direction in FIG. 15) and shifted to a state of the step S1 (middle view in FIG. 15). The valve body 56 slides on the valve seat constituting member 34 in the clockwise direction in FIG. 15 by driven-turning of the driven gear 50 in a state that the sliding surface 56b is closely contacted with the valve seat face 34c. Also in the step S1, the cut-out part 56c is located above the first fluid outlet 34a and the second fluid outlet 34b and thus, the first fluid outlet 34a and the second fluid outlet 34b are set in an open state, in other words, an open mode in FIG. 14.

As shown in the bottom view in FIG. 15, when the drive gear 46 is further turned in the first direction "R1", the state of the step S1 is shifted to a state of the step S2. In this state, the orifice 56e is located above the first fluid outlet 34a, and the cut-out part 56c is located above the second fluid outlet 34b. The first fluid outlet 34a is set in a state that a flow rate of the fluid flowing out from the first fluid outlet 34a is restricted by the orifice 56e.

Figure 14:
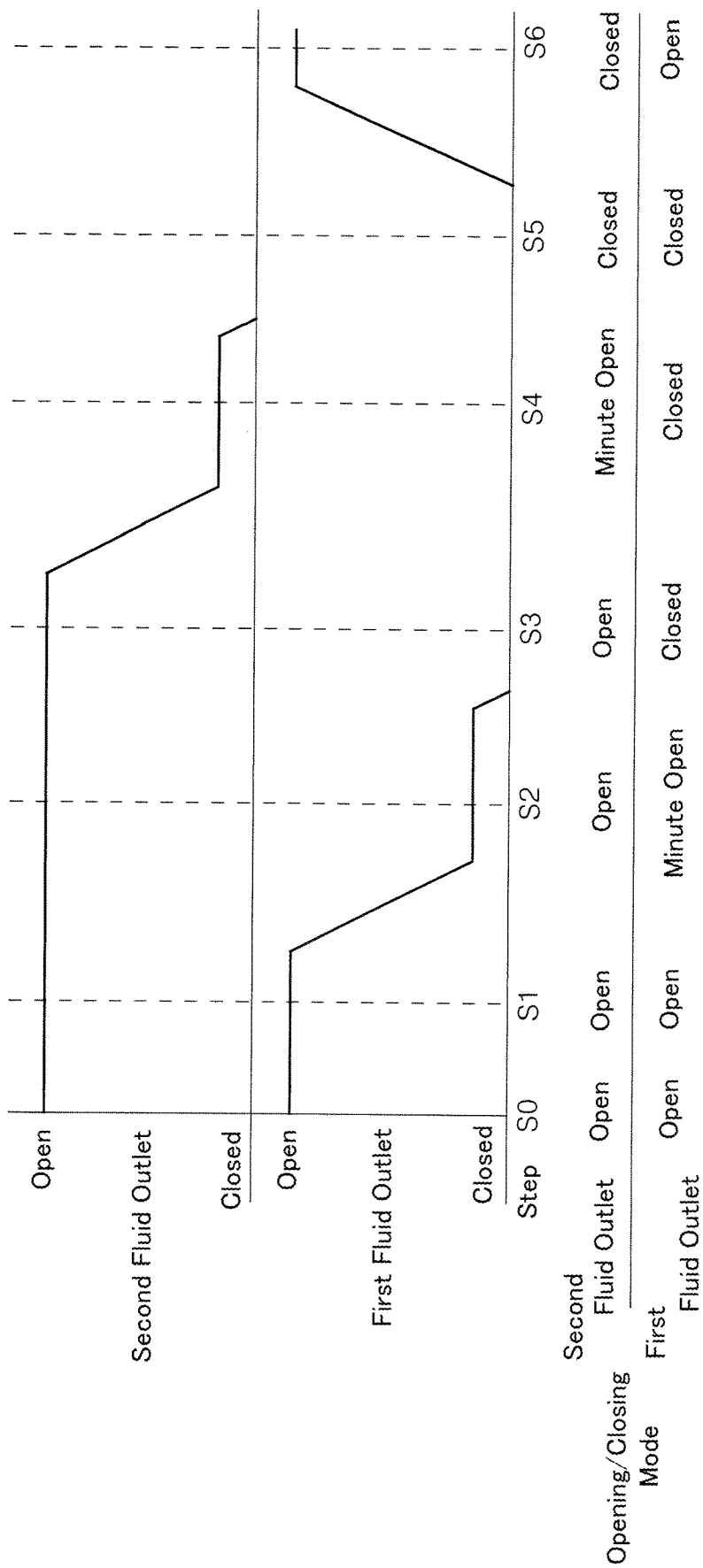
FIG. 14 is a view showing an opening/closing state of the valve body drive mechanism in respective steps.

In other words, in comparison with the flow rate of the fluid flowing out from the first fluid outlet 34a in a completely opened state like the step S0 and the step S1, a flow rate of the fluid flowing out from the first fluid outlet 34a is reduced in a restricted state by the orifice 56e. In other words, a minute open mode in the step S2 in FIG. 14 is obtained. The second fluid outlet 34b is maintained in the open state and is an open mode.

Figure 16:
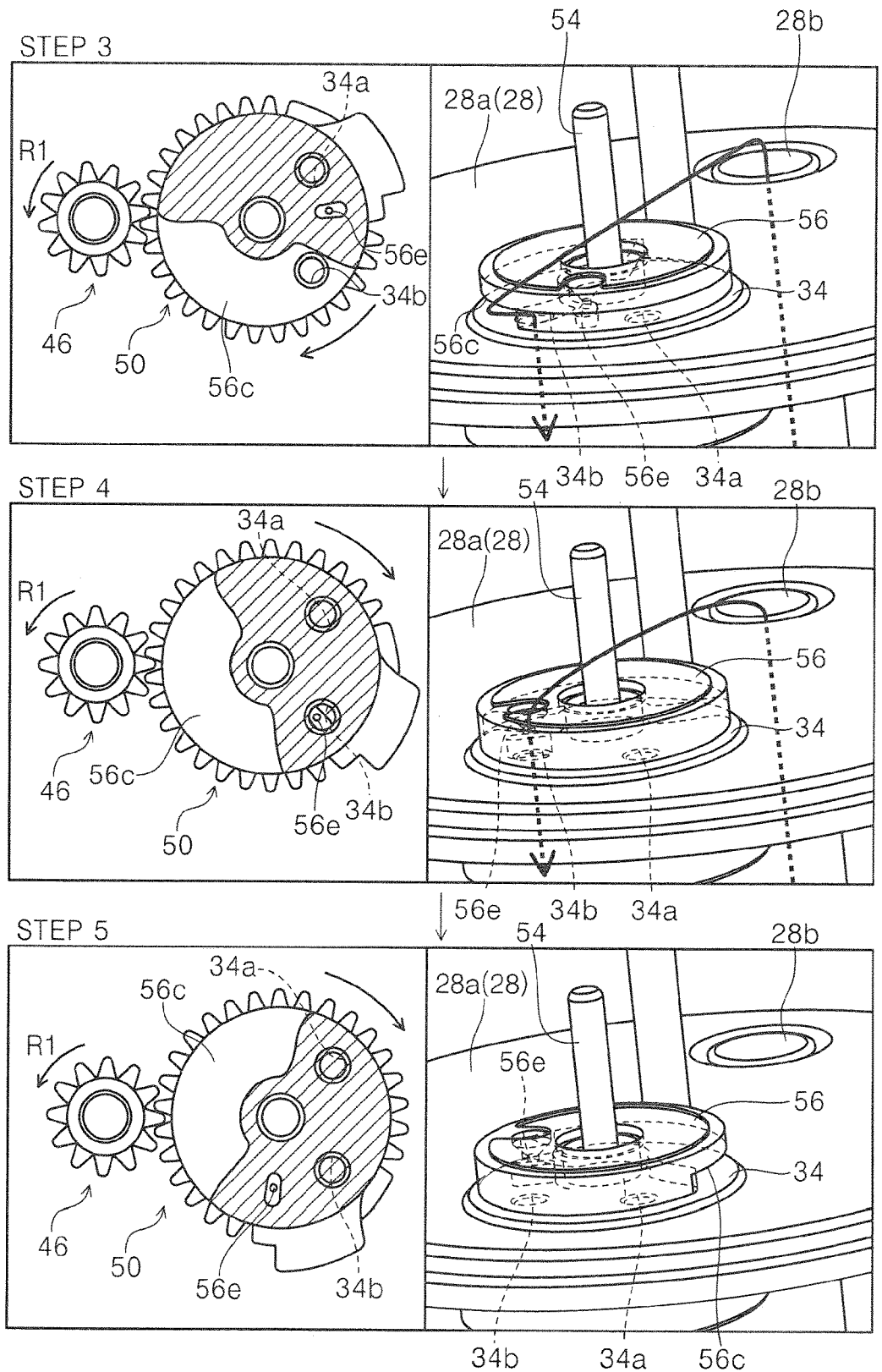
FIG. 16 is a view showing phase states between the output side gear and the driven gear and states of the valve body.

Next, as shown in an upper view in FIG. 16, when the drive gear 46 is further turned in the first direction "R1", the state of the step S2 is shifted to a state of the step S3. In this state, the orifice 56e is deviated from an upper position of the first fluid outlet 34a. The first fluid outlet 34a is covered by the sliding surface 56b of the valve body 56 and is closed. Therefore, the first fluid outlet 34a is set in a closed mode (FIG. 14) and a path of the fluid from the valve chamber 32 to the first outflow pipe 16 is blocked. On the other hand, the cut-out part 56c is located above the second fluid outlet 34b. Therefore, the second fluid outlet 34b is maintained in the open state and in the open mode (FIG. 14).

Next, as shown in the middle view in FIG. 16, when the drive gear 46 is further turned in the first direction "R1", the state of the step S3 is shifted to a state of the step S4. In this state, the first fluid outlet 34a is covered by the sliding surface 56b of the valve body 56 and is closed. Therefore, the first fluid outlet 34a maintains the state of the closed mode (FIG. 14) continuously from the step S3, and maintains the state that a path of the fluid from the valve chamber 32 to the first outflow pipe 16 is blocked.

In addition, the orifice 56e is located above the second fluid outlet 34b. Therefore, the second fluid outlet 34b is set in a state that a flow rate of the fluid flowing out from the second fluid outlet 34b is restricted by the orifice 56e and set in a minute open mode in the step S4 in FIG. 14.

Next, as shown in the bottom view in FIG. 16, when the drive gear 46 is further turned in the first direction "R1", the state of the step S4 is shifted to a state of the step S5. In the state of the step S5, the first fluid outlet 34a and the second fluid outlet 34b are covered by the sliding surface 56b of the valve body 56 and set in a closed state. In other words, the closed modes in the step S5 in FIG. 14 are obtained. In this state, paths of the fluid from the valve chamber 32 to the first outflow pipe 16 and the second outflow pipe 18 are blocked.

Figure 17:
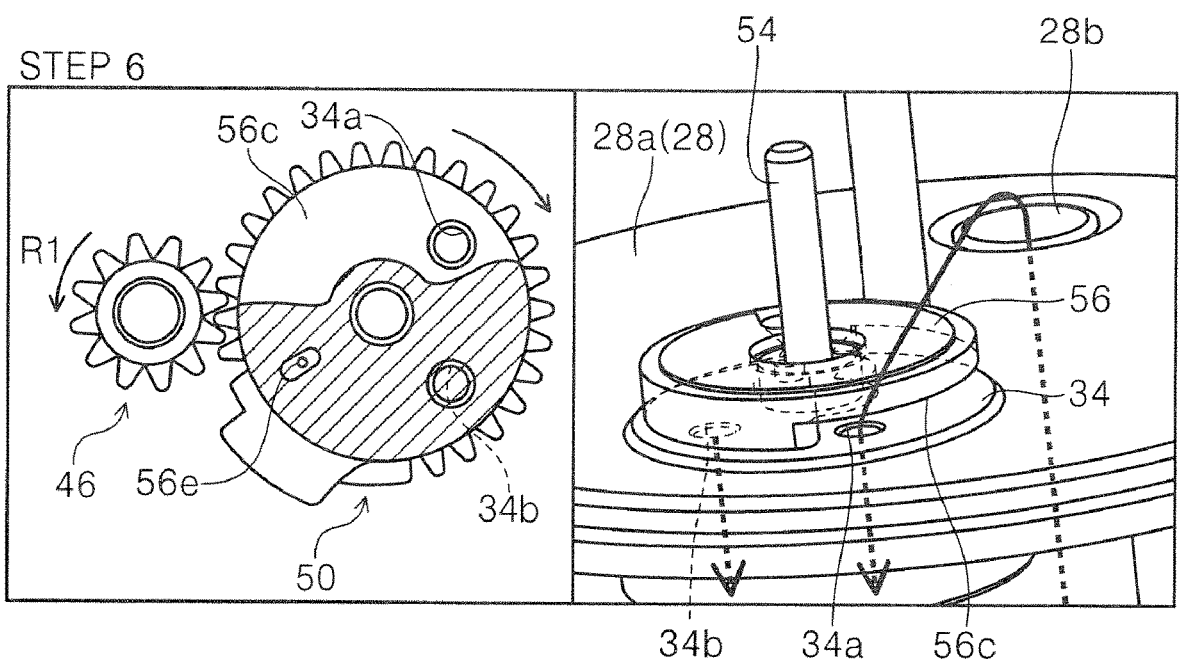
FIG. 17 is a view showing a phase state between the output side gear and the driven gear and a state of the valve body.

Next, as shown in FIG. 17, when the drive gear 46 is further turned in the first direction "R1", the state of the step S5 is shifted a state of the step S6. In the state of the step S6, the cut-out part 56c is located above the first fluid outlet 34a again. Therefore, the first fluid outlet 34a is set in a completely open state and an open mode in FIG. 14 is obtained. On the other hand, the second fluid outlet 34b is covered by the sliding surface 56b of the valve body 56 and maintains the closed state and thus, a state that a path of the fluid from the valve chamber 32 to the second outflow pipe 18 is blocked is maintained. In other words, a closed mode of the step S6 in FIG. 14 is obtained.

In this embodiment, when the valve body 56 is turned with respect to the valve seat constituting member 34 by the motor 24, each of the first fluid outlet 34a and the second fluid outlet 34b can be switched to an open state, a minute open state or a closed state and thus, flow rates of the fluid which are respectively flowed out from the valve chamber 32 to the first outflow pipe 16 and the second outflow pipe 18 can be adjusted.

[Switching from Power Transmission State to Power Non-Transmission State in Power Transmission Switching Part]

Figure 18:
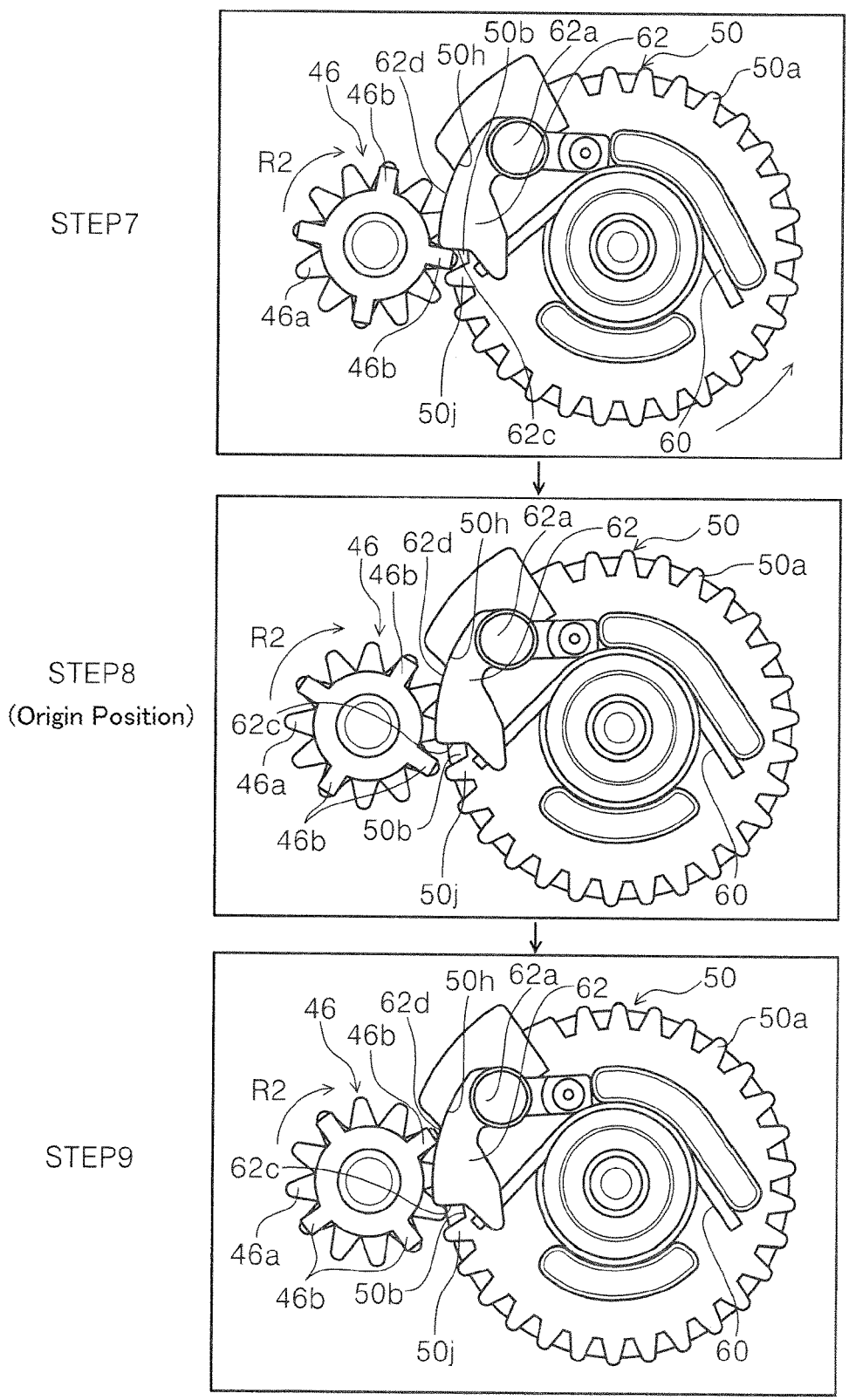
FIG. 18 is a view showing states of the valve body drive mechanism in an origin return operation.
Figure 19:
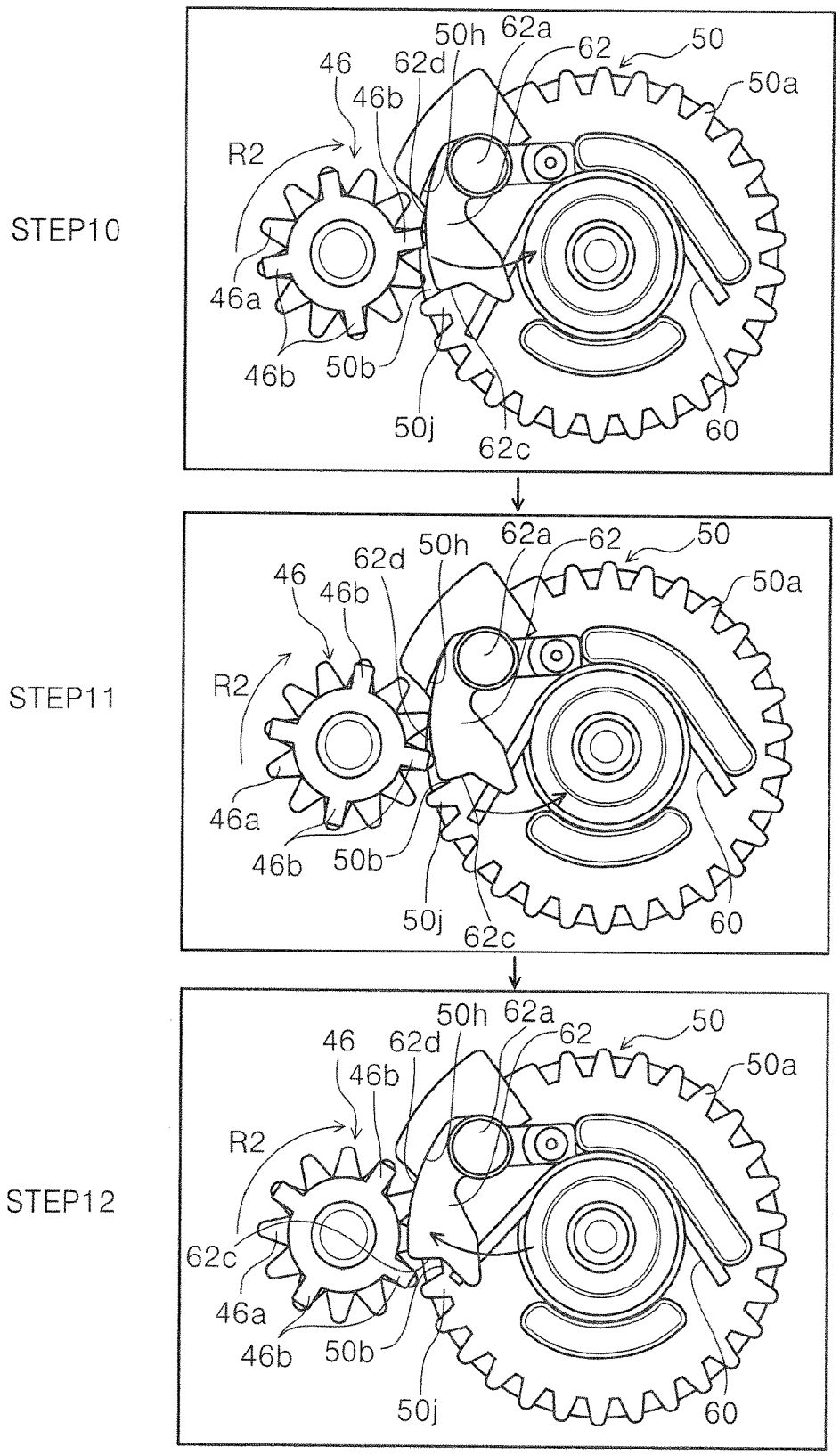
FIG. 19 is a view showing states of the valve body drive mechanism in the origin return operation.

With reference to FIGS. 18 and 19, an origin position return operation of the power transmission switching part 52 of the valve body drive mechanism 30 will be described below. In the step S7, the drive gear 46 is turned in the second direction "R2". In the state of the step S7, the gear part 46a of the drive gear 46 is engaged with the meshing part 50a of the driven gear 50. The step S7 shows a state that, after the drive gear 46 has been rotated in the first direction "R1" to turn the driven gear 50, the rotational direction of the drive gear 46 is switched to the second direction and becomes a state going to return to the origin position.

When the step S7 is further shifted to the step S8, the drive gear 46 is returned to the origin position with respect to the driven gear 50. The origin position is a state that an engaging state of the gear part 46a of the drive gear 46 with the meshing part 50a of the driven gear 50 is released and the gear part 46a is located within the non-meshing part 50b of the driven gear 50. In this state, a power non-transmission state is realized that power is not transmitted from the drive gear 46 to the driven gear 50 when the drive gear 46 is rotated in the second direction.

Specifically, as shown in the views of the step S7 through the step S12, when the drive gear 46 is turned in the second direction "R2", the four protruded parts 46b are also turned in the second direction "R2". As progressing from the step S7 to the step S9, the protruded part 46b facing the second contact part 62d of the turning restriction part 62 comes close to the second contact part 62d accompanied with turning in the second direction "R2" and contacts with the second contact part 62d in the step S9.

When the drive gear 46 is further turned in the second direction "R2", the protruded part 46b contacted with the second contact part 62d is also going to turn in the second direction "R2". In this case, the protruded part 46b presses the second contact part 62d against the urging force of the torsion spring 60 as shown in the step S10 and the step S11. As a result, the turning restriction part 62 is turned toward an inner side in the radial direction of the driven gear 50 with the turning shaft 62a as a center.

After that, as shown in the step S11 and the step S12, when the drive gear 46 is further turned in the second direction "R2", the protruded part 46b pressing the second contact part 62d is separated from the second contact part 62d. As a result, the turning restriction part 62 is turned toward an outer side in the radial direction by the urging force of the torsion spring 60, and is turned to the position where the second contact part 62d is contacted with the lever turning restriction part 50h of the driven gear 50.

In this embodiment, when the drive gear 46 is turned in the second direction "R2" in a state that the gear part 46a of the drive gear 46 is located in the non-meshing part 50b of the driven gear 50, the protruded parts 46b repeat intermittently contacting with and separating from the second contact part 62d of the turning restriction part 62 and the gear part 46a continues to idle in the non-meshing part 50b. Therefore, a tooth of the drive gear 46 and a tooth of the driven gear 50 can be prevented from carelessly contacting with each other in a power non-transmission state and thus, collision noise generated when gear teeth are collided with each other can be prevented.

When idling of the gear part 46a is continued within the non-meshing part 50b, a released state continues that an engaging state of the gear part 46a of the drive gear 46 with the meshing part 50a of the driven gear 50 is released. As a result, a power non-transmission state in which power of the motor 24 is not transmitted from the drive gear 46 to the driven gear 50 is maintained. Therefore, a possibility that step-out occurs in the motor 24 can be reduced, and noise caused by step-out can be suppressed.

[Second Turning Restriction Part]

Figure 23A:
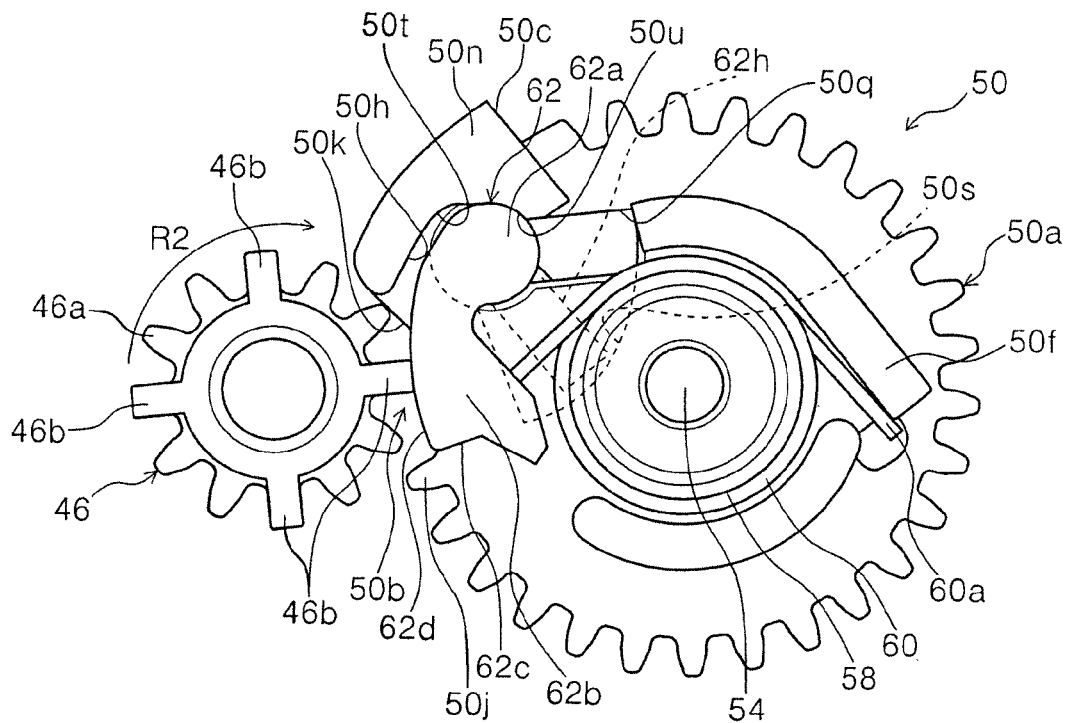
FIGS. 23A and 23B are views showing states that an accompanying turning of the driven gear with the drive gear is restricted by a second turning restriction part.
Figure 23B:
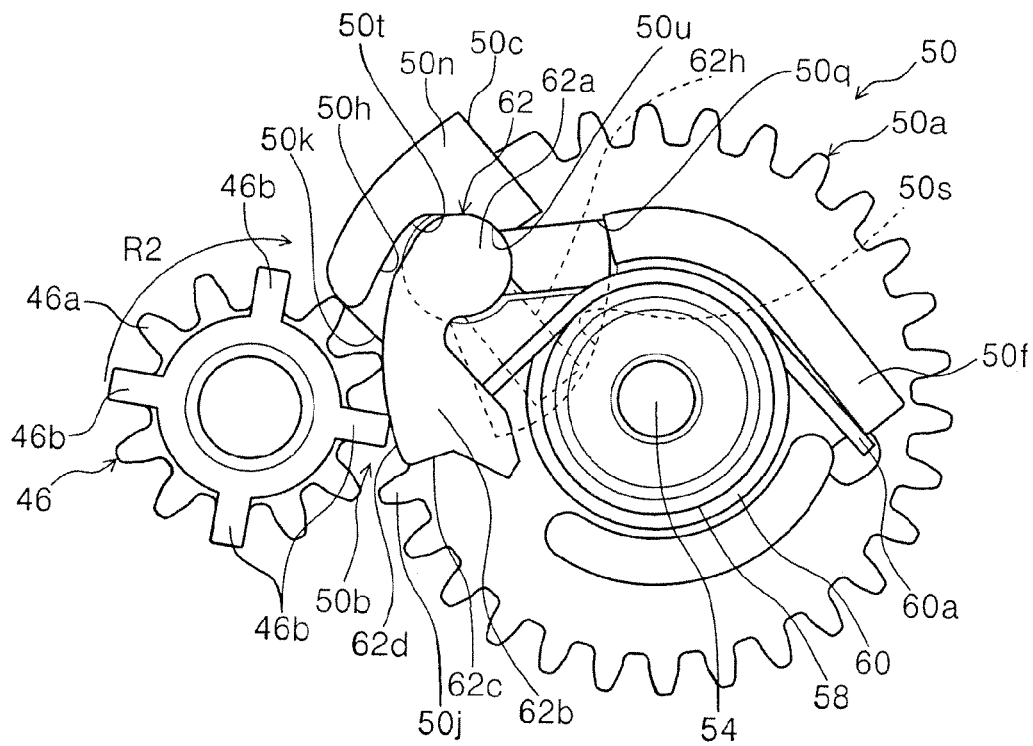

The second turning restriction part 50k will be described below with reference to FIGS. 23A and 23B. FIGS. 23A and 23B show a relationship between the drive gear 46 and the driven gear 50 in a state from the step S10 to the step S11. In FIG. 23A, when the protruded part 46b contacts with the second contact part 62d of the turning restriction part 62 and presses the second contact part 62d, since the protruded part 46b is turned in the second direction "R2", the second contact part 62d is pressed to turn in a counterclockwise direction in FIG. 23A.

In this case, the second contact part 62d pressed by the protruded part 46b is going to turn in the counterclockwise direction in FIGS. 23A and 23B together with the driven gear 50. In this embodiment, the driven gear 50 is provided with the second turning restriction part 50k on the first direction "R1" side of the non-meshing part 50b. When the driven gear 50 is turned in the counterclockwise direction in FIG. 23A together with second contact part 62d, the second turning restriction part 50k contacts with a gear of the gear part 46a of the drive gear 46 which is located in the non-meshing part 50b (FIG. 23A).

When the second turning restriction part 50k contacts with the tooth of the gear part 46a, turning of the driven gear 50 in the counterclockwise direction in FIGS. 23A and 23B is restricted. In addition, in this state, even when the drive gear 46 continues turning in the second direction "R2", the second turning restriction part 50k maintains a contacted state with either tooth of the gear part 46a (FIG. 23B) and thus, a turning restriction state of the driven gear 50 is maintained. In this manner, the gear part 46a of the drive gear 46 is capable of idling in the non-meshing part 50b and the power non-transmission state can be maintained.

[Second Contact Part]

Figure 26A:
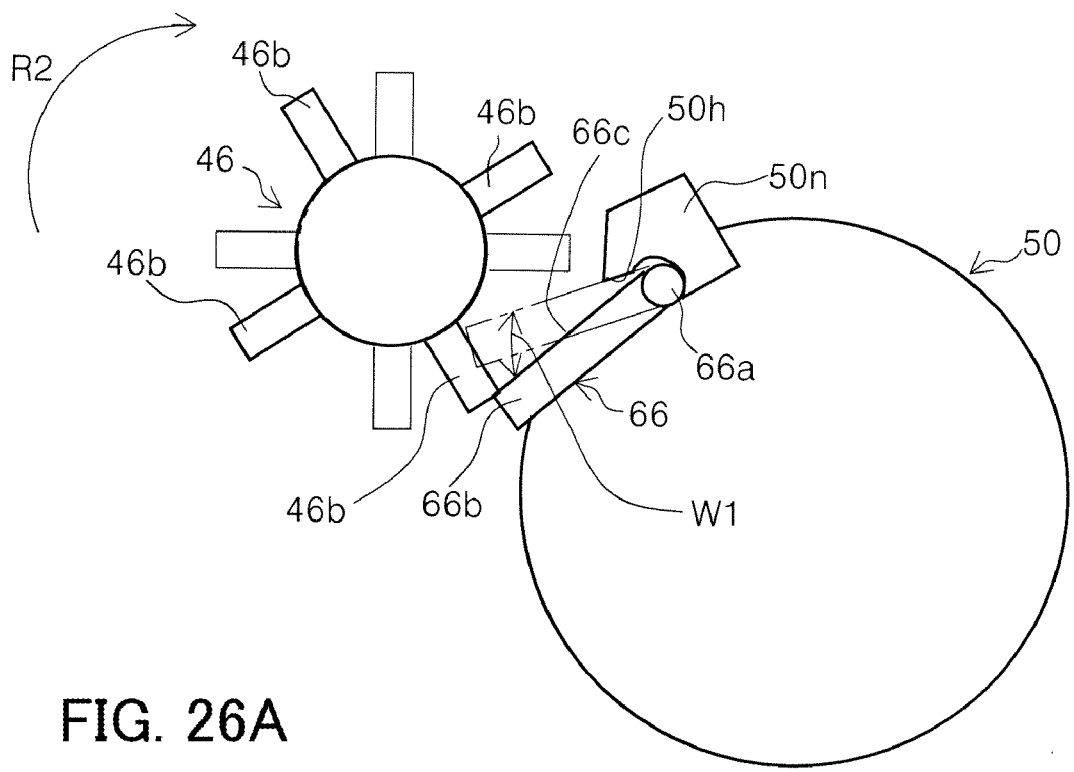
FIGS. 26A and 26B are schematic views for explaining an effect when a second contact part of a lever part in the turning restriction part is structured to be a curved surface.

In addition, an advantage that the second contact part 62d is structured to be a curved surface will be described below with reference to FIGS. 26A and 26B. FIG. 26A shows a turning restriction part 66 in which the second contact part is formed in a straight shape. A turning restriction part 66 is provided with a turning shaft 66a, a lever part 66b and a second contact part 66c. FIG. 26A shows displacement of a turning state of the turning restriction part 66 having the lever part 66b in a straight shape, and FIG. 26B shows displacement of a turning state of the turning restriction part 62 in this embodiment.

In FIG. 26A, when the second contact part 66c in a straight shape contacts with the protruded part 46b, the second contact part 66c is turned to an inner side in a radial direction of the driven gear 50. The protruded part 46b which contacts with the second contact part 66c is turned in the second direction "R2" along the second contact part 66c in a straight shape. In this case, the second contact part 66c having a straight shape becomes in a pushed state to an inner side in the radial direction of the driven gear 50 until immediately before the second contact part 66c is separated from the protruded part 46b. When the protruded part 46b is separated from the second contact part 66c, the turning restriction part 66 is turned by a turning amount "W1" by an urging force of a torsion spring 60 not shown to a position where the second contact part 66c is contacted with the lever turning restriction part 50h. The two-dot chain line in FIG. 26A schematically shows the second contact part 66c contacting with the lever turning restriction part 50h and a position of the protruded part 46b in this state.

Figure 26B:
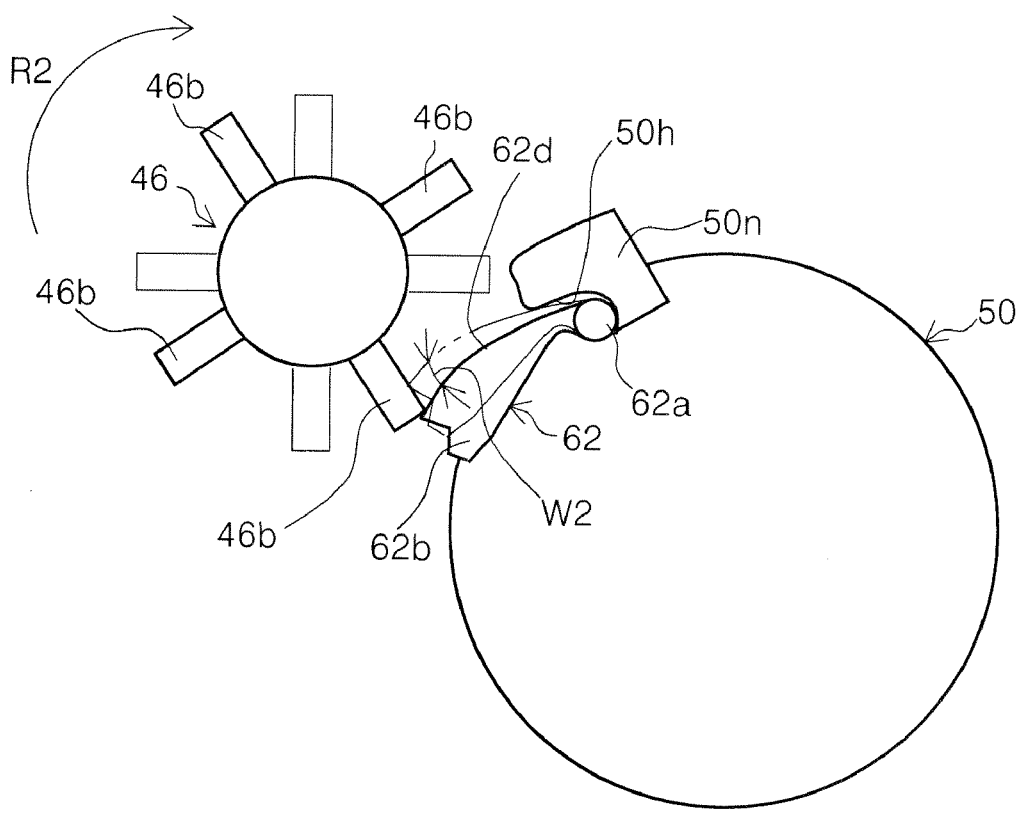

On the other hand, in FIG. 26B, when the second contact part 62d structured to be a curved surface contacts with the protruded part 46b, the second contact part 62d is turned to an inner side in the radial direction of the driven gear 50. When the drive gear 46 is turned in the second direction "R2", the protruded part 46b slides and moves on the second contact part 62d. In this case, the second contact part 62d is formed in a curved surface along a circumferential direction of the driven gear 50 and thus, accompanied with turning in the second direction "R2" of the protruded part 46b, the second contact part 62d is gradually returned from the pushed state to the inner side in the radial direction of the driven gear 50 to an outer side in the radial direction. Then, when the protruded part 46b is separated from the second contact part 62d, the second contact part 62d is returned to a contacting position with the lever turning restriction part 50h by a turning amount "W2". The two-dot chain line in FIG. 26B schematically shows the second contact part 62d contacting with the lever turning restriction part 50h and a position of the protruded part 46b in this state.

In this case, the turning restriction part 62 starts turning toward an outer side in the radial direction from a state before the protruded part 46b is separated from the second contact part 62d. Therefore, in comparison with the turning amount "W1" of the turning restriction part 66, the turning amount "W2" to an outer side in the radial direction when the protruded part 46b is separated from the second contact part 62d can be made small. As a result, an impact when the second contact part 62d contacts with the lever turning restriction part 50h can be reduced and an impact sound (noise) can be suppressed.

[Switching from Power Non-Transmission State to Power Transmission State]

Next, switching from the power non-transmission state to the power transmission state will be described below with reference to FIGS. 20 and 21. In this embodiment, as shown in the step S13, the drive gear 46 is aligned to the origin position in a state that the gear part 46a of the drive gear 46 is located in the non-meshing part 50b of the driven gear 50, in other words, in the power non-transmission state. The positioning of the origin position of the drive gear 46 is performed by exciting the stator 36 in a predetermined excitation pattern.

Figure 20:
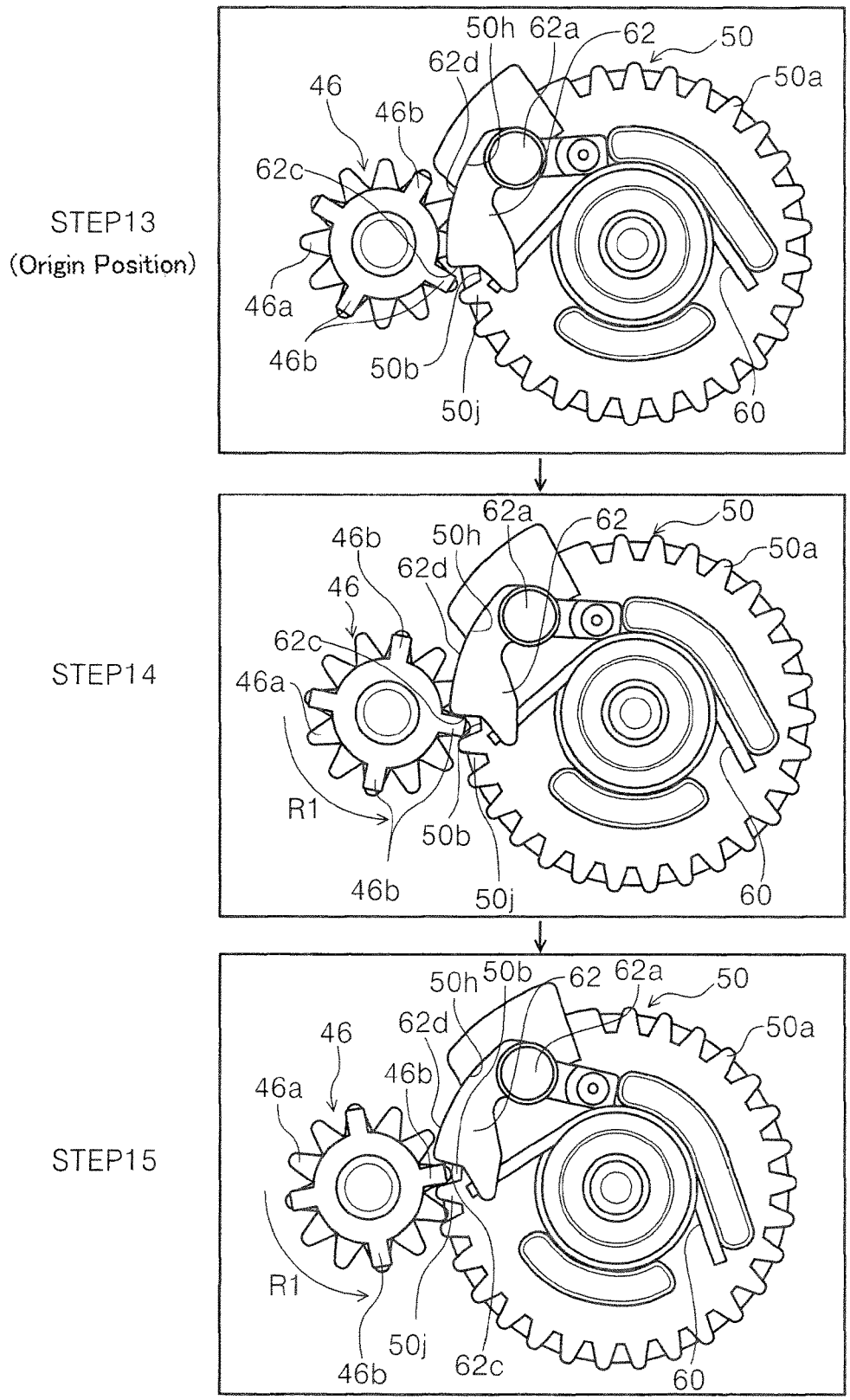
FIG. 20 is a view showing states of the valve body drive mechanism when the valve body is driven.

In the step S14, when the drive gear 46 starts turning in the first direction "R1", the protruded part 46b contacts with the first contact part 62c of the turning restriction part 62 and presses the turning restriction part 62, i.e., the driven gear 50 to the clockwise direction in FIG. 20. In this embodiment, the protruded part 46b contacting with the first contact part 62c presses the first contact part 62c toward the turning shaft 62a side in a direction intersecting the first contact part 62c and thus, the turning restriction part 62 is unable to turn. As a result, the driven gear 50 is pressed by the protruded part 46b through the first contact part 62c of the turning restriction part 62 and is turned to the clockwise direction in FIG. 20.

As a result, as shown in the step S15, a tooth of the gear part 46a of the drive gear 46 goes out from the non-meshing part 50b of the driven gear 50 and another tooth of the gear part 46a starts engagement with a tooth of the meshing part 50a. In this manner, the power transmission switching part 52 is switched from the power non-transmission state to the power transmission state. In addition, when the drive gear 46 is turned in the first direction "R1" side, as shown in the step S16, a tooth of the gear part 46a and a tooth of the meshing part 50a are engaged with each other and the driven gear 50 continues to turn in the clockwise direction in FIG. 21.

Figure 21:
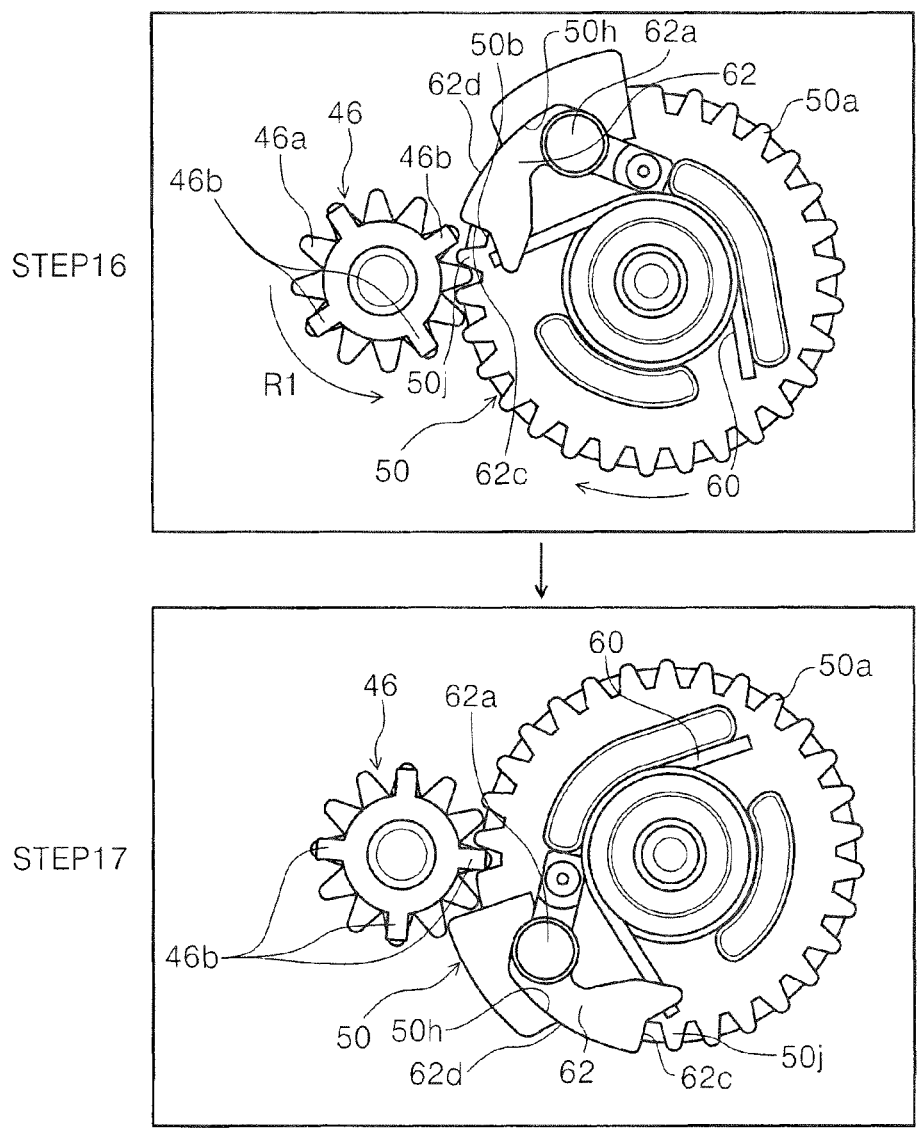
FIG. 21 is a view showing states of the valve body drive mechanism when the valve body is driven.

When the drive gear 46 is further turned to the first direction "R1" side, as shown in the step S17, the driven gear 50 can be turned in the clockwise direction in FIG. 21 and the operations of the valve body 56 from the step S1 to the step S6 can be performed.

Next, a relationship between the drive gear 46 and the driven gear 50 at the origin position (state of the step S13 in FIG. 20) will be described below with reference to FIG. 22. In this embodiment, when the drive gear 46 is located at the origin position, the protruded part 46b is located at a position facing the first contact part 62c of the turning restriction part 62. Further, a lock avoiding tooth 46c is formed at a position corresponding to the protruded part 46b in a circumferential direction of the drive gear 46.

Figure 22:
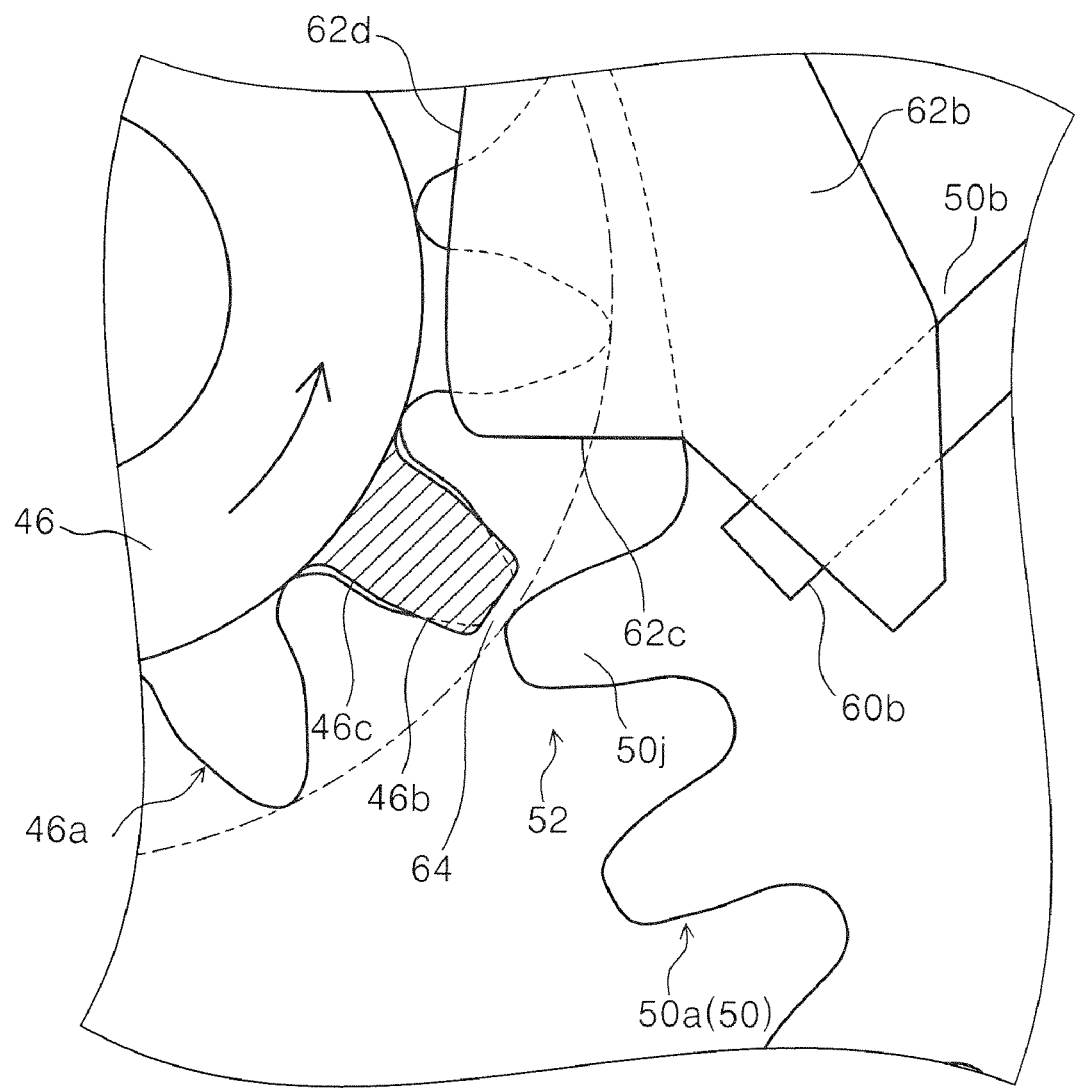
FIG. 22 is a view showing a relationship between the output side gear and the driven gear at an origin position.

In FIG. 22, a circular arc shown by the alternate long and short dash line shows a tooth-tip circle of the teeth other than the lock avoiding tooth 46c in the gear part 46a of the drive gear 46. In FIG. 22, in a state that the drive gear 46 is located at the origin position, the tooth 50j at a boundary between the meshing part 50a and the non-meshing part 50b of the driven gear 50 is located at a position interfering with the tooth-tip circle of the teeth other than the lock avoiding tooth 46c.

In this state, in a case that a tooth other than the lock avoiding tooth 46c is disposed at the position of the lock avoiding tooth 46c, when the drive gear 46 is going to turn in the first direction, the tooth 50j of the driven gear 50 and the tooth other than the lock avoiding tooth 46c disposed at the position of the lock avoiding tooth 46c may be contacted with each other to cause a lock state of the drive gear 46 and the driven gear 50.

In this embodiment, when the drive gear 46 is located at the origin position, the lock avoiding tooth 46c of the drive gear 46 is disposed so as to come close to the tooth 50j of the driven gear 50. Therefore, the tooth-tip circle of the lock avoiding tooth 46c is smaller than the tooth-tip circle of the teeth other than the lock avoiding tooth 46c and thus, a gap space 64 is provided between the tooth 50j of the driven gear 50 and the lock avoiding tooth 46c of the drive gear 46. When the gap space 64 is provided, a lock state of the drive gear 46 and the driven gear 50 can be avoided. As a result, in the power transmission switching part 52, switching from the power non-transmission state to the power transmission state between the drive gear 46 and the driven gear 50 can be smoothly performed and an abnormal operation (displacement of the position of the gear part 46a of the drive gear 46 for an excitation pattern) and occurrence of an operation failure can be suppressed.

As described above, in this embodiment, the turning restriction part 62 in the power transmission switching part 52 is structured so that, in a case that the drive gear 46 is rotated in the first direction, the turning restriction part 62 permits turning of the driven gear 50 and, in a case that the drive gear 46 is rotated in the second direction, the turning restriction part 62 restricts turning of the driven gear 50. In other words, the turning restriction part 62 is structured as a clutch mechanism. When the turning restriction part 62 in this embodiment utilizes a structure of a known clutch mechanism, a design time and cost can be reduced.

The turning restriction part 62 in this embodiment transmits power from the drive gear 46 to the driven gear 50 when the drive gear 46 is rotated in the first direction and, when the drive gear 46 is rotated in the second direction, power transmission from the drive gear 46 to the driven gear 50 is disconnected. Therefore, only when a rotational direction of the drive gear 46 is switched, a power transmission state can be switched and a structure of the turning restriction part 62 can be simplified.

[Foreign Matter Entry Restraining Part] FIGS. 27 Through 31

Next, a specific structure of a foreign matter entry restraining part will be described in detail below which is provided so that, in a case that the valve drive device 10 is installed in a fluid path where a fluid flowing through an inside of the valve drive device 10 includes foreign matters such as copper powder, a possibility that a foreign matter enters to a portion (power transmission switching part 52) where a power transmission switching of the valve body drive mechanism 30 is performed to cause an operation failure is reduced.

Figure 27:
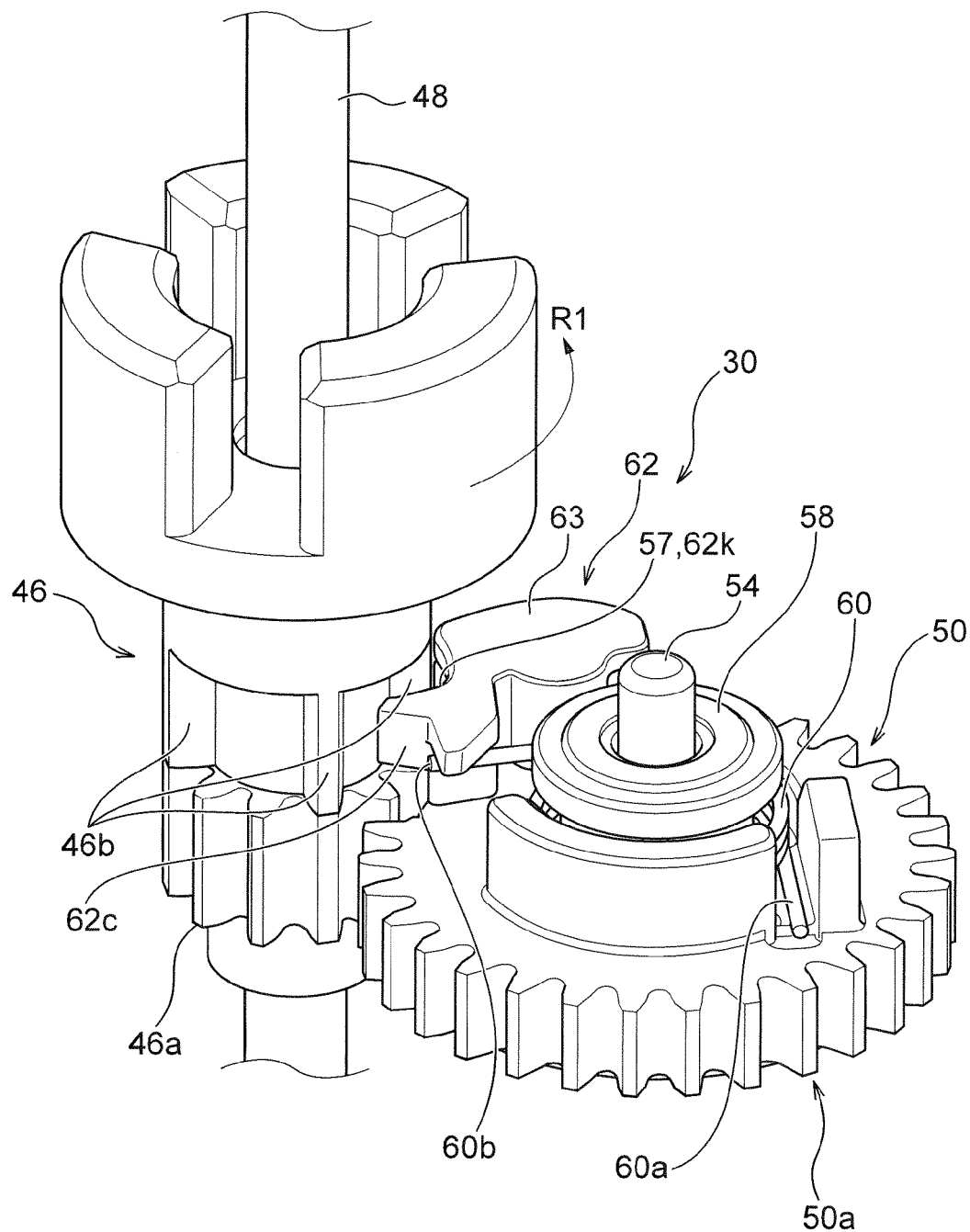
FIG. 27 is a perspective view showing a valve body drive mechanism provided with a foreign matter entry restraining part which is viewed from an upper side.
Figure 29:
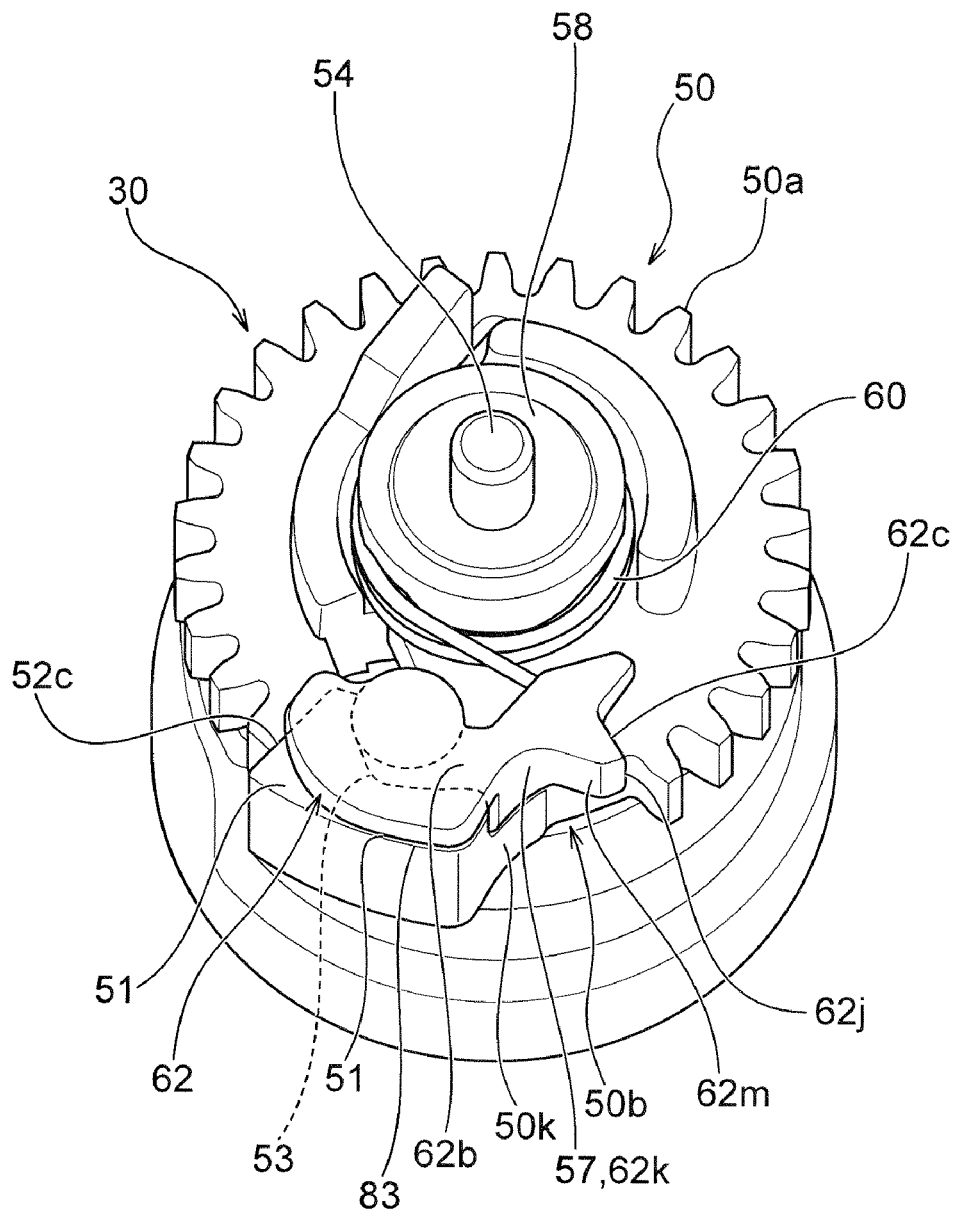
FIG. 29 is a perspective view showing the valve body drive mechanism shown in FIG. 27 in which a part of the valve body drive mechanism is omitted and which is viewed from an upper side.

FIGS. 27 and 29 are perspective views showing a valve body drive mechanism 30 provided with a foreign matter entry restraining part in accordance with an embodiment of the present invention which is viewed from an upper side. In this embodiment, the lever part 62b of the turning restriction part 62 performs a contacting operation with the turning protruded part 46b of the drive gear 46 and a separating operation in which the lever part 62b is turned against an urging force of the torsion spring 60 and is separated from a contact position with the lever turning restriction part 50h. In this embodiment, a foreign matter entry restraining part 63 is provided which covers a region 53 between the lever part 62b performing the above-mentioned contacting and separating operation and the lever turning restriction part 50h.

The region 53 is an area formed by a face of the second contact part 62d of the lever part 62b and a face of the lever turning restriction part 50h which are faced each other (see also FIGS. 33A and 33B described below). An opening area of the region 53 becomes large when the lever 62b is turned and separated from the contact position with the lever turning restriction part 50h and thus, in a case that foreign matters such as copper powder are included in the liquid flowing through the inside of the valve drive device 10, the foreign matter may be entered into an inside of the region 53.

In this embodiment, as described above, the foreign matter entry restraining part 63 is provided so as to cover the region 53. Even when the valve drive device 10 is installed in a path of a fluid including foreign matters such as copper powder, the foreign matter is restrained from entering the region 53 by the foreign matter entry restraining part 63. As a result, a possibility can be reduced that the lever part 62b is unable to return to the original contact position with the lever turning restriction part 50h. Therefore, a possibility that the power transmission switching part 52 occurs an operation failure due to a foreign matter can be reduced.

Figure 30:
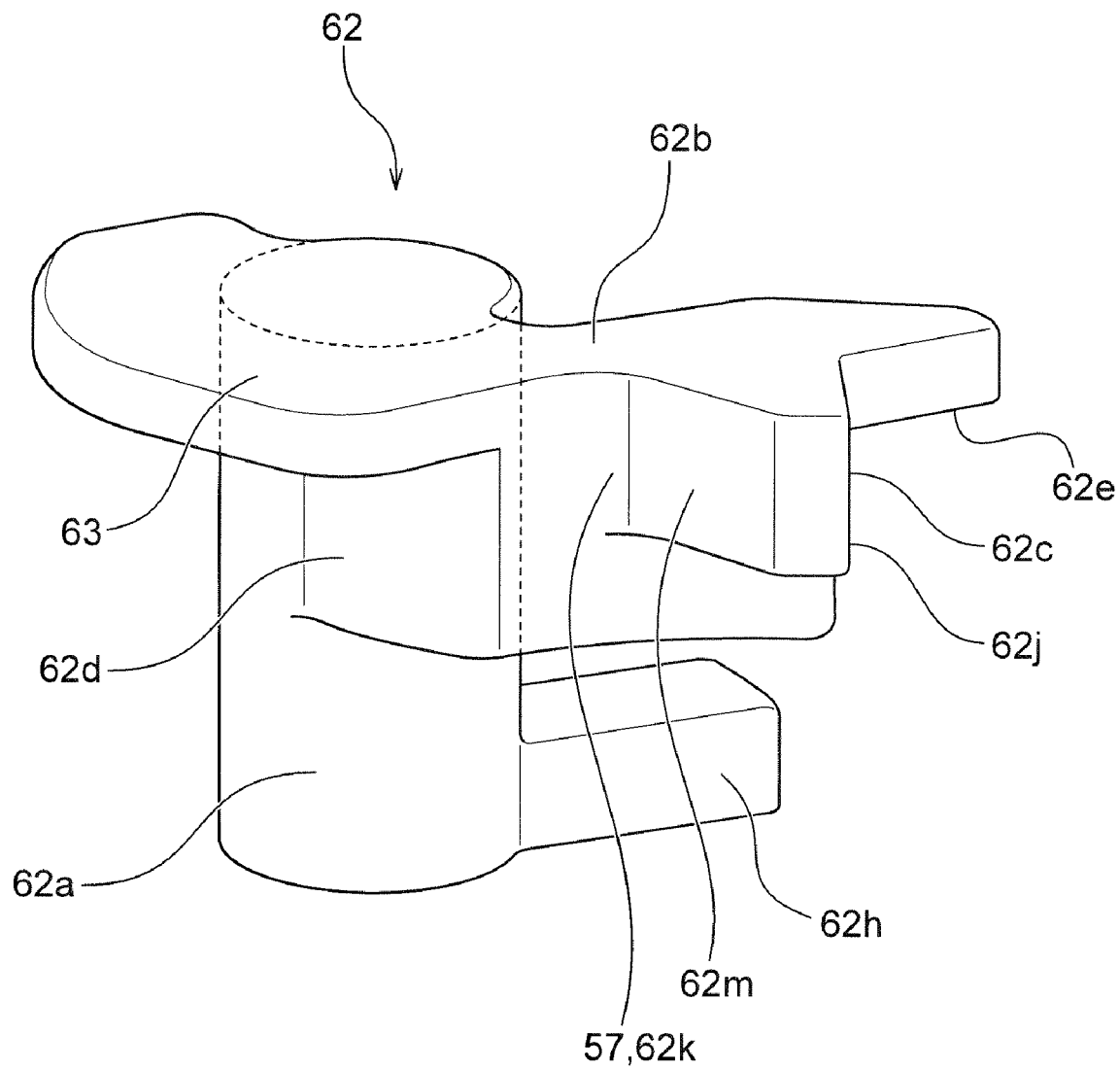
FIG. 30 is a perspective view showing a turning restriction part provided with a foreign matter entry restraining part.

An example of a structure of the foreign matter entry restraining part 63 in this embodiment will be described below with reference to FIG. 30. The foreign matter entry restraining part 63 is integrally provided with the lever part 62b of the turning restriction part 62. Specifically, the foreign matter entry restraining part 63 is projected in an umbrella shape at an upper position of the second contact part 62d of the lever part 62b in FIG. 30 so as to cover the region 53 from an upper side.

Figure 28:
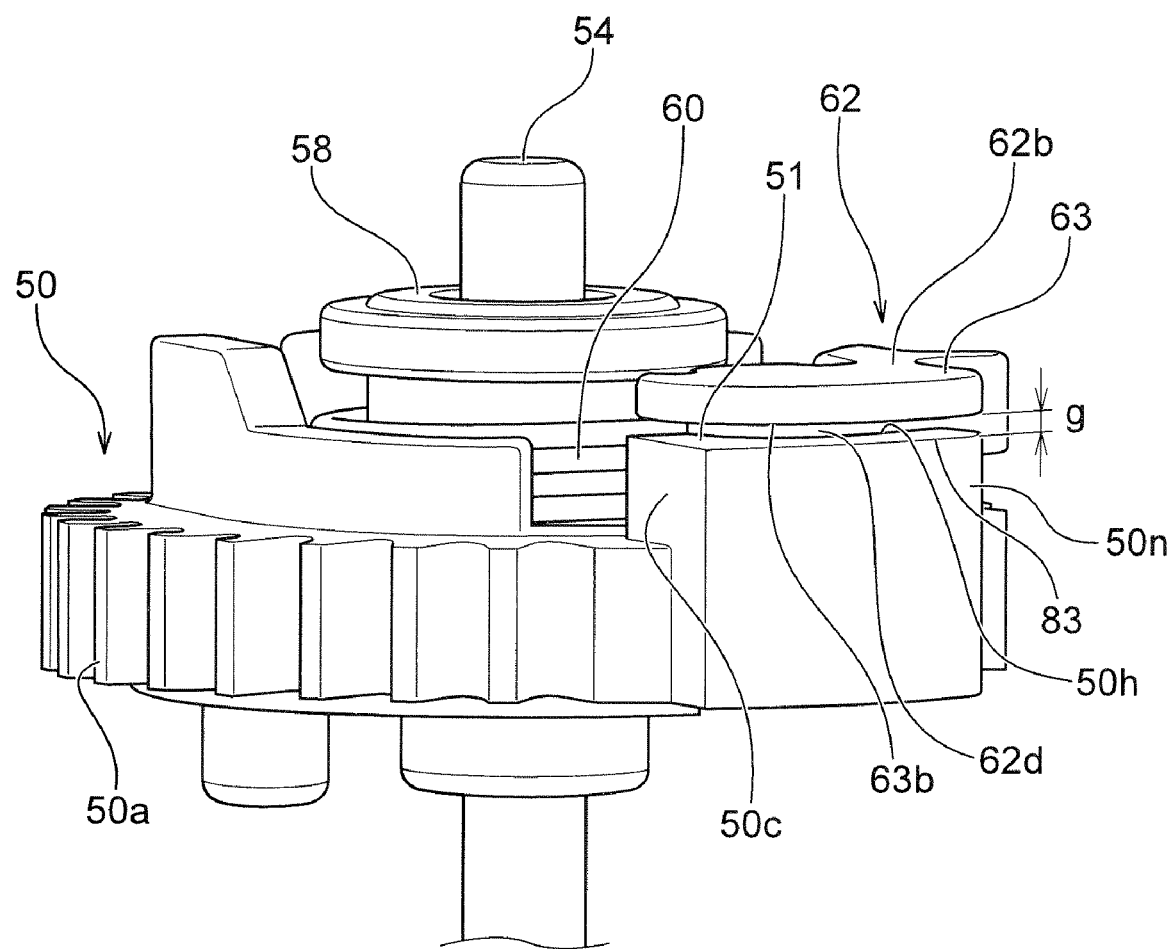
FIG. 28 is a perspective view showing the valve body drive mechanism shown in FIG. 27 in which a part of the valve body drive mechanism is omitted.

As shown in FIG. 28, a rear face 63b of the foreign matter entry restraining part 63 faces a top face 51 of the protruded shape part 50n through a clearance "g". In FIG. 28, the clearance "g" is shown larger in order to easily recognize the clearance in the drawing. However, from a viewpoint of foreign matter entry restraint, it is preferable that the clearance "g" is set to be smaller in an allowable range. In this example, the spring holding part 62e is structured so that the spring coming-off prevention part 62g shown in FIG. 11 is not provided.

As described above, the foreign matter entry restraining part 63 is provided in the lever part 62b and thus, entry of a foreign matter can be restrained in an easy structure and easy manufacturing.

A size of the foreign matter entry restraining part 63 in this embodiment will be described below with reference to FIGS. 31A and 31B. In this embodiment, in a state that the lever part 62b contacts with the lever turning restriction part 50h (FIG. 31A), the foreign matter entry restraining part 63 is formed in a shape located on an inner side in the radial direction of the driven gear 50 with respect to an outer boundary line 83 located at a position corresponding to the lever turning restriction part 50h (shape so as not to protrude to an outer side in the radial direction). Since other members are normally disposed on an outer side with respect to the outer boundary line 83 of the driven gear 50, an upper limit of the size of the foreign matter entry restraining part 63 is determined so as not to interfere with other members.

Figure 31A:
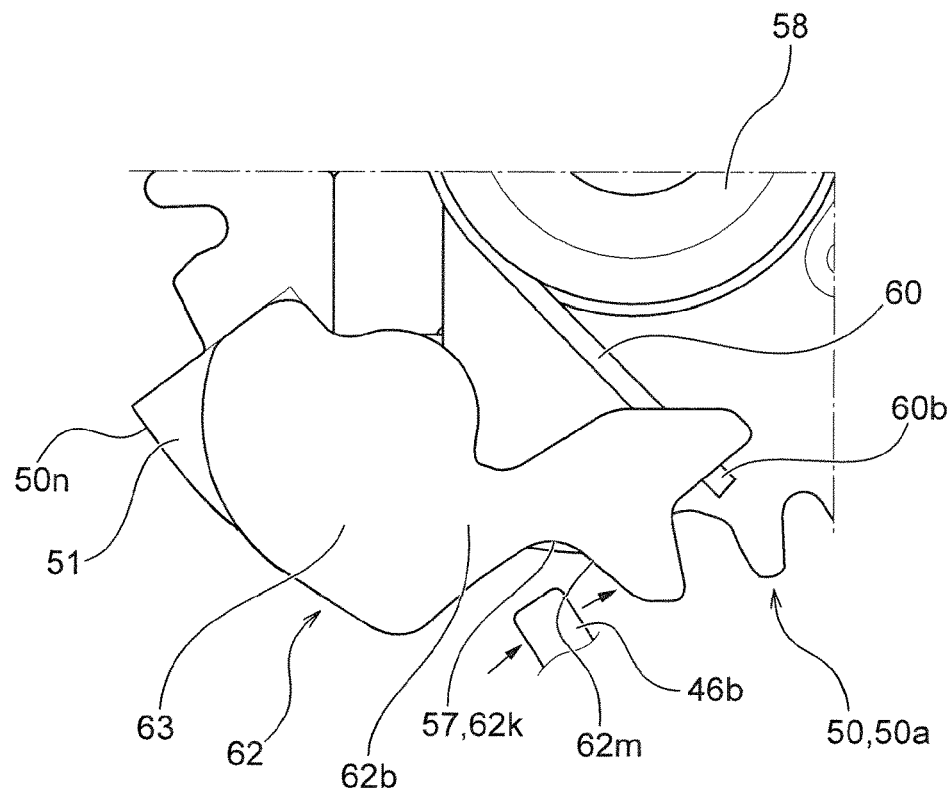
FIGS. 31A and 31B are plan views for explaining an operation of the turning restriction part provided with the foreign matter entry restraining part.

Specifically, in FIG. 31A, most of the top face 51 of the protruded shape part 50n is covered by the foreign matter entry restraining part 63 from an upper side. FIG. 31B shows a state that the lever part 62b is pushed by the protruded part 46b of the drive gear 46 and is turned against the urging force of the torsion spring 60. Even in this turned state of the lever part 62b, the top face 51 is exposed a little. Therefore, a possibility that a foreign matter enters into the region 53 is reduced.

Figure 31B:
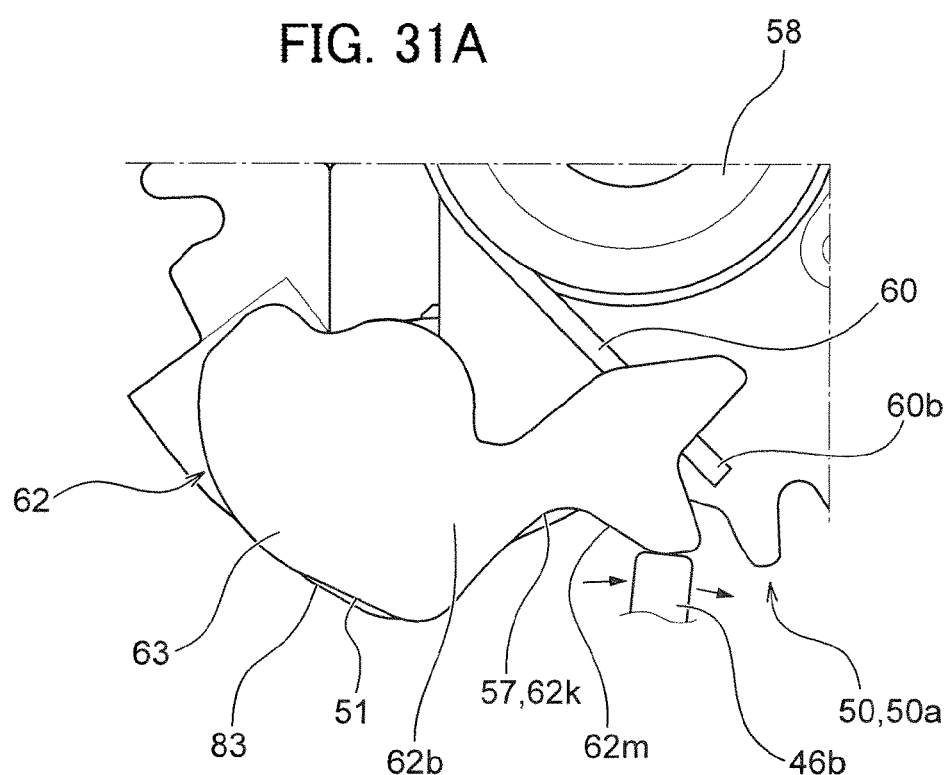

In a case that the size of the foreign matter entry restraining part 63 is unable to be formed large like FIGS. 31A and 31B, the size may be made smaller than that in FIGS. 31A and 31B. In this case, it is preferable that the foreign matter entry restraining part 63 is formed in a shape so as to continuously cover the region 53 at both positions, i.e., the contact position of the lever part 62b and the position separated from the contact position. In other words, even in a case that the region 53 is not covered by an excessively projected part like FIGS. 31A and 31B, when the foreign matter entry restraining part 63 is provided with a size capable of covering the region 53 in a state that the lever part 62b is turned and an opening area of the region 53 becomes the maximum (FIG. 31B), entry of a foreign matter can be restrained.

As a size of the foreign matter entry restraining part 63, it is preferable that the size is not less than a size (smallest size) covering the region 53 in a state that the lever part 62b contacts with the lever turning restriction part 50h (FIG. 31A). In other words, in a state that the lever part 62b is turned and an opening area of the region 53 becomes the maximum (FIG. 31B), the foreign matter entry restraining part 63 may be formed in a size that does not cover a part of the region 53. Even in the case of the above-mentioned smallest size, a restraining effect of entry of a foreign matter into the region 53 can be obtained in comparison with a case that no foreign matter entry restraining part 63 is provided and thus, in a case that it is preferable that the foreign matter entry restraining part 63 is formed in a smaller size, the size may be set in the preferable size.

Figure 32:
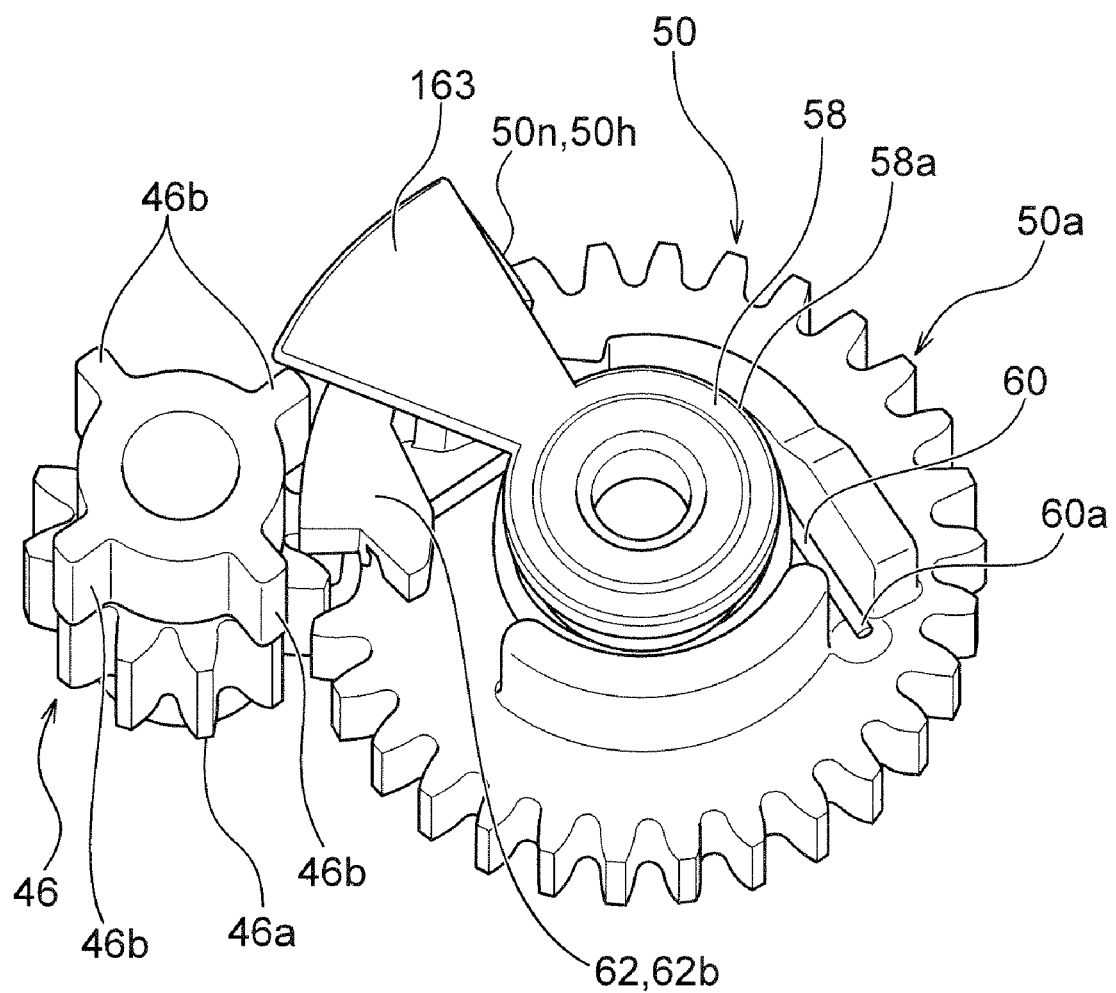
FIG. 32 is a perspective view showing a valve body drive mechanism provided with a foreign matter entry restraining part whose structure is different from that in FIG. 27 and which is viewed from an upper side.

[Another Embodiment of Foreign Matter Entry Restraining Part] FIG. 32

An example of the foreign matter entry restraining part 163 in another embodiment will be described below with reference to FIG. 32. In the embodiment shown in FIGS. 27 through 31, the foreign matter entry restraining part 63 is integrally provided with the lever part 62b. However, the foreign matter entry restraining part 63 may be provided separately from the lever part 62b. In an embodiment shown in FIG. 32, a foreign matter entry restraining part 163 is integrally provided with the holding member 58. The foreign matter entry restraining part 163 is extended from the flange part 58a of the holding member 58 to an upper side of the region 53 and covers the region 53 to restrain a foreign matter from entering.

The above-mentioned foreign matter can be also restrained from entering into the region 53 by this foreign matter entry restraining part 163. As a result, a possibility that the lever part 62b is unable to be returned to the original contact position with the lever turning restriction part 50h can be reduced.

In this case, the foreign matter entry restraining part 163 is not limited to the structure provided in the holding member 58 and may be provided in the lever part 62b. If possible in space, another dedicated member may be used as the foreign matter entry restraining part.

[Interference Avoiding Part] FIGS. 33A Through 35

Next, a specific structure of an interference avoiding part which is provided so as to reduce a possibility that a foreign matter enters into the region 53 to cause an operation failure will be described in detail below.

Figure 33A:
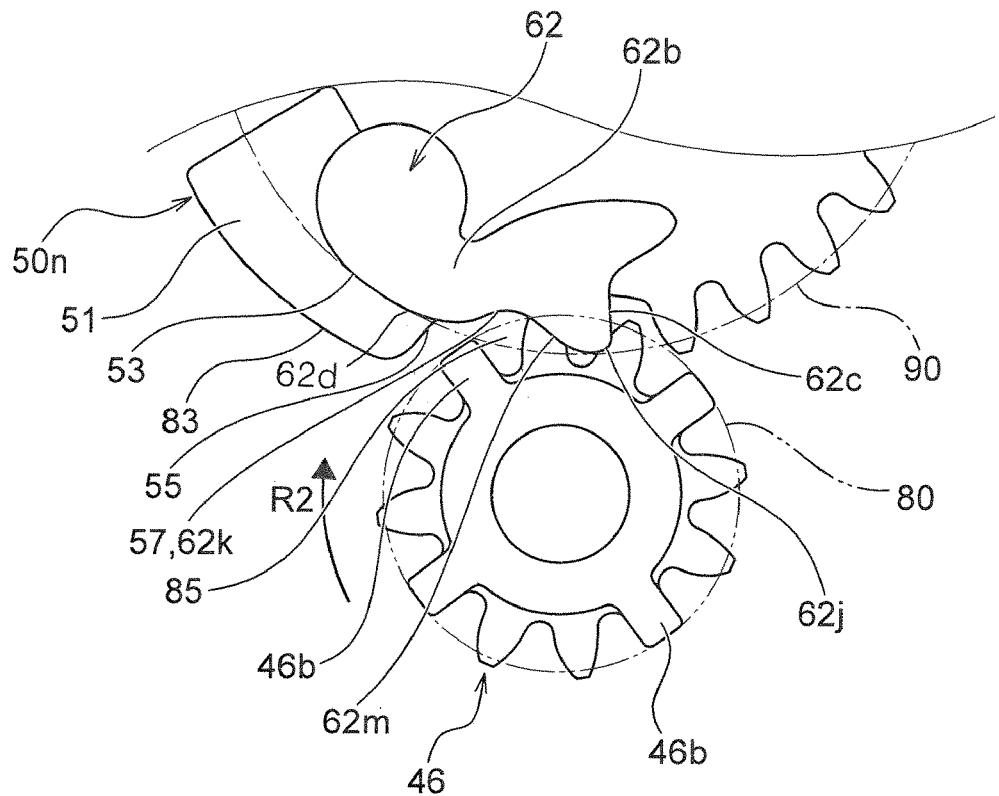
FIGS. 33A and 33B are plan views showing a main part of a valve body drive mechanism provided with an interference avoiding part which are viewed from an upper side.
Figure 33B:
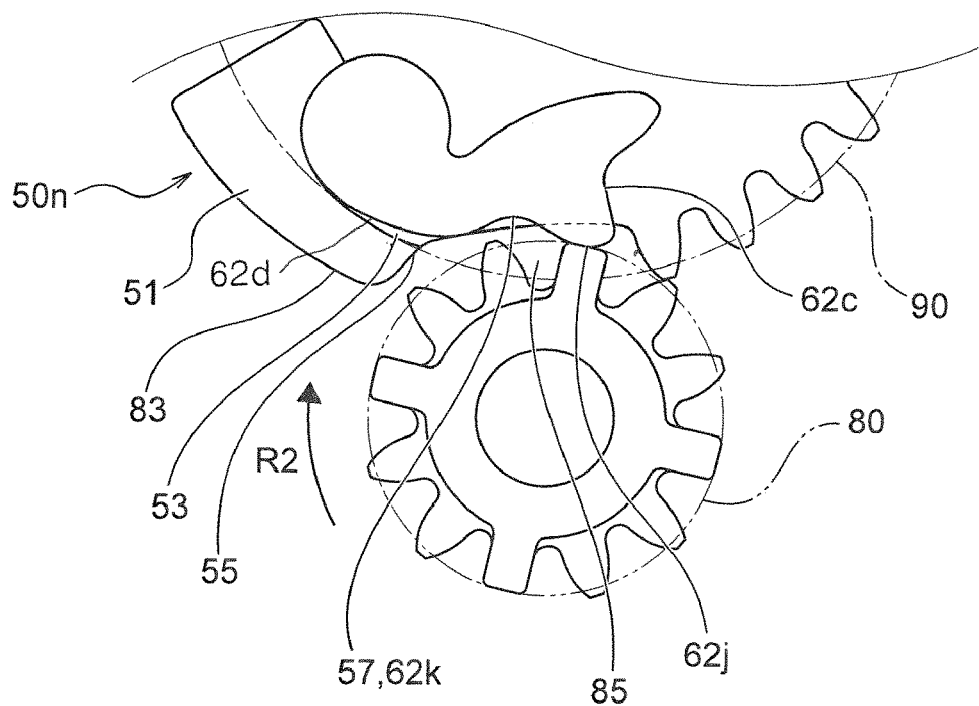

FIGS. 33A and 33B are plan views showing a main part of a valve body drive mechanism 30 including a turning restriction part 62 provided with an interference avoiding part in accordance with an embodiment of the present invention, which are viewed from an upper side.

In this embodiment, FIG. 33A shows a state that the lever part 62b of the turning restriction part 62 contacts with the lever turning restriction part 50h of the protruded shape part 50n and shows a state before the lever part 62b is turned. In other words, FIG. 33A shows a state before the protruded part 46b of the drive gear 46 turned in the second direction "R2" is contacted with the second contact part 62d of the lever part 62b.

On the other hand, FIG. 33B shows a state that the lever part 62b is turned and separated from the lever turning restriction part 50h. In other words, FIG. 33B shows a state that the protruded part 46b of the drive gear 46 turned in the second direction "R2" contacts with the second contact part 62d of the lever part 62b to push the lever part 62b and thus the lever part 62b is turned. When the protruded part 46b is further turned in the second direction "R2" from the state shown in FIG. 33B, the protruded part 46b is separated from the second contact part 62d of the lever part 62b.

In this embodiment, when the drive gear 46 is turned, a locus of a circle (two-dot chain line) formed by tip ends in the radial direction of the protruded parts 46b is defined as a first circle locus 80. When the protruded part 46b is turned in the first direction "R1" and contacts with the first contact part 62c, a locus of a circle (alternate long and short dash line) formed by a tip end 62j of the first contact part 62c in the radial direction of the driven gear 50 is defined as a second circle locus 90.

Further, the second contact part 62d of the lever part 62b is formed in a shape having an interference avoiding part 62k in a portion on the first contact part 62c side in an interference region 85 which is surrounded by a first circle 80 (same reference sign as the first circle locus is used) formed by the first circle locus 80 and a second circle 90 (same reference sign as the second circle locus is used) formed by the second circle locus 90.

In this embodiment, the above-mentioned interference avoiding part 62k described as that "the second contact part 62d is formed in a shape having an interference avoiding part 62k in a portion on the first contact part 62c side in an interference region 85 which is surrounded by a first circle 80 and a second circle 90" means that a retreating shape for the protruded part 46b is formed in the second contact part 62d of the lever part 62b which is to be originally contacted with the protruded part 46b and, in the portion of the retreating shape, the protruded part 46b does not contact with the lever part 62b. In other words, in the interference region 85, a portion on the first contact part 62c side of the second contact part 62d is formed in a shape so as to have a gap space in which the second contact part 62d does not contact with the protruded part 46b.

According to this embodiment, the lever part 62b is formed in a shape having the interference avoiding part 62k in the second contact part 62d and thus, a timing when the protruded part 46b is abutted with the second contact part 62d of the lever part 62b by turning of the drive gear 46 becomes later than that in a shape having no interference avoiding part 62k. As a result, a time period in a "separated" state in a contacting and separating operation of the lever part 62b becomes shorter than that in the shape having no interference avoiding part 62k. In the "contacting" state in the above-mentioned operation, a foreign matter is structurally unable to enter into the region 53 and thus, when a time period of the "separated" state is shortened, a foreign matter is hard to enter into the region 53 by that time.

Therefore, even in a case that the valve drive device 10 is installed in a fluid path including foreign matters such as copper powder, a time period of the "separated" state can be shortened due to the shape having the interference avoiding part 62k and thus, the foreign matter can be restrained from entering into the region 53. Accordingly, a possibility can be reduced that the lever part 62b becomes unable to return to the original contact position. As a result, a possibility that the power transmission switching part 52 occurs an operation failure due to a foreign matter can be reduced.

An example of the structure of the interference avoiding part 62k in this embodiment will be described below with reference to FIGS. 33A and 33B. A continuous portion 62m of the interference avoiding part 62k from a portion of the interference avoiding part 62k of the second contact part 62d to a portion connected with the tip end 62j of the first contact part 62c is formed in a curved surface so that the protruded part 46b abutting with the interference avoiding part 62k is capable of sliding.

When the protruded part 46b is turned and moved by turning of the drive gear 46 to face a portion corresponding to the interference avoiding part 62k of the second contact part 62d, the protruded part 46b is initially in a non-contact state with the second contact part 62d (FIG. 33A). After that, when the protruded part 46b is moved toward the first contact part 62c side, the non-contact state is switched to a contact state that the protruded part 46b is contacted with the second contact part 62d. When switched to the contact state, the protruded part 46b begins to push the second contact part 62d through the continuous portion 62m.

Then, the lever part 62b is pushed by the turned and moved protruded part 46b and is turned against an urging force with the turning shaft 62a as a support point. As a result, the lever part 62b is separated from the contact position with the lever turning restriction part 50h (FIG. 33B).

In this case, in this embodiment, the continuous portion 62m from the portion corresponding to the interference avoiding part 62k to the portion connected with the first contact part 62c is formed in the curved surface where the protruded part 46b is capable of sliding and thus, the lever part 46b can be turned smoothly. Therefore, the turning operation is stable.

In this case, it is preferable that the slidable curved surface of the continuous portion 62m is a flat face but, when the protruded part 46b is slidable, the continuous portion 62m is not limited to a flat face.

A specific structure (shape) of the lever part 62b provided with the interference avoiding part 62k in this embodiment will be described below with reference to FIGS. 33A and 33B.

In this embodiment, a face of a portion of the lever part 62b which faces the lever turning restriction part 50h is formed to be a curved surface so that the entire portion is substantially uniformly surface-contacted with the lever turning restriction part 50h to the tip end position 55 in an extending direction of the lever part 62b. Further, the tip end position 55 of the lever turning restriction part 50h is formed to be a contact position 55 (same reference sign as the tip end position is used) as a base point with respect to the lever part 62b.

The interference avoiding part 62k is, in this embodiment, structured to be a recessed part 57 between the contact position 55 of the lever part 62b with the lever turning restriction part 50h and the first contact part 62c.

In this case, the shape of the recessed part 57 is not limited to the shape as shown in FIGS. 33A and 33B, in other words, a substantially symmetric shape as a whole which has a shape formed by an inclined face gradually going down from the tip end position 55 toward the continuous portion 62m. For example, a shape of the recessed part 57 may be formed so as to be retreated in the radial direction of the driven gear 50 from the tip end position 55 and then changes the direction by substantially a right angle to be connected with the continuous portion 62m.

According to this embodiment, the interference avoiding part 62k is structured of the recessed part 57 and thus, a delay of the timing can be easily realized by the recessed part 57 in a state that the contact state and the contact position of the lever part 62b with the lever turning restriction part 50h are stabilized.

Next, relationships between a turning angle of the drive gear 46, in other words, a turning position of the protruded part 46b and a turned position of the lever part 62b will be described below by comparing a case that the lever part 62b does not have the interference avoiding part 62k (view on an upper side in FIG. 34 and a graph by the broken chain line in FIG. 35) with a case that the lever part 62b has the interference avoiding part 62k (view on a lower side in FIG. 34 and a graph by the solid line in FIG. 35) with reference to FIGS. 34 and 35.

Figure 34:
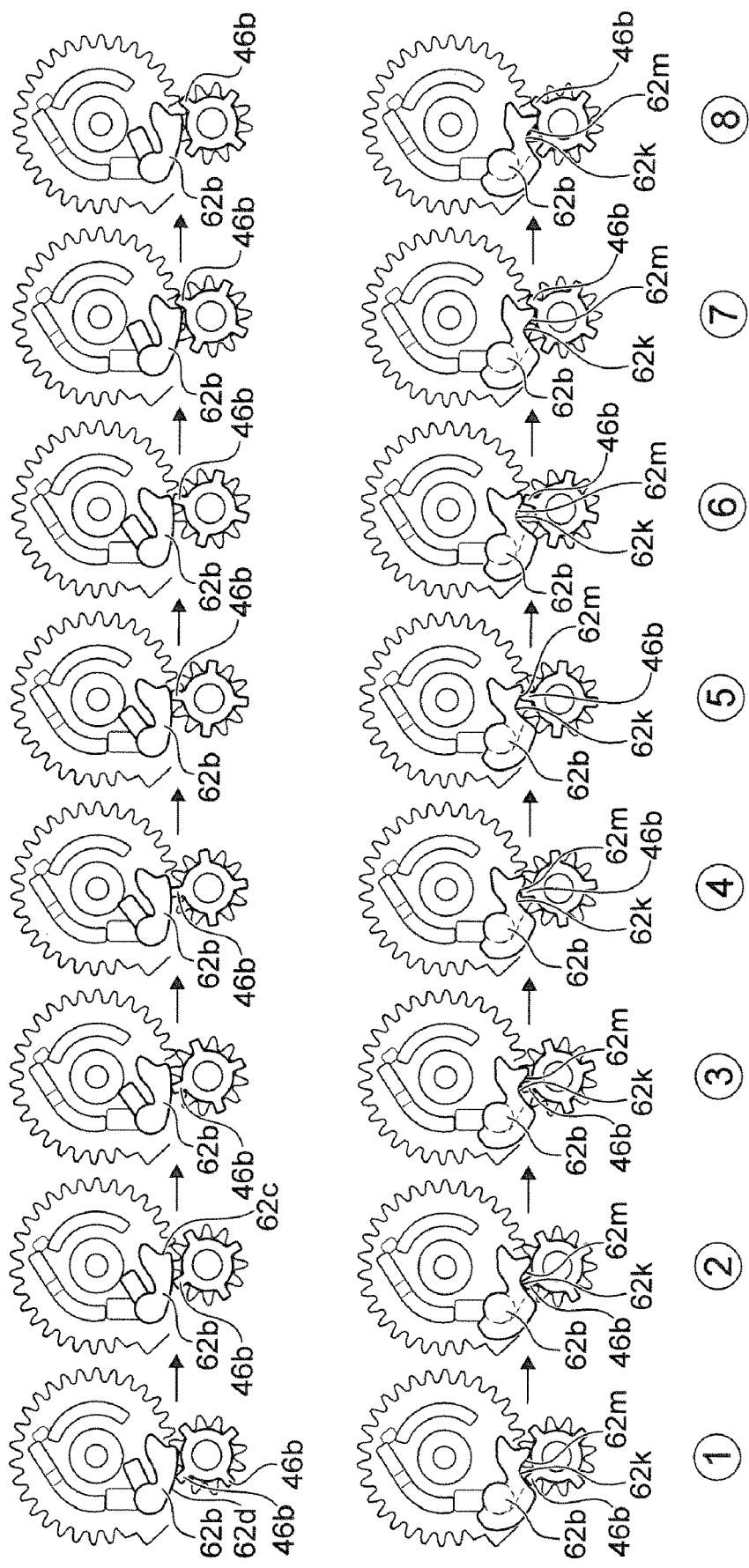
FIG. 34 is an explanatory view showing a relationship between a turning position of a drive gear and a turned position of a lever part.

In FIG. 34, the operation advances from the first (1) (indicated with a circle) at the left end toward the eighth (8) at the right end through the steps 1 through 8. The protruded part 46b contacts with the second contact part 62d of the lever part 62b at respective timings to push and turn the second contact part 62d and then, the protruded part 46b is separated from the contact state with the second contact part 62d of the lever part 62b after passing a state that the turning angle is the maximum turning state to reach the first contact part 62c side.

Figure 35:
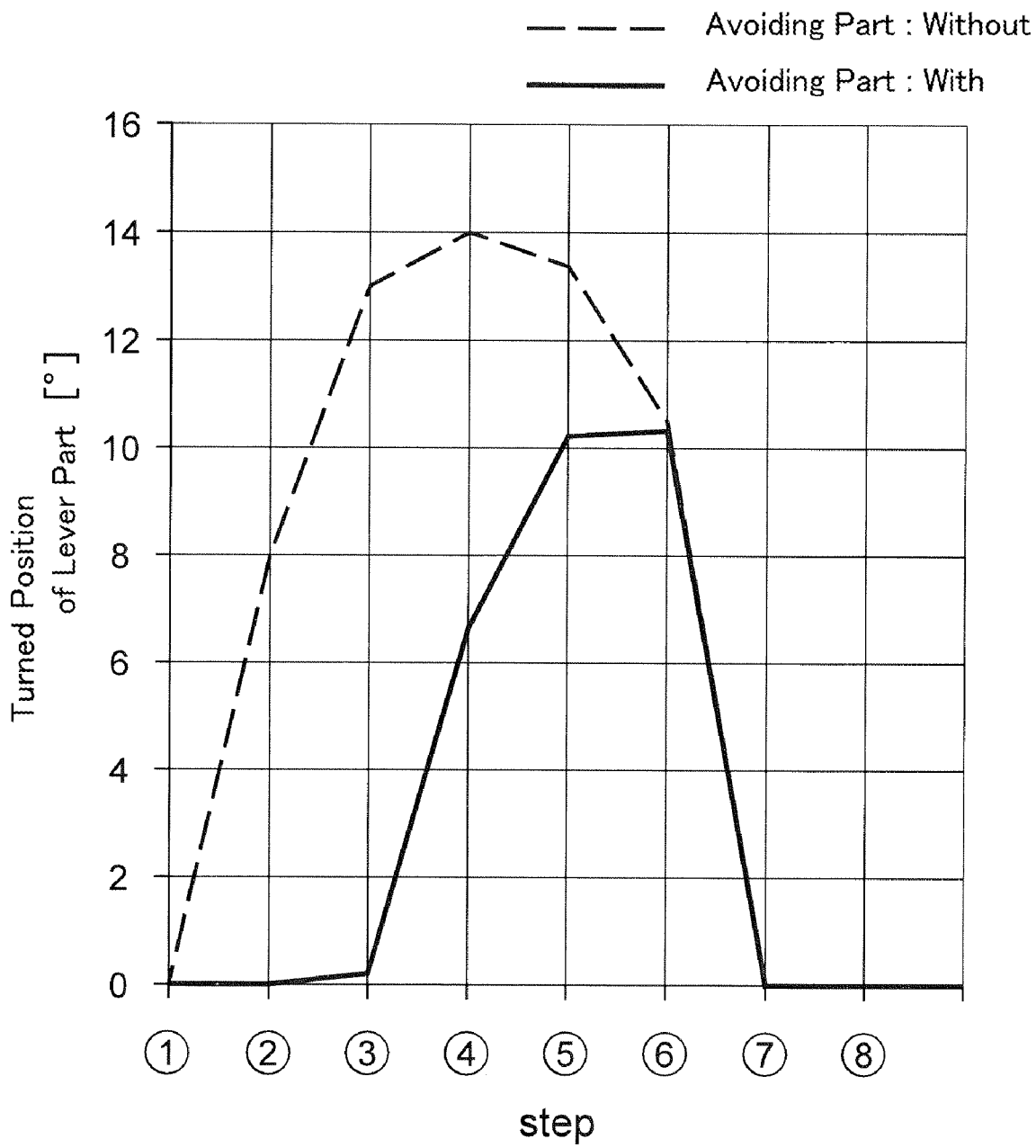
FIG. 35 is a graph showing a relationship between a turning position of a drive gear and a turned position of a lever part.

As shown in FIGS. 34 and 35, in both cases, both of the protruded parts 46b are in non-contact states with the lever parts 62 at the origin position in the step 1.

In the lever part 62b having no interference avoiding part 62k, as shown in the view on the upper side in FIG. 34, the turning protruded part 46b contacts with the lever part 62b immediately after the step 1 to turn the lever part 62b against the urging force. Therefore, since the opening area of the region 53 becomes larger immediately after the step 1, a foreign matter may easily enter. A time period that the opening area of the region 53 becomes large is in a range from the step 1 to the step 7.

On the other hand, in the lever part 6b provided with the interference avoiding part 62k, as shown in the view on the lower side in FIG. 34, the protruded part 46b does not contact with the lever part 62b from the step 1 to immediately before the step 3 because the interference avoiding part 61k is provided. The protruded part 46b contacts with the lever part 62b at the position of the step 3 and, after that, the protruded part 46b turns the lever part 62b.

As a result, the opening area of the region 53 becomes large, but the time period that the opening area of the region 53 becomes large is in a range from the step 3 to the step 7.

Therefore, in the lever part 62b provided with the interference avoiding part 62k, a time period that a foreign matter may easily enter into the region 53 is shortened by a range from the step 1 to the step 3.

FIG. 35 is a graph showing that, in the lever part 62k provided with the interference avoiding part 62k, a time period that a foreign matter may easily enter into the region 53 is shortened by a range from the step 1 to the step 3. As shown in the graph, according to this embodiment, a time period of the "separated" state is shortened due to the shape provided with the interference avoiding part 62k and thus, entering of a foreign matter into the region 53 can be restrained.

Further, in this embodiment, as shown by the solid line (with the interference avoiding part 62k) of the graph in FIG. 35, it is structured that, when the drive gear 50 is turned in the second direction "R2" and the protruded part 46b pushes the second contact part 62d of the lever part 62b, the lever part 62b is turned with the turning shaft 62a as a turning support point and a turning angle of the lever part 62b when the protruded part 46b is separated from the second contact part 62d becomes the maximum value.

In this embodiment, it is structured that a turning angle of the lever part 62b when the protruded part 46b is separated from the second contact part 62d becomes the maximum value and thus, the lever part 62b is not required to be unnecessarily turned larger as in the case of the turning angle of the lever part 62b having no interference avoiding part 62k (graph of the broken line (without the interference avoiding part 62k) in FIG. 35). As a result, the structure can be simplified.

Further, in this embodiment, the motor 24 is a stepping motor. In addition, this embodiment is structured so that the protruded part 46b is separated from the second contact part 62d in a step next to the step corresponding to the maximum value of the turning angle of the lever part 62b.

According to this structure, the protruded part 46b is separated from the second contact part 62d in the step next to the step corresponding to the maximum value of the turning angle of the lever part 62b and thus, design and operation control can be simplified.

[Foreign Matter Entry Restraining Part and Interference Avoiding Part] FIG. 29, FIGS. 31A and 31B, and the View on the Lower Side in FIG. 34

As shown in FIG. 29, FIGS. 31A and 31B, and the view on the lower side in FIG. 34, in this embodiment, the lever part 62b is provided with both of the foreign matter entry restraining part 63 and the interference avoiding part 62k. As shown in FIGS. 31A and 31B, in both of a state that the lever part 62b is in a non-contact state with the protruded part 46b and before being turned (FIG. 31A), and a state that the lever part 62b contacts with the protruded part 46b and is turned to the maximum angle (FIG. 31B), the region 53 is largely covered by the foreign matter entry restraining part 63.

Therefore, entering of a foreign matter into the region 53 can be further restrained by providing with the foreign matter entry restraining part 63 and the shape having the interference avoiding part 62k. Accordingly, a possibility that the power transmission switching part 52 occurs an operation failure due to a foreign matter can be further reduced.

In addition, in this embodiment, as shown in FIG. 29, FIGS. 31A and 31B, and the view on the lower side in FIG. 34, the interference avoiding part 62k is structured of the recessed part 57 as described above. The interference avoiding part 62k is structured of the recessed part 57 as described above and thus, the effects based on the structure of the recessed part can be obtained in the structure provided with the foreign matter entry restraining part 63 and the interference avoiding part 62k.

MODIFIED EMBODIMENTS (1) In the present specification, as described at the beginning, in order to easily understand the description, the specific structure of the foreign matter entry restraining part and the interference avoiding part is described later and, first, the general structure of the valve drive device has been described which is capable of reducing noise when the valve body is driven and of performing smooth power transmission switching with reference to FIGS. 1 through 26B. Then, the structures including the foreign matter entry restraining part 63, the interference avoiding part 62k and both the structures 63 and 62k have been described with reference to FIGS. 27 through 35.

In the feature structures of the respective embodiments of the present invention, the structures described and explained in FIGS. 1 through 26B are similarly structured in the embodiments in FIGS. 27 through 35 and thus, their descriptions are omitted.

For example, in a case that the region 53 is structured to have the gap space 50v described in FIG. 24, there is a possibility that a foreign matter may enter into the gap space 50v even when the lever part 62b is set in a contact state that the lever part 62b is pressed against the lever turning restriction part 50h by the urging force. When the present invention is applied to the region 53 having this structure, the effect can be largely obtained.

(2) In the embodiment described above, as an example of the "urging member", the turning restriction part 62 is urged by the torsion spring 60. However, instead of this structure, the urging member may be structured of a flat spring.

(3) In this embodiment described above, in the power transmission switching part 52, power transmission is structured to be switched by switching the engagement states (contacting with the first contact part 62c or the second contact part 62d) of the protruded part 46b with the turning restriction part 62. However, instead of the structure, it may be structured that a known ratchet mechanism is provided in the turning restriction part 62 to idle the drive gear 46.

(4) In the embodiment described above, the foot part accommodation part 50s is structured to provide in the under face 50r of the driven gear 50 to accommodate the foot part 62h. However, instead of the structure, without providing the foot part accommodation part 50s in the under face 50r, it may be structured that a foot part 62h is protruded from the under face 50r and is turnably disposed so as to contact with the under face 50r.

(5) In the embodiment described above, the foot part 62h is structured as a single foot part which is extended in a direction opposite to the urging direction of the torsion spring 60. However, instead of this structure, it may be structured that a plurality of foot parts is provided and, for example, a foot part extended in an urging direction of the torsion spring 60 may be provided.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A valve drive device comprising a valve body drive mechanism structured to drive a valve body;
    wherein the valve body drive mechanism comprising:
        a drive gear structured to be rotatably driven by a motor;
        a driven gear structured to turn the valve body through rotation of the drive gear in a state that the driven gear is engaged with the drive gear; and a power transmission switching part which is capable of switching between a power transmission state that the drive gear is engaged with the driven gear to transmit power of the motor to the driven gear and a power non-transmission state that an engaging state of the drive gear with the driven gear is released;

wherein the power transmission switching part comprises:
at least one protruded part which is formed in the drive gear and is protruded in a radial direction of the drive gear; and
a turning restriction part which is turnably attached to the driven gear and is engageable with the protruded part;

wherein the turning restriction part comprises:
a turning shaft which is inserted into the driven gear; and
a lever part which is extended from the turning shaft in a circumferential direction of the driven gear and is urged with an urging force toward an outer side in a radial direction of the driven gear;

wherein the driven gear comprises a lever turning restriction part structured to contact with the lever part to restrict turning of the turning restriction part to the outer side in the radial direction of the driven gear;

wherein the lever part is structured to perform a contact operation with the protruded part being turned and a separating operation from a contact position with the lever turning restriction part against the urging force;

wherein the lever part comprises:
a first contact part structured to contact with the protruded part when the drive gear is turned to a first direction; and
a second contact part structured to contact with the protruded part when the drive gear is turned to a second direction which is an opposite direction to the first direction;

wherein when the protruded part is turned to the first direction and is contacted with the first contact part, the lever part is pressed by the protruded part to turn the driven gear, and a tooth of the drive gear and a tooth of the driven gear are engaged with each other and thereby the power transmission state is obtained;

wherein when the protruded part is turned to the second direction and is contacted with the second contact part, the lever part is turned to an inner side in the radial direction against the urging force and a tooth of the drive gear is not engaged with a tooth of the driven gear to idle the drive gear and thereby the power non-transmission state is obtained; and wherein in a case that a locus of a circle formed by a tip end in the radial direction of the protruded part when the drive gear is turned is defined as a first circle locus, and that a locus of a circle formed by a tip end of the first contact part in the radial direction of the driven gear when the protruded part is turned to the first direction and is contacted with the first contact part is defined as a second circle locus, the second contact part is formed in a shape which comprises an interference avoiding part on a side of the first contact part in an interference region surrounded by a first circle formed by the first circle locus and a second circle formed by the second circle locus.

2. The valve drive device according to claim 1, wherein a continuous portion continuing from a portion of the interference avoiding part of the second contact part to the first contact part is formed to be a curved surface on which the protruded part is capable of sliding.

3. The valve drive device according to claim 1, wherein the interference avoiding part is structured of a recessed part between a contact position of the lever part with the lever turning restriction part and the first contact part.

4. The valve drive device according to claim 1, wherein when the protruded part pushes the second contact part of the lever part while the drive gear is turned to the second direction, the lever part is turned with the turning shaft as a turning support point, and a turning angle of the lever part when the protruded part is separated from the second contact part is a maximum value.

5. The valve drive device according to claim 4, wherein the motor is a stepping motor, and
the protruded part is separated from the second contact part in a step next to a step corresponding the maximum value of the turning angle of the lever part.

6. The valve drive device according to claim 1, wherein in a state that the lever turning restriction part restricts turning of the turning restriction part, the lever turning restriction part is formed with a gap space between the lever turning restriction part and the turning shaft.

7. The valve drive device according to claim 1, wherein the second contact part of the lever part is located on an outer peripheral side in the radial direction of the driven gear and is formed to be a curved surface which is extended along a circumferential direction of the driven gear.

8. The valve drive device according to claim 1, wherein the driven gear is formed with a protruded shape part which is protruded to an outer side in the radial direction and is protruded from a face on one side of the driven gear in an axial direction of the driven gear, and an inner side in the protruded shape part in the radial direction of the driven gear is formed with the lever turning restriction part.

9. The valve drive device according to claim 6, wherein when the protruded part contacts with the second contact part and the lever part is turned to an inner side in the radial direction against the urging force, the driven gear comprises a co-turning prevention part which restricts that, when the second contact part is pushed by the protruded part in a turning direction of the protruded part, the driven gear is turned in a direction corresponding to a turning direction of the drive gear.

10. The valve drive device according to claim 1, wherein the turning restriction part comprises a foot part provided on an opposite side to the lever part of the turning shaft in an axial direction of the turning shaft, and
the foot part restricts an inclination of the turning shaft by the urging force which urges the lever part.

11. The valve drive device according to claim 10, wherein the foot part is extended to an opposite direction to a direction that the lever part is urged.

12. The valve drive device according to claim 10, wherein the foot part is extended from the turning shaft toward an inner side in the radial direction of the driven gear.

* * * * *